United States Patent
Patil et al.

(10) Patent No.: US 11,864,045 B2
(45) Date of Patent: *Jan. 2, 2024

(54) NON-SIMULTANEOUS TRANSMIT-RECEIVE (NSTR) SOFT ACCESS POINT (AP) MULTI-LINK DEVICE (MLD)

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Sai Yiu Duncan Ho, San Diego, CA (US); Yanjun Sun, San Diego, CA (US); Gaurang Naik, San Diego, CA (US); Tushnim Bhattacharyya, San Diego, CA (US); Vikram Phogat, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,370

(22) Filed: Aug. 23, 2021

(65) Prior Publication Data

US 2023/0053972 A1 Feb. 23, 2023

(51) Int. Cl.
*H04W 4/00* (2018.01)
*H04W 36/18* (2009.01)
*H04W 36/00* (2009.01)
*H04W 74/08* (2009.01)
*H04W 36/06* (2009.01)

(52) U.S. Cl.
CPC ..... *H04W 36/18* (2013.01); *H04W 36/00835* (2018.08); *H04W 36/06* (2013.01); *H04W 74/0816* (2013.01)

(58) Field of Classification Search
CPC ..... H04W 36/00835; H04W 36/00837; H04W 36/06; H04W 36/16; H04W 36/165;
(Continued)

(56) References Cited

U.S. PATENT DOCUMENTS

2018/0167822 A1\* 6/2018 Cordeiro ................. H04W 4/02
2021/0014776 A1 1/2021 Patil et al.
(Continued)

FOREIGN PATENT DOCUMENTS

WO 2020226462 A1 11/2020
WO 2021109485 A1 6/2021
WO 2021141449 A1 7/2021

OTHER PUBLICATIONS 802 11 Working Group of the LAN/MAN Standards Committee of the IEEE Computer Society: "Draft Standard for Information Technology—Tele-communications and Information Exchange Between Systems Local and Metropolitan Area Networks—Specific Requirements, Part 11: Wireless LAN MAC and PHY Specifications, Amendment 8: Enhancements for EHT", IEEE, Draft P802.11BE_D1.1, IEEE-SA, Piscataway, NJ, USA, vol. 802.11be Drafts, No. D1.1, Jul. 23, 2021, pp. 1-685, XP068183889, Section 35.3.
(Continued)

*Primary Examiner* — Matthew W Genack
(74) *Attorney, Agent, or Firm* — Holland & Hart / Qualcomm

(57) ABSTRACT

A wireless station (STA) operating as a non-simultaneous transmit-receive (NSTR) soft access point (AP) multi-link device (MLD) associated with a primary link and a non-primary link determines that the non-primary link is unavailable, and transmits, on only the primary link, a frame carrying an indication of the unavailability of the non-primary link. The NSTR softAP MLD may set a Do Not Transmit (DNT) bit to a value of 1 and may operate as a single-link device on the primary link based on the unavailability of the non-primary link. In some instances, the NSTR softAP MLD determines that the non-primary link is available while operating as the single-link device on the primary link, resets the DNT bit based on the availability of the
(Continued)

non-primary link, and transmits the reset DNT bit in another frame on only the primary link.

29 Claims, 27 Drawing Sheets

(58) Field of Classification Search
CPC ............. H04W 36/18; H04W 74/0808; H04W 74/0816; H04W 74/0825
See application file for complete search history.

(56) References Cited

U.S. PATENT DOCUMENTS

| | | | |
|---|---|---|---|
| 2021/0212118 A1* | 7/2021 | Lu | ..................... H04W 74/0816 |
| 2021/0377856 A1 | 12/2021 | Chu et al. | |
| 2022/0132610 A1 | 4/2022 | Guo et al. | |
| 2022/0159106 A1 | 5/2022 | Kim et al. | |
| 2022/0225406 A1 | 7/2022 | Kim et al. | |
| 2022/0386301 A1 | 12/2022 | Lu et al. | |
| 2023/0054755 A1 | 2/2023 | Patil et al. | |

OTHER PUBLICATIONS

International Search Report and Written Opinion—PCT/US2022/034927—ISA/EPO—dated Oct. 24, 2022 (2105803U2WO).
Rison Mark (Samsung): "Review of P802.11be/D0.3 for CC34", IEEE Draft, 11-21-0218-00-00BE-Review-of-P802-11BE-DO-3-FOR-CC34, IEEE-SA Mentor, Piscataway, NJ, USA, vol. 802.11 EHT, 802.11be, Feb. 11, 2021 46 Pages, XP068178718, Sections 35.3.8, 35.3.13.3-6.

* cited by examiner

NON-SIMULTANEOUS TRANSMIT-RECEIVE (NSTR) SOFT ACCESS POINT (AP) MULTI-LINK DEVICE (MLD)

TECHNICAL FIELD

This disclosure relates generally to wireless communications, and more specifically to wireless communications associated with multi-link devices (MLDs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

An AP multi-link device (MLD) may include a plurality of APs that can independently operate on a plurality of respective communication links. Each AP can establish a BSS on a respective communication link, and wireless communication devices associated with the AP MLD can transmit data to or receive data from the AP MLD on one or more of the communication links associated with the AP MLD. Each of the communication links may be of various bandwidths by bonding a number of 20 MHz-wide channels together to form 40 MHz-wide channels, 80 MHz-wide channels, 160 MHz-wide channels, or 320 MHz-wide channels. Although STAs may have limited filtering capabilities that can allow the reception of data on one link to interfere with the transmission of data on another link, it may be desirable for STAs to operate as a softAP MLD.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method of wireless communication by a wireless station (STA). In some implementations, the method includes operating as a non-simultaneous transmit-receive (NSTR) soft access point (AP) multi-link device (MLD) including a first AP associated with a primary link and including a second AP associated with a non-primary link. The method includes determining that the non-primary link is unavailable. The method includes transmitting, on only the primary link, a frame carrying an indication of the unavailability of the non-primary link. The frame may be one of a beacon frame, a probe response frame, an association response frame, a reassociation response frame, or an action frame. In some instances, the frame includes a Per-STA Profile subelement or a Reduced Neighbor Report (RNR) element including a Do Not Transmit (DNT) bit set to a value of 1, where the DNT bit set to the value of 1 indicates the unavailability of the non-primary link. In some instances, the frame includes a Capability Information field carrying a Critical Update Flag (CUF), the CUF set to a value of 1 based on the unavailability of the non-primary link.

In some implementations, the method may also include disabling the non-primary link or placing the non-primary link into a power save state based on the unavailability of the non-primary link. In some instances, disabling the non-primary link includes removing the non-primary link from a multi-link context associated with the NSTR softAP MLD. The method may also include determining that the non-primary link is available after removing the non-primary link from the multi-link context, and adding the non-primary link to the multi-link context based on the availability of the non-primary link. In some other instances, disabling the non-primary link includes re-mapping traffic identifiers (TIDs) from the non-primary link to the primary link. The method may also include determining that the non-primary link is available after disabling the non-primary link, and re-mapping the TIDs from the primary link to the non-primary link based on the availability of the non-primary link.

In some implementations, the method also includes operating as a single-link device on the primary link based on the unavailability of the non-primary link. In some instances, the method may also include determining that the non-primary link is available while operating as the single-link device on the primary link, resetting the DNT bit to a value of 0 based on the availability of the non-primary link, and transmitting the reset DNT bit in another frame on only the primary link, the other frame including a Per-STA Profile subelement or a Reduced Neighbor Report (RNR) element carrying the reset DNT bit having the value of 0. In some other implementations, the method also includes determining that the non-primary link is available after transmitting the indication, transmitting, on only the primary link, an indication of the availability of the non-primary link, and operating as a multi-link device on the primary link and the non-primary link based on the availability of the non-primary link.

In some implementations, the method may also include receiving a ready-to-send (RTS) frame from a STA MLD on the primary link, transmitting a CTS frame to the STA MLD on the primary and non-primary links based on receiving the RTS frame, and receiving one or more UL PPDUs from the STA MLD on the primary and non-primary links. In some other implementations, the method may also include switching the primary link from a first channel to a second channel concurrently with switching the non-primary link from the second channel to the first channel. In some instances, the first channel is in one of a 5 GHz frequency band or a 6 GHz frequency band, and the second channel is in the other of the 5 GHz frequency band or the 6 GHz frequency band.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor in conjunction with the at least one modem may be configured to operate the wireless communication device as an NSTR softAP MLD including a first AP associated with a primary link and including a second AP associated with a non-primary link. Execution of the processor-readable code may be configured to determine that the non-primary link is unavailable. Execution of the processor-readable code may be configured to transmit, on only the primary link, a frame carrying an indication of the unavailability of the non-primary link. The frame may be one of a beacon frame, a probe response frame, an association response frame, a reassociation response frame, or an action frame. In some instances, the frame includes a Per-STA Profile subelement or a Reduced Neighbor Report (RNR) element including a Do Not Transmit (DNT) bit set to a value of 1, where the DNT bit set to the value of 1 indicates the unavailability of the non-primary link. In some instances, the frame includes a Capability Information field carrying a Critical Update Flag (CUF), the CUF set to a value of 1 based on the unavailability of the non-primary link.

In some implementations, execution of the processor-readable code may be configured to disable the non-primary link or to place the non-primary link into a power save state based on the unavailability of the non-primary link. In some instances, disabling the non-primary link includes removing the non-primary link from a multi-link context associated with the NSTR softAP MLD. Execution of the processor-readable code may also be configured to determine that the non-primary link is available after removing the non-primary link from the multi-link context, and to add the non-primary link to the multi-link context based on the availability of the non-primary link. In some other instances, disabling the non-primary link includes re-mapping traffic identifiers (TIDs) from the non-primary link to the primary link. Execution of the processor-readable code may also be configured to determine that the non-primary link is available after disabling the non-primary link, and to re-map the TIDs from the primary link to the non-primary link based on the availability of the non-primary link.

In some implementations, execution of the processor-readable code may also be configured to operate the wireless communication device as a single-link device on the primary link based on the unavailability of the non-primary link. In some instances, execution of the processor-readable code may also be configured to determine that the non-primary link is available while operating as the single-link device on the primary link, to reset a DNT bit to a value of 0 based on the availability of the non-primary link, and to transmit the reset DNT bit in another frame on only the primary link, the other frame including a Per-STA Profile subelement or a Reduced Neighbor Report (RNR) element carrying the reset DNT bit having the value of 0. In some other implementations, execution of the processor-readable code may also be configured to determine that the non-primary link is available after transmitting the indication, to transmit, on only the primary link, an indication of the availability of the non-primary link, and to operate as a multi-link device on the primary link and the non-primary link based on the availability of the non-primary link.

In some implementations, execution of the processor-readable code may also be configured to receive an RTS frame from a STA MLD on the primary link, to transmit a CTS frame to the STA MLD on the primary and non-primary links based on receiving the RTS frame, and to receive one or more UL PPDUs from the STA MLD on the primary and non-primary links. In some other implementations, execution of the processor-readable code may also be configured to switch the primary link from a first channel to a second channel concurrently with switching the non-primary link from the second channel to the first channel. In some instances, the first channel is in one of a 5 GHz frequency band or a 6 GHz frequency band, and the second channel is in the other of the 5 GHz frequency band or the 6 GHz frequency band.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
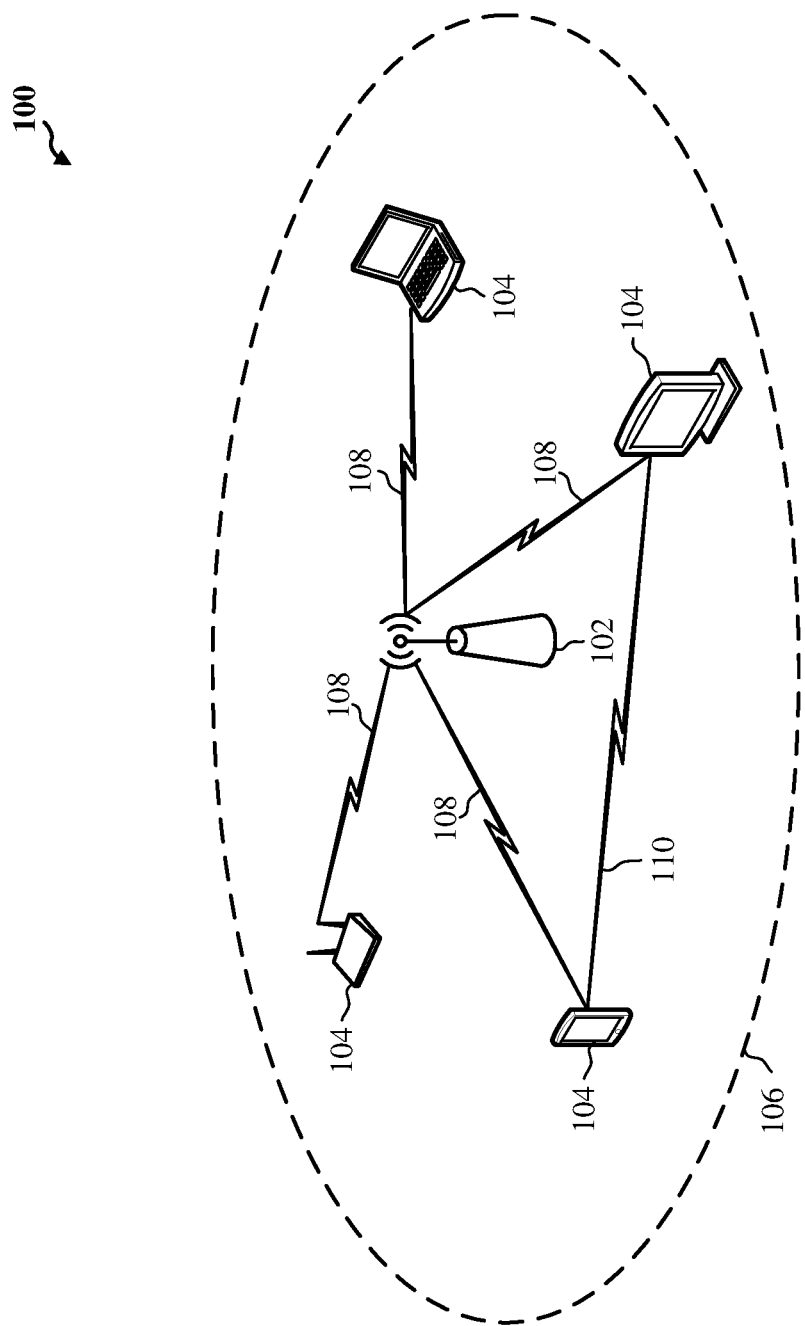
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Various implementations relate generally to communications between multi-link devices (MLDs) such as AP MLDs and STA MLDs. Some implementations more specifically relate to wireless stations (STAs) that operate as mobile hotspots on multiple communication links. An AP MLD includes a plurality of APs configured to communicate on a plurality of different communication links. A STA MLD may communicate with the AP MLD using one or more of the different communication links concurrently. The AP MLD may provide a multi-link context that includes or indicates the complete profiles of the different communication links associated with the AP MLD. The complete profile of a respective link may include the capabilities, operation parameters, and discovery information of the respective link. The AP MLD may advertise the multi-link context on one of its communication links so that nearby wireless communication devices (such as a STA MLD) operating on that communication link can receive the multi-link context and obtain the complete profiles for multiple communication links of the AP MLD. In this way, a wireless communication device operating on one communication link can discover and associate with the AP MLD on one or more other communication links without scanning or probing the other communication links. The communication link on which an AP MLD advertises the multi-link context may be referred to as a primary link, and the other communication links may be referred to as non-primary links.

The multi-link context also allows the AP MLD and one or more associated devices to establish a common block acknowledgement (BA) policy or session on multiple communication links of the AP MLD, and to use a single authentication mechanism for multiple communication links of the AP MLD. The associated devices can use the multi-link context to dynamically switch communications between the different communication links of the AP MLD without disassociating or re-associating with the AP MLD. The AP MLD can use the multi-link context to dynamically change or re-map affiliations between traffic identifier (TID) values and each of the different communication links.

Wireless STAs have limited filtering capabilities, as compared to APs, that can allow transmissions to a STA on one link to interfere with data transmissions from the STA on another link. For example, when a STA transmits downlink (DL) communications on one link while concurrently receiving uplink (UL) communications on another link, the relatively small spacing between antenna resources of the STA, along with its limited filtering capabilities, may allow the transmission of DL data on one link to interfere with or prevent the concurrent reception of UL data on the other link. This cross-link interference may inhibit or preclude STAs operating as mobile hotspots on multiple communication links from concurrently transmitting and receiving data on different communication links. As such, these STAs may be referred to as non-simultaneous transmit-receive (NSTR) softAP MLDs.

Aspects of the present disclosure recognize the importance of reducing or eliminating cross-link interference associated with a NSTR softAP MLD. In some implementations, a NSTR softAP MLD associated with a primary link and a non-primary link may advertise the complete profiles of the primary and non-primary links on only the primary link. The NSTR softAP MLD may also advertise updates to one or more BSS parameters of the primary and non-primary links on only the primary link. Advertising the complete profiles of both links of an NSTR softAP MLD on the primary link may allow some wireless communication devices operating on the primary link to discover and associate with the NSTR softAP MLD on one or both of the primary and non-primary links without scanning or probing the non-primary link. In some implementations, non-legacy devices operating on the primary link may be able to decode or parse the complete profiles of both the primary and non-primary links, while legacy devices operating on the primary link may be able to decode or parse only the complete profile of the primary link. As a result, legacy devices operating on the primary link may not be able to discover or associate with the NSTR softAP MLD on the non-primary link. Moreover, by not advertising the complete profile of either link on the non-primary link, legacy devices operating on the non-primary link may not be able to discover or associate with the NSTR softAP MLD on the non-primary link. In this way, various aspects of the subject matter disclosed herein may limit communications between the NSTR softAP MLD and legacy devices to the primary link. As used herein, the term "legacy devices" may refer to wireless communication devices configured to operate in accordance with the IEEE 802.11ax or earlier amendments to the 802.11 family of wireless communication standards, and the term "non-legacy devices" may refer to wireless communication devices configured to operate in accordance with the IEEE 802.11be or later amendments to the 802.11 family of wireless communication standards.

Various aspects of the subject matter described in this disclosure can be implemented to realize one or more of the following potential advantages. By limiting communications between a NSTR softAP MLD and legacy devices to the primary link (and thereby precluding legacy devices from communicating with the NSTR softAP MLD on the non-primary link), the NSTR softAP MLD may prevent legacy devices from transmitting UL data on the non-primary link while the NSTR softAP MLD is transmitting DL data to one or more associated devices on the primary link. In this way, implementations of the subject matter disclosed herein may reduce the likelihood that cross-link interference resulting from UL transmissions on the non-primary link degrades or otherwise interferes with DL transmissions from the NSTR softAP MLD on the primary link.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
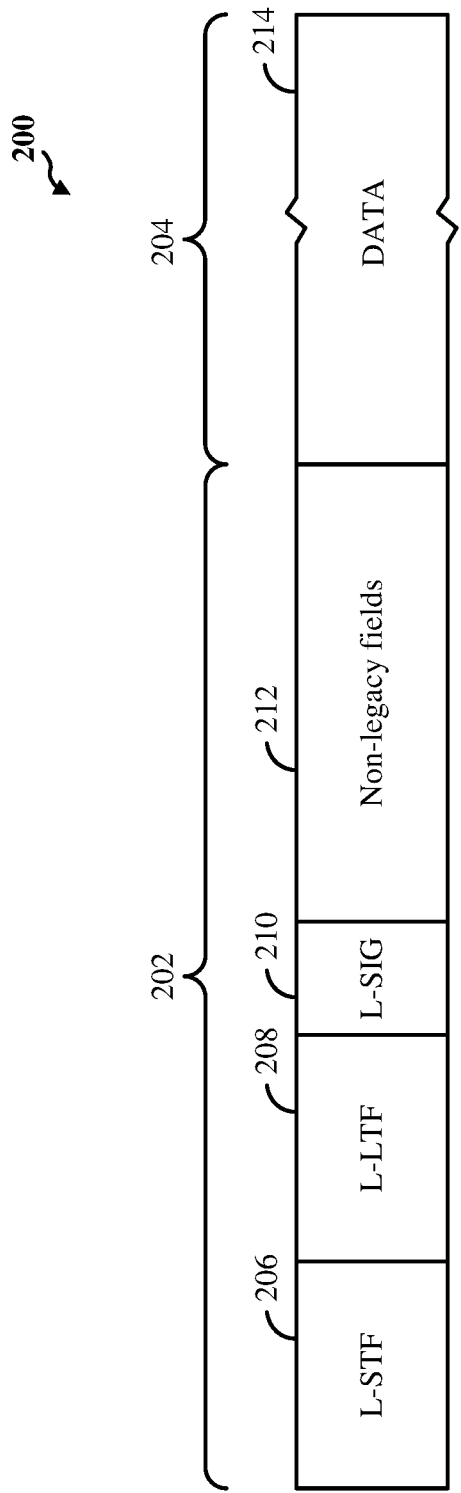
FIG. 2A shows an example protocol data unit (PDU) usable for communications between an access point (AP) and one or more wireless stations (STAs).

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
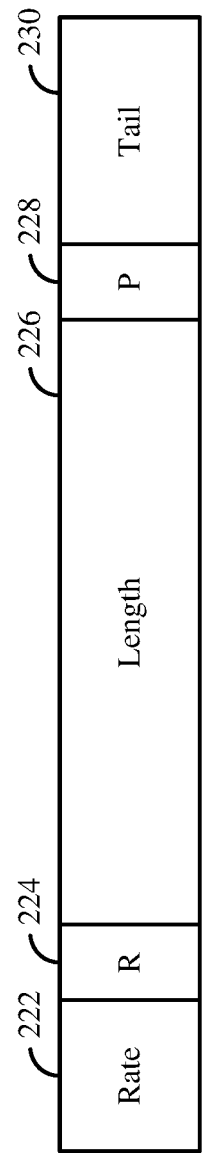
FIG. 2B shows an example field in the PDU of FIG. 2A.

FIG. 2B shows an example L-SIG field 220 in the PDU of FIG. 2A. The L-SIG 220 includes a data rate field 222, a reserved bit 224, a length field 226, a parity bit 228, and a tail field 220. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 220 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds ($\mu$s).

Figure 3A:
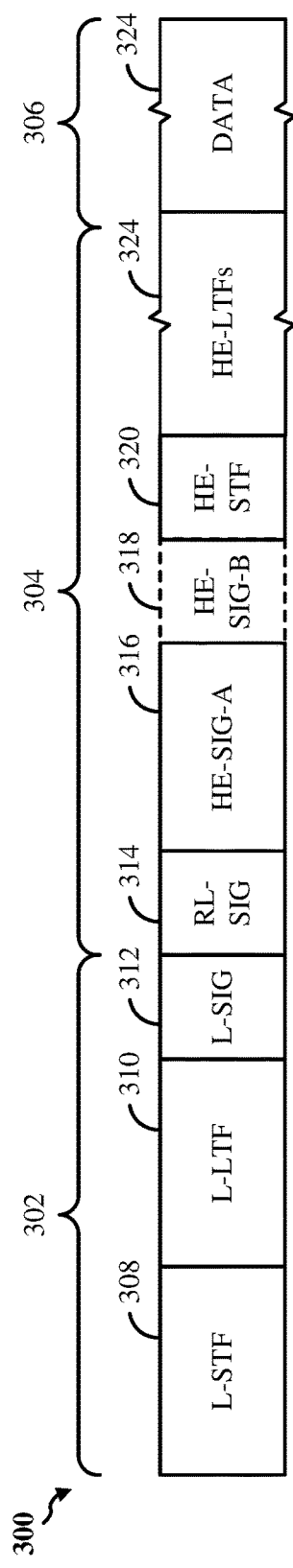
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
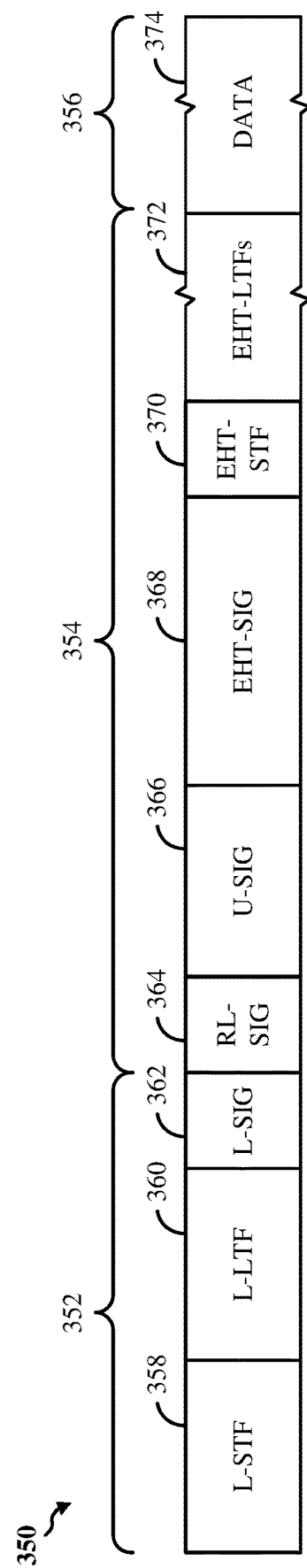
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
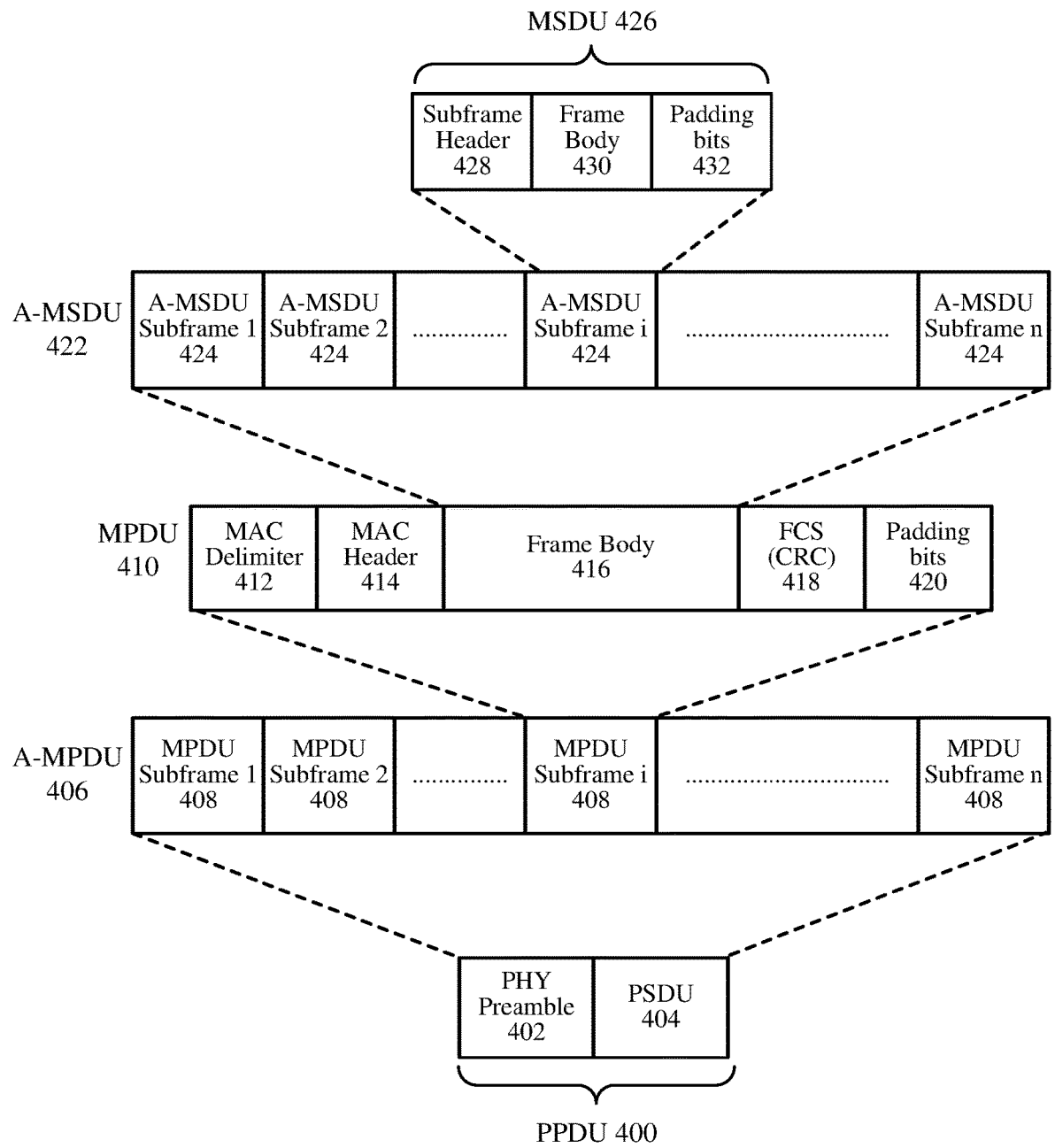
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 412 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
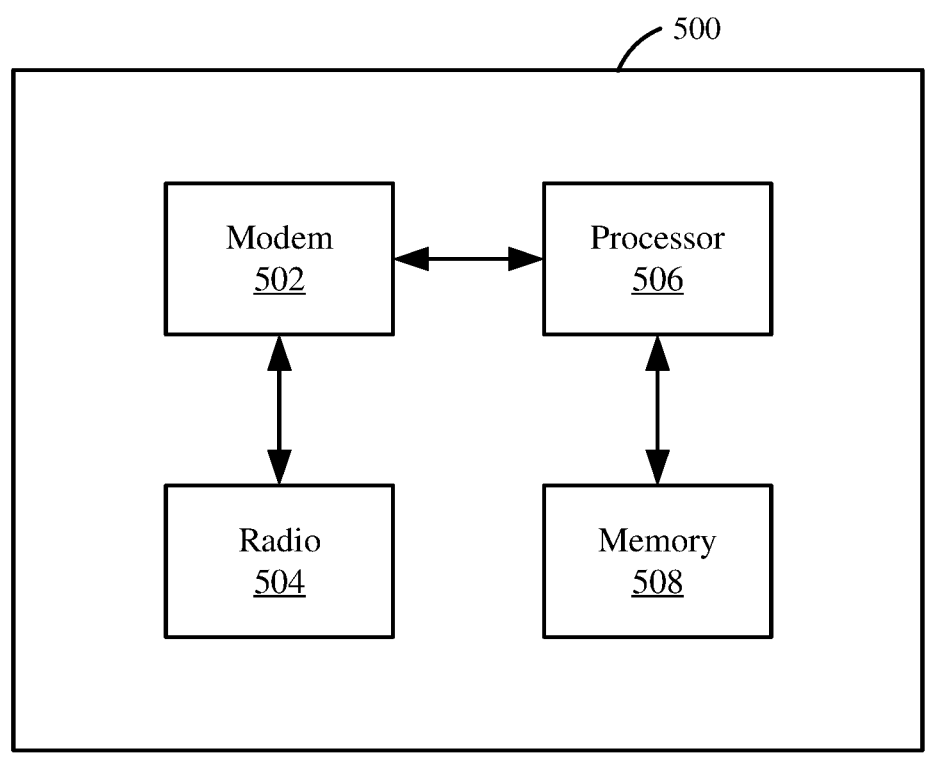
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements 506 (collectively "the processor 506"), and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
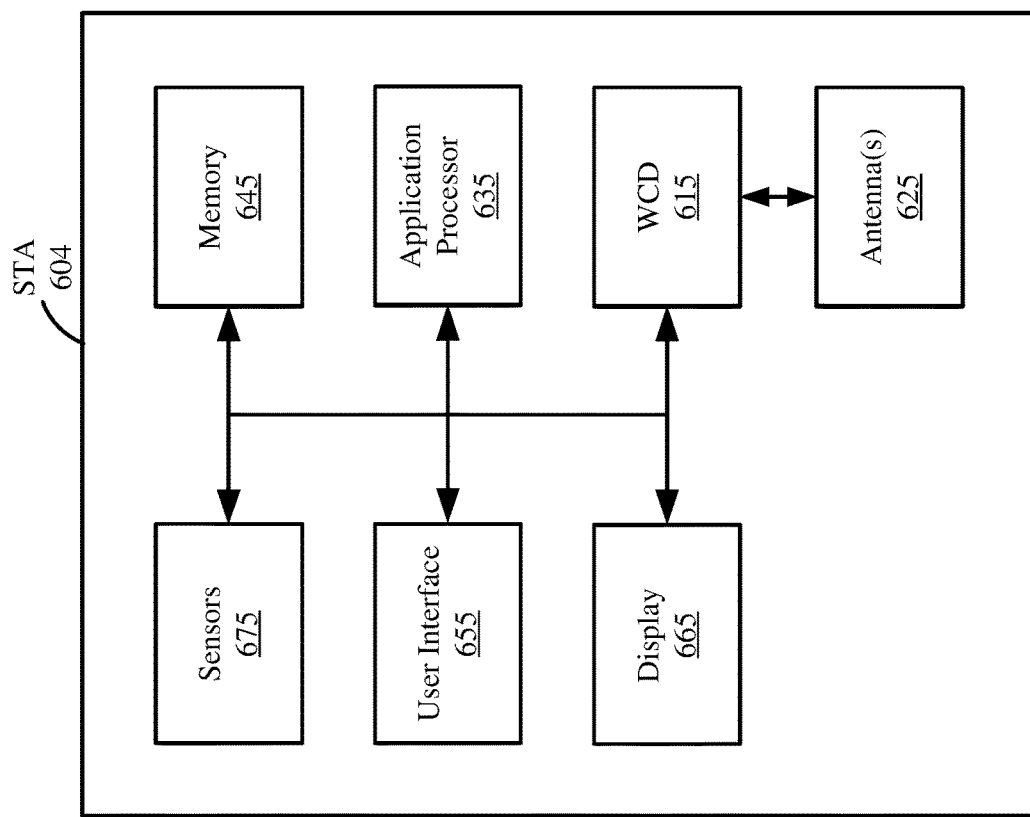
FIG. 6B shows a block diagram of an example station (STA).
Figure 6A:
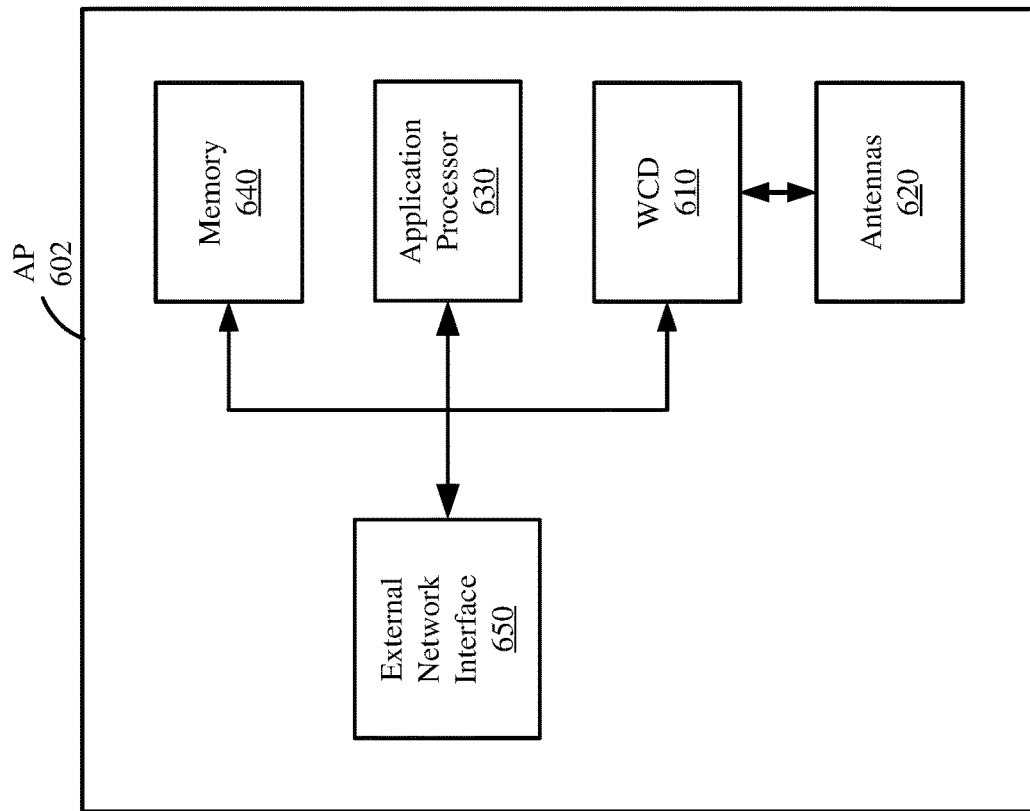
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As discussed, wireless STAs may have limited filtering capabilities, as compared to APs, that can allow the reception of UL data on one communication link to interfere with the transmission of DL data on another communication link. As a result, a STA that operates as an NSTR softAP MLD associated with a primary link and a non-primary link may not simultaneously receive UL data on the non-primary link and transmit DL data on the primary link. Similarly, a STA that operates as an NSTR softAP MLD may not simultaneously receive UL data on the primary link and transmit DL data on the non-primary link.

Aspects of the present disclosure recognize the importance of reducing or eliminating cross-link interference associated with a NSTR softAP MLD. In some implementations, a NSTR softAP MLD associated with a primary link and a non-primary link may advertise the complete profiles of the primary and non-primary links on only the primary link. The NSTR softAP MLD may also advertise updates to one or more BSS parameters of the primary and non-primary links on only the primary link. Advertising the complete profiles of both links of an NSTR softAP MLD on the primary link may allow some wireless communication devices operating on the primary link to discover and associate with the NSTR softAP MLD on one or both of the primary and non-primary links without scanning or probing the non-primary link. In some implementations, non-legacy devices operating on the primary link may be able to decode or parse the complete profiles of both the primary and non-primary links, while legacy devices operating on the primary link may be able to decode or parse only the complete profile of the primary link. As a result, legacy devices operating on the primary link may not be able to discover or associate with the NSTR softAP MLD on the non-primary link. Moreover, by not advertising the complete profile of either link on the non-primary link, legacy devices operating on the non-primary link may not be able to discover or associate with the NSTR softAP MLD on the non-primary link. In this way, various aspects of the subject matter disclosed herein may limit communications between the NSTR softAP MLD and legacy devices to the primary link.

Various aspects of the subject matter described in this disclosure can be implemented to realize one or more of the following potential advantages. By limiting communications between a NSTR softAP MLD and legacy devices to the primary link (and thereby precluding legacy devices from communicating with the NSTR softAP MLD on the non-primary link), the NSTR softAP MLD may prevent legacy devices from transmitting UL data on the non-primary link while the NSTR softAP MLD is transmitting DL data to one or more associated devices on the primary link. In this way, implementations of the subject matter disclosed herein may reduce the likelihood that cross-link interference resulting from UL transmissions on the non-primary link degrades or otherwise interferes with DL transmissions from the NSTR softAP MLD on the primary link.

Figure 7A:
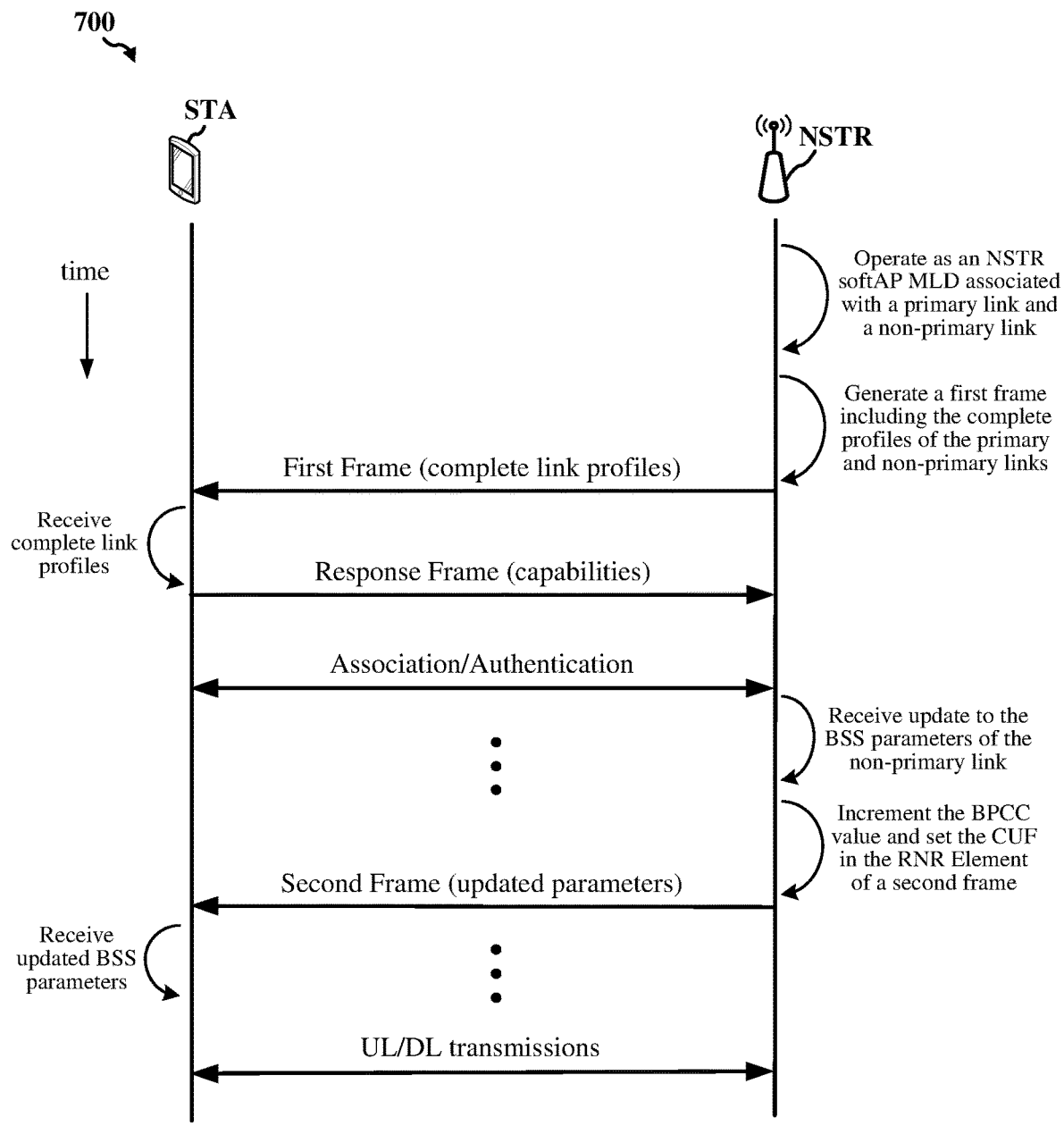
FIG. 7A shows a sequence diagram depicting an example wireless communication that supports a non-simultaneous transmit-receive (NSTR) soft access point (AP) multi-link device (MLD) according to some implementations.

FIG. 7A shows a sequence diagram depicting an example multi-link communication 700 according to some implementations. In the example of FIG. 7A, the multi-link communication 700 may be performed between a STA operating as an NSTR softAP MLD and one or more associated STAs (only one associated STA shown for simplicity). The STAs may be any suitable wireless communication device including, for example, the STAs 104 and 604 described above with reference to FIGS. 1 and 6B, respectively. In some implementations, the NSTR softAP MLD may include a first AP associated with the primary link, and may include a second AP associated with the non-primary link. In some instances, the first and second APs may be softAPs implemented by the STA operating as the NSTR softAP MLD.

The NSTR softAP MLD may be configured to broadcast the complete profiles of the primary and non-primary links in one or more frames transmitted on only the primary link. Some wireless communication devices within range of the NSTR softAP MLD may thus obtain the complete profiles of both the primary and non-primary links while operating on the primary link. Specifically, in some instances, non-legacy devices that obtain the complete profiles of the primary and non-primary links may be able to associate with the NSTR softAP MLD on one or both of the primary and non-primary links, while legacy devices that receive the complete profiles broadcasted on the primary link may be able to associate with the NSTR softAP MLD only on the primary link. In this way, communications between legacy devices and the NSTR softAP MLD may be limited to the primary link, which in turn may reduce cross-link interference on the primary link caused by transmissions from legacy devices on the non-primary link.

In the example of FIG. 7A, the NSTR softAP MLD transmits, on only the primary link, a first frame that includes the complete profile of the primary link and indicates the complete profile of the non-primary link. In some implementations, the complete profile of a respective link may include at least a beacon interval, capability information, a service set identifier (SSID), supported rates, a timing synchronization function (TSF) value, and one or more additional fields or elements associated with discovery of the respective link. In some other implementations, the complete profile of a respective link may be defined to include all of the capabilities, operation parameters, and discovery information that would be included in a beacon frame or probe response broadcast by an AP operating a BSS on the respective link.

In some implementations, the primary link may be configured as a complete BSS, and the non-primary link may be configured as a pseudo-BSS that shares one or more capabilities and operation parameters with the primary link. For example, in some aspects, the non-primary link may have the same SSID, TSF value, and beacon interval as the primary link, and may thus inherit these values from the primary link. As such, the SSID, TSF value, and beacon interval of the non-primary link may not be included in the first frame. In this way, the size of the first frame may be reduced or minimized. Other capabilities and operation parameters of the non-primary link may be different than those of the primary link, and therefore may not be inherited from the primary link. Examples of such capabilities and operation parameters include (but are not limited to) EDCA parameters, bandwidth, number of spatial streams (NSS), puncturing patterns, BSSIDs, and MLD capabilities.

The first frame may be any suitable frame that can carry or indicate the complete profiles of both the primary and non-primary links. In some implementations, the first frame may be a beacon frame, a probe response frame, an association response frame, or a reassociation response frame. In some instances, the NSTR softAP MLD may also transmit fast initial link setup (FILS) discovery frames, traffic indication map (TIM) frames, and action frames such as notification frames on only the primary link. The NSTR softAP MLD may also transmit group-addressed frames (such as multi-cast frames) on only the primary link. In this way, the NSTR softAP MLD may limit communications with legacy devices to the primary link.

In some implementations, the first frame contains a frame body that includes a plurality of fields and elements followed by a Multi-Link (ML) Element. The plurality of fields and elements may carry the complete profile of the primary link. The ML Element may include a Per-STA Profile subelement that indicates the complete profile of the non-primary link. The ML Element may also include a Common Info field carrying a basic service set (BSS) Parameters Change Count (BPCC) field that indicates updates to one or more BSS parameters associated with the primary link. In some instances, one or more bits of a Multi-Link Control field or the Common Info field carried in the ML Element may indicate whether or not the first frame is transmitted from the first AP of the NSTR softAP MLD. For example, the one or more bits of the Multi-Link Control field or the Common Info field may be set to a first value to indicate that the first frame is transmitted from the first AP of the NSTR softAP MLD, or may be set to a second value to indicate that the first frame is transmitted from an AP associated with an AP MLD (or other simultaneous transmit-receive (STR) device).

The body of the first frame may also include a Reduced Neighbor Report (RNR) Element carrying a Neighbor AP Information field associated with the non-primary link. The Neighbor AP Information field may carry a target beacon transmission time (TBTT) Information field consisting of a basic service set identification (BSSID) and one or more MLD parameters of the non-primary link. As discussed, the non-primary link may be configured as a pseudo-BSS that inherits some capabilities and operation parameters from the primary link, and thus the TBTT Information field associated with the non-primary link may not include one or more subfields such as (but not limited to) the TBTT offset subfield, the short-SSID subfield, the BSS parameters subfield, and the PSD subfield. The omission of these subfields may decrease the size or length of the TBTT Information field in the Neighbor AP Information field associated with the non-primary link, as compared with TBTT Information fields in Neighbor AP Information fields associated with other communication links. As such, the size or length of the TBTT Information field in the Neighbor AP Information field associated with the non-primary link can be used by a receiving STA to determine whether the first frame is transmitted from the first AP of the NSTR softAP MLD. In some aspects, the TBTT Information field associated with the non-primary link consists of a 6-octet BSSID field and a 3-octet MLD parameters field, and has a length of 9 octets.

In some implementations, the Neighbor AP Information field may include a TBTT Information Field Type set to a value indicating that the Neighbor AP Information field carries only information associated with the non-primary link. In some instances, the Neighbor AP Information field may be of a new or undefined type, and the TBTT Information Field Type may be set to 1 or a reserved value to indicate the new or undefined type of TBTT Information field. In this way, a receiving STA may determine that the first frame is transmitted from the first AP of the NSTR softAP MLD by parsing the TBTT Information Field Type in the Neighbor AP Information field associated with the non-primary link. In some instances, non-legacy devices may be aware of the new type of TBTT Information field disclosed herein, and may thus obtain the complete profiles of both the primary and non-primary links from the first frame. Conversely, legacy devices may not understand the new type of TBTT Information field disclosed herein, and may thus ignore the TBTT Information field in the Neighbor AP Information field associated with the non-primary link. In this way, aspects of the subject matter disclosed herein may preclude at least some legacy devices from discovering the non-primary link based on information received on the primary link.

In some instances, the MLD parameters field of the TBTT Information field may include a basic service set (BSS) parameter change count (BPCC) field carrying a value that indicates updates to one or more BSS parameters associated with the non-primary link. In some other instances, a value indicating updates to the one or more BSS parameters associated with the non-primary link may be carried in another suitable field, element, or header of the first frame.

The STA receives the first frame transmitted by the NSTR softAP MLD on the primary link, and may parse the first frame to obtain the complete profiles of the primary and non-primary links. The STA may use the complete profile of the primary link to discover or associate with the NSTR softAP MLD on the primary link, and may use the complete profile of the non-primary link to discover or associate with the NSTR softAP MLD on the non-primary link. In some instances, the STA may transmit, on the primary link, a response frame that includes capability information, operation parameters, and other information that can be used for association and authentication procedures with the NSTR softAP MLD. After the STA is associated with the NSTR softAP MLD on the primary link, the STA and the NSTR softAP MLD may exchange data, control signals, and other information with each other on the primary link. For implementations in which the STA is a multi-radio device having STR capabilities, the STA may also associate with the NSTR softAP MLD on the non-primary link and exchange data, control signals, and other information with the NSTR softAP MLD on the non-primary link.

In some instances, one or more of the BSS parameters associated with the primary link may be changed or updated. Similarly, one or more of the BSS parameters associated with the non-primary link may be changed or updated. In some implementations, the BSS parameters of a respective communication link may include one or more of a Channel Switch Announcement (CSA) element, an extended Channel Switch Announcement (eCSA) element, an Enhanced Distributed Channel Access (EDCA) parameter, a Quiet period element, a Direct Sequence Spread Spectrum (DSSS) parameter set, a high-throughput (HT) operation element, a very high-throughput (VHT) operation element, a high-efficiency (HE) operation element, an extremely high-throughput (EHT) operation element, a Wide Bandwidth Channel Switch element, an Operating Mode Notification element, a Broadcast Target Wait Time (TWT) element, a BSS Color Change Announcement element, a Multi-User (MU) EDCA parameter set, a Spatial Reuse parameter set, or an uplink (UL) orthogonal frequency division multiple access (OFDMA) random access (UORA) parameter set.

In some implementations, the NSTR softAP MLD may generate and transmit, on only the primary link, a second frame that indicates updates to one or more BSS parameters of the primary link and updates to one or more BSS parameters of the non-primary link. Specifically, when the NSTR softAP MLD receives or determines an update to one or more BSS parameters of the primary link, the NSTR softAP MLD may increment a BPCC value associated with the primary link, and insert the incremented BPCC value in the BPCC subfield in the Common Info field of an ML Element carried in the second frame. When the NSTR softAP MLD receives or determines an update to one or more BSS parameters of the non-primary link, the NSTR softAP MLD may increment a BPCC value associated with the non-primary link, and insert the incremented BPCC value in the BPCC subfield of the MLD Parameters field in the Neighbor AP Information field of an RNR Element carried in the second frame. In some instances, the NSTR softAP MLD may also set the Critical Update Flag (CUF) carried in the Capability Information field of the second frame based on incrementing the BPCC value associated with the non-primary link.

The STA receives the second frame, and may parse the second frame to obtain the BSS parameter updates to the primary and non-primary links. In some implementations, the second frame may be one of a beacon frame, a probe response frame, an association response frame, or a reassociation response frame. In some instances, the second frame may include the updated BSS parameters of one or both of the primary and non-primary links. In other implementations, the second frame may be an action frame such as a Notification frame. In some aspects, the one or more updated BSS parameters of a respective communication link may be part of a partial profile of the respective communication link. For example, in some aspects, the NSTR softAP MLD may transmit, on the primary link, an unsolicited broadcast probe response frame carrying the partial profile of each communication link having one or more updated BSS parameters. Thereafter, the STA may transmit UL data to the NSTR softAP MLD on at least the primary link, and the NSTR softAP MLD may transmit DL data to the STA on at least the primary link.

Figure 7B:
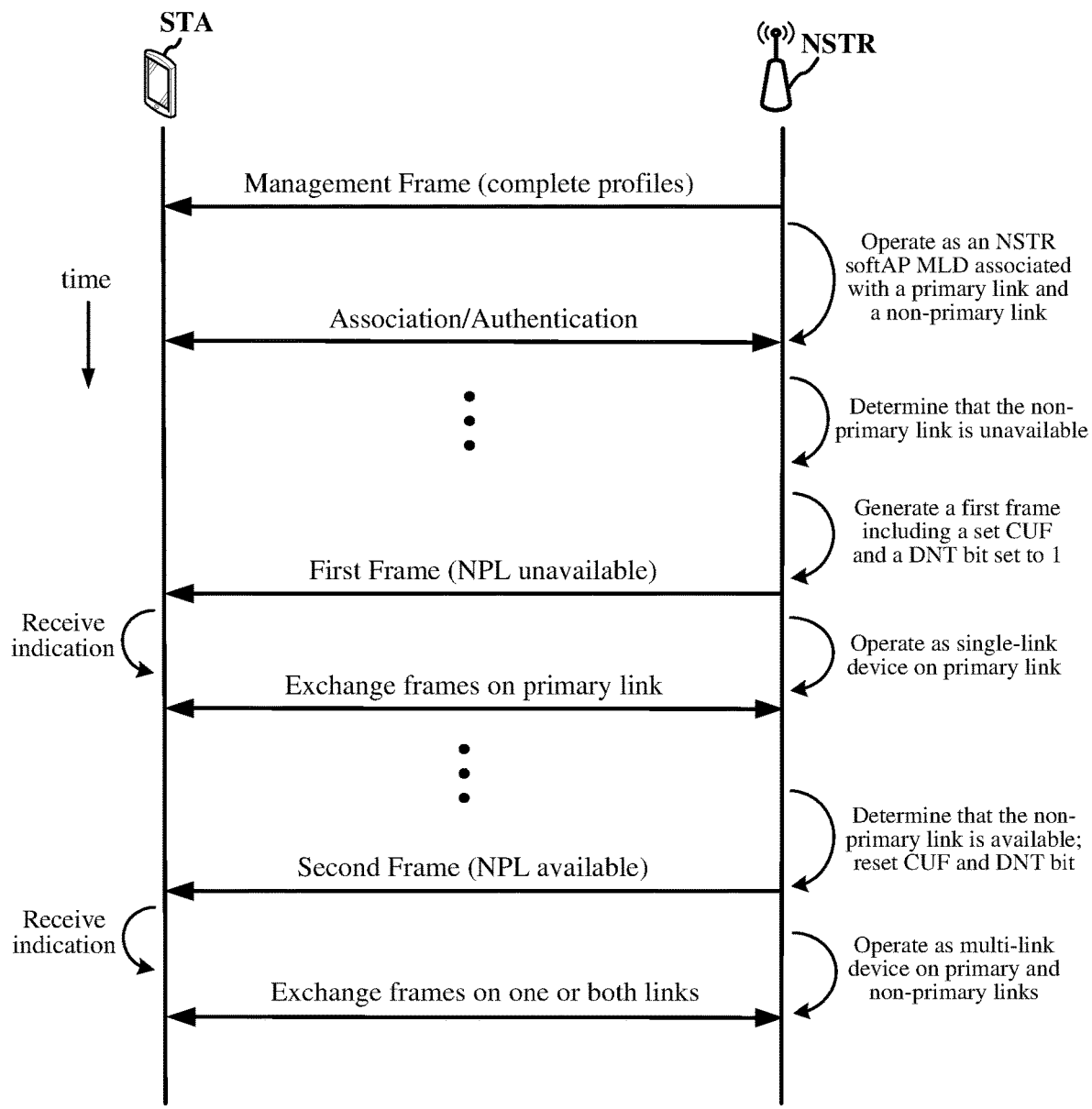
FIG. 7B shows a sequence diagram depicting another example wireless communication that supports an NSTR softAP MLD according to some implementations.

FIG. 7B shows a sequence diagram depicting another example multi-link communication 710 according to some implementations. In the example of FIG. 7B, the multi-link communication 710 may be performed between the NSTR softAP MLD and the one or more associated STAs described with reference to FIG. 7A (only one associated STA shown for simplicity). The NSTR softAP MLD may include a first AP associated with the primary link, and may include a second AP associated with the non-primary link. In some instances, the first and second APs may be softAPs implemented by the STA operating as the NSTR softAP MLD.

As discussed with reference to FIG. 7A, the NSTR softAP MLD may broadcast the complete profiles of the primary and non-primary links on only the primary link. Broadcasting the complete profiles of both links on only the primary link may allow non-legacy devices to discover and associate with the NSTR softAP MLD on one or both of the primary and non-primary links, and may preclude legacy devices from discovering and associating with the NSTR softAP MLD on the non-primary link.

In some instances, the NSTR softAP MLD may determine that the non-primary link is unavailable. The non-primary link may be unavailable for multi-link communications between the NSTR softAP MLD and its associated STAs for a variety of reasons. For example, the non-primary link may be unavailable when the non-primary link is used for a cellular link in a Long Term Evolution (LTE) radio access network (RAN) or a fifth-generation (5G) new radio (NR) access network. For another example, the non-primary link may be unavailable when the non-primary link is placed in a power save mode (including a sleep mode or doze mode) to reduce power consumption or to extend the battery life of the STA operating as the NSTR softAP MLD. For another example, the non-primary link may be unavailable when the non-primary link is used for peer-to-peer (P2P) or infra-STA communications.

Aspects of the present disclose recognize that the primary link may be better suited for informing STAs associated with the NSTR softAP MLD of the unavailability of the non-primary link. In some implementations, the NSTR softAP MLD may generate a first frame including Critical Update Flag (CUF) set to 1 and a Do Not Transmit (DNT) bit set to 1 based on the unavailability of the non-primary link. In some instances, the CUF may be carried in the Capability Information field of the first frame, and the DNT bit may be carried in a Per-STA Profile subelement or an RNR Element of the first frame.

The NSTR softAP MLD may transmit the first frame on only the primary link to the STA (and to other associated devices operating on the primary link). In some implementations, the NSTR softAP MLD may operate as a single-link device on the primary link based on the unavailable non-primary link. For example, in some instances, the NSTR softAP MLD may place the softAP (or other transmit chains, receive chains, signal processing circuitry, and so on) associated with the non-primary link into a sleep state, a doze state, or a power-off state while remaining fully operational on the primary link. In this single-link state, the NSTR softAP MLD can operate the BSS as a single-link BSS on the primary link while reducing (or nearly eliminating) power consumption associated with operating on the non-primary link.

The STA receives the first frame, and may parse the first frame to obtain the indication that the non-primary link is unavailable. In some instances, the first frame may be one of a beacon frame, a probe response frame, an association response frame, or a reassociation response frame. In other instances, the first frame may be an action frame such as a Notification frame. While the NSTR softAP MLD operates as a single-link device on the primary link, the NSTR softAP MLD and its associated STAs may exchange frames with each other on only the primary link.

The non-primary link may become available while the NSTR softAP MLD operates as a single-link device on the primary link. The NSTR softAP MLD may determine that the non-primary link is available, and may transmit an indication that the non-primary link is available. In some instances, the NSTR softAP MLD may reset the DNT bit associated with the non-primary link, and may transmit, on only the primary link, a second frame carrying at least the reset DNT bit. In some implementations, the NSTR softAP MLD may operate as a multi-link device on the primary and non-primary links based on determining that the non-primary link is available. For example, the NSTR softAP MLD may return the softAP (or other transmit chains, receive chains, signal processing circuitry, and so on) associated with the non-primary link to a fully operational state. In this multi-link state, the NSTR softAP MLD can operate the BSS on both the primary and non-primary links.

The STA receives the second frame, and may parse the second frame to obtain the indication that the non-primary link is available. In some instances, the second frame may be one of a beacon frame, a probe response frame, an association response frame, or a reassociation response frame. In other instances, the second frame may be an action frame such as a Notification frame. Thereafter, the NSTR softAP MLD and its associated STAs may exchange frames with each other on one or both of the primary and non-primary links.

In some implementations, determining the unavailability of the non-primary link may include or may be associated with placing the non-primary link into a power save state (including a sleep state or doze state), which may reduce power consumption and extend the battery life of the NSTR softAP MLD. In some other implementations, determining the unavailability of the non-primary link may include or may be associated with disabling the non-primary link. In some instances, the NSTR softAP MLD may disable the non-primary link by removing the non-primary link from the multi-link context associated with the primary and non-primary links, thereby preventing its associated STAs from using the non-primary link. When the non-primary link becomes available, the NSTR softAP MLD may return or add the non-primary link to the multi-link context, thereby allowing its associated STAs to use the non-primary link (in addition to the primary link). In some aspects, the NSTR softAP MLD may transmit a first Notification frame on the primary link to indicate that the non-primary link is no longer included in the multi-link context, and may transmit a second Notification frame on the primary link to indicate that the non-primary link has been added to the multi-link context. In some other instances, the NSTR softAP MLD may disable the non-primary link by re-mapping traffic identifiers (TIDs) from the non-primary link to the primary link. When the non-primary link becomes available, the NSTR softAP MLD may re-map the TIDs from the primary link to the non-primary link. In some aspects, the NSTR softAP MLD may transmit a first Notification frame on the primary link to indicate that the TIDs affiliated with the non-primary link have been re-mapped to the primary link, and may transmit a second Notification frame on the primary link to indicate that some TIDs affiliated with the primary link have been re-mapped to the non-primary link.

Figure 8A:
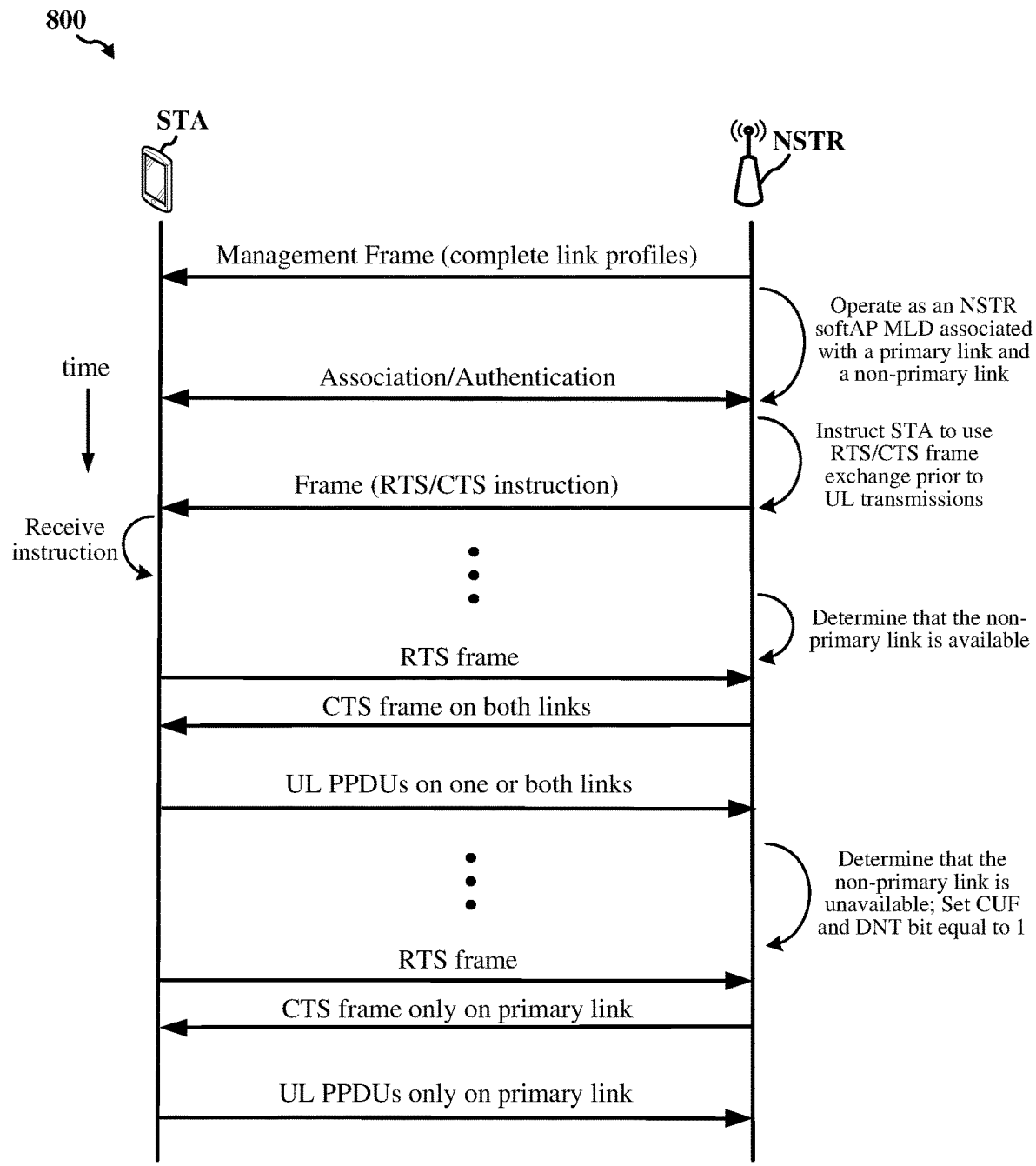
FIG. 8A shows a sequence diagram depicting an example wireless communication that supports an NSTR softAP MLD according to some other implementations.

FIG. 8A shows a sequence diagram depicting an example multi-link communication 800 according to some other implementations. In the example of FIG. 8A, the multi-link communication 800 may be performed between the NSTR softAP MLD and the one or more associated STAs described with reference to FIGS. 7A and 7B (only one associated STA shown for simplicity). The NSTR softAP MLD may include a first AP associated with the primary link, and may include a second AP associated with the non-primary link. In some instances, the first and second APs may be softAPs implemented by the STA operating as the NSTR softAP MLD.

As discussed, the NSTR softAP MLD may advertise the complete profiles of both the primary and non-primary links in one or more frames transmitted on only the primary link. As such, non-legacy devices may be able to discover the non-primary link while operating on the primary link, and legacy devices operating on either the primary link or the non-primary link may not be able to discover the non-primary link associated with the NSTR softAP MLD. In this way, communications between the NSTR softAP MLD and legacy devices may be limited to the primary link, which in turn may reduce the likelihood of an UL transmission on the non-primary link while the NSTR softAP MLD is transmitting DL data to one or more associated devices on the primary link. This, in turn, may prevent or reduce cross-link interference on DL transmissions on the primary link resulting from concurrent UL transmissions on the non-primary link.

As discussed, the NSTR softAP MLD may transmit, on only the primary link, a management frame that includes the complete profile of the primary link and indicates the complete profile of the non-primary link. The STA receives the management frame, and may use the complete profile of the primary link to associate and authenticate with the NSTR softAP MLD on the primary link. In some instances, the STA may use the complete profile of the non-primary link to associate and authenticate with the NSTR softAP MLD on the non-primary link.

In some implementations, the NSTR softAP MLD may instruct the STA to exchange ready-to-send (RTS) and clear-to-send (CTS) frames with the NSTR softAP MLD prior to transmitting UL data to the NSTR softAP MLD. In some instances, the NSTR softAP MLD may transmit, on the primary link, a frame including an instruction to perform an RTS/CTS frame exchange prior to transmitting UL data to the NSTR softAP MLD. In some other instances, the NSTR softAP MLD may instruct the STA to perform an RTS/CTS frame exchange prior to transmitting UL data to the NSTR softAP MLD during association with the NSTR softAP MLD.

The STA receives the instruction. At a later time, such as when the STA has queued UL data to transmit, the STA may transmit an RTS frame on the primary link to the NSTR softAP MLD. The NSTR softAP MLD receives the RTS frame, determines that the non-primary link is available, and transmits a CTS frame to the STA on both the primary and non-primary links. The STA receives the CTS frame on both the primary and non-primary links, and determines that the non-primary link is available based on receiving the CTS frame on both the primary and non-primary links. The STA transmits one or more UL PPDUs on one or both of the primary and non-primary links to the NSTR softAP MLD. In some instances, the transmission of the CTS frame to the STA on both the primary and non-primary links may allow the STA to link the non-primary link and the primary link together.

The NSTR softAP MLD may later determine that the non-primary link is unavailable. In some implementations, the NSTR softAP MLD may set the CUF equal to 1 and may set the DNT bit equal to 1 based on determining that the non-primary link is unavailable. In some instances, the NSTR softAP MLD may indicate the unavailability of the non-primary link by transmitting a CTS frame on only the primary link based on receiving an RTS frame from the STA. For example, when the STA has queued UL data, the STA transmits another RTS frame on the primary link to the NSTR softAP MLD. The NSTR softAP MLD receives the RTS frame, and transmits a CTS frame to the STA on only the primary link based on the unavailability of the non-primary link. The STA receives the CTS frame, and determines that the non-primary link is unavailable based on receiving the CTS frame on only the primary link. The STA transmits one or more UL PPDUs to the NSTR softAP MLD on only the primary link.

In some other implementations, the NSTR softAP MLD may perform a channel switch operation based on determining that the non-primary link is unavailable. For example, in some instances, the NSTR softAP MLD may switch the primary link from a first wireless channel to a second wireless channel concurrently with switching the non-primary link from the second wireless channel to the first wireless channel. In some aspects, the first wireless channel may be located in the 6 GHz frequency band and the second wireless channel may be located in the 5 GHz frequency band. In other aspects, the first wireless channel may be located in the 5 GHz frequency band and the second wireless channel may be located in the 6 GHz frequency band. In some other aspects, the first wireless channel may be located in one of the 2.4 GHz frequency band, the 5 GHz frequency band, or the 6 GHz frequency band, and the second wireless channel may be located in another of the 2.4 GHz frequency band, the 5 GHz frequency band, or the 6 GHz frequency band.

The NSTR softAP MLD may use any suitable rules or mechanisms to concurrently switch the channels of the primary and non-primary links. In some implementations, the NSTR softAP MLD may use the Channel Switch Announcement (CSA) element or the extended Channel Switch Announcement (eCSA) element carried in the body of management frames (such as beacon frames, probe response frames, association response frames, or reassociation response frames) transmitted on the primary link when performing channel switch operations.

Figure 8B:
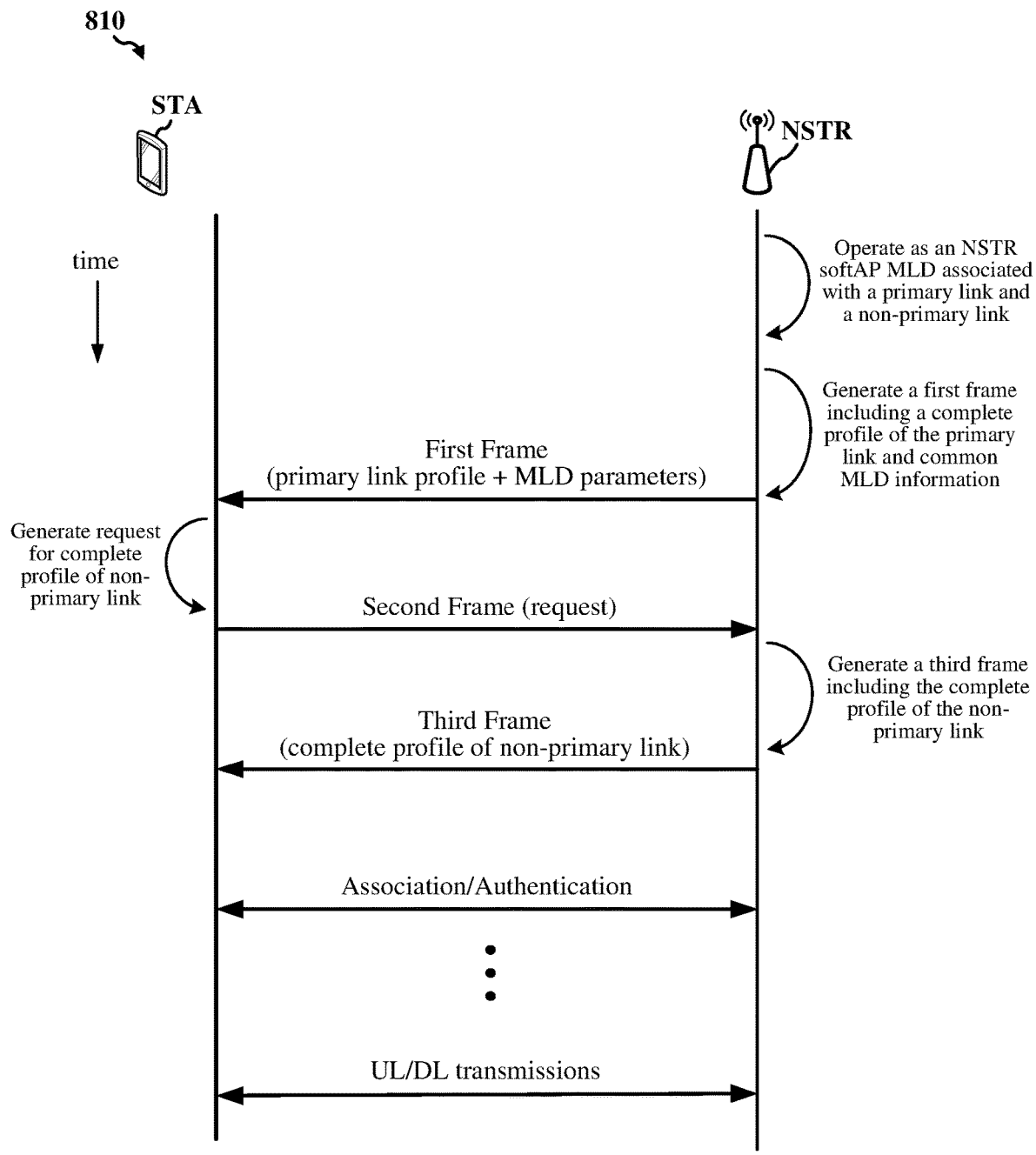
FIG. 8B shows a sequence diagram depicting another example wireless communication that supports an NSTR softAP MLD according to some other implementations.

FIG. 8B shows a sequence diagram depicting another example multi-link communication 810 according to some other implementations. In the example of FIG. 8B, the multi-link communication 810 may be performed between the NSTR softAP MLD and the one or more associated STAs described with reference to FIGS. 7A and 7B (only one associated STA shown for simplicity). The NSTR softAP MLD may include a first AP associated with the primary link, and may include a second AP associated with the non-primary link. In some instances, the first and second APs may be softAPs implemented by the STA operating as the NSTR softAP MLD. As discussed, the NSTR softAP MLD may advertise the profiles of both the primary and non-primary links on only the primary link.

In some implementations, the NSTR softAP MLD transmits, on only the primary link, a first frame that includes the complete profile of the primary link and MLD information that is common to the primary and non-primary links. In some instances, the first frame may contain a frame body that includes a plurality of fields and elements followed by an ML Element. The plurality of fields and elements may carry the complete profile of the primary link. The ML Element may consist of the MLD common information. That is, the ML Element carried in the first frame may not include link information pertaining to the non-primary link. In some instances, the MLD common information may include (but is not limited to) an MLD Medium Access Control (MAC) Address field, a Link ID Info field, a BPCC field, a Synchronization Delay field, an Enhanced Multi-Link (EML) Capabilities field, and an MLD Capabilities field. The MLD MAC Address field may include the MAC address of the NSTR softAP MLD. The BPCC field may indicate updates to one or more BSS parameters associated with the primary link.

The STA receives the first frame transmitted on the primary link, and may parse the first frame to obtain the complete profile of the primary link and the MLD common information. The STA may use the complete profile of the primary link to discover or associate with the NSTR softAP MLD on the primary link, and may use the MLD common information to determine whether or not to request the complete profile of the non-primary link from the AP MLD.

The STA transmits, on the primary link, a second frame that includes a request for the complete profile of the non-primary link. In some instances, the second frame may be a probe request frame. In other instances, the second frame may be an association request frame. In some other instances, the second frame may be a reassociation request frame.

The NSTR softAP MLD receives the second frame, and parses the request for the complete profile of the non-primary link. In response to the request, the NSTR softAP MLD transmits, on only the primary link, a third frame that indicates the complete profile of the non-primary link. In some implementations, the body of the third frame may include an ML Element and an RNR Element. The ML Element may carry a Per-STA Profile subelement that indicates the complete profile of the non-primary link. The RNR Element may include a Neighbor AP Information field associated with the non-primary link that consists of the BSSID and one or more MLD parameters of the non-primary link. In some instances, the MLD parameters field of the TBTT Information field carried in the Neighbor AP Information field may include a PBCC field carrying a value indicating whether or not any of the BSS parameters of the non-primary link have been updated. In some other instances, a value indicating whether or not any of the BSS parameters of the non-primary link have been updated may be carried in another suitable field, element, or header of the third frame.

As discussed with reference to FIG. 7A, the primary link may be configured as a complete BSS, and the non-primary link may be configured as a pseudo-BSS that shares at least some capabilities and operation parameters with the primary link. In some instances, the non-primary link may have the same SSID, TSF value, and beacon interval as the primary link, and may inherit these values from the primary link. The non-primary link may also inherit the TBTT offset, short-SSID, BSS parameters, and PSD limits of the primary link. As such, the TBTT offset, short-SSID, BSS parameters, and PSD subfields may be absent from the TBTT Information field carried in the Neighbor AP Information field associated with the non-primary link, thereby reducing the length or size of the corresponding RNR Element.

In various implementations, the first frame may be a beacon frame, a probe response frame, an association response frame, or a reassociation response frame. The second frame may be a probe request frame, an association request frame, or a reassociation request frame. The third frame may be a probe response frame, an association response frame, or a reassociation response frame.

Figure 9A:
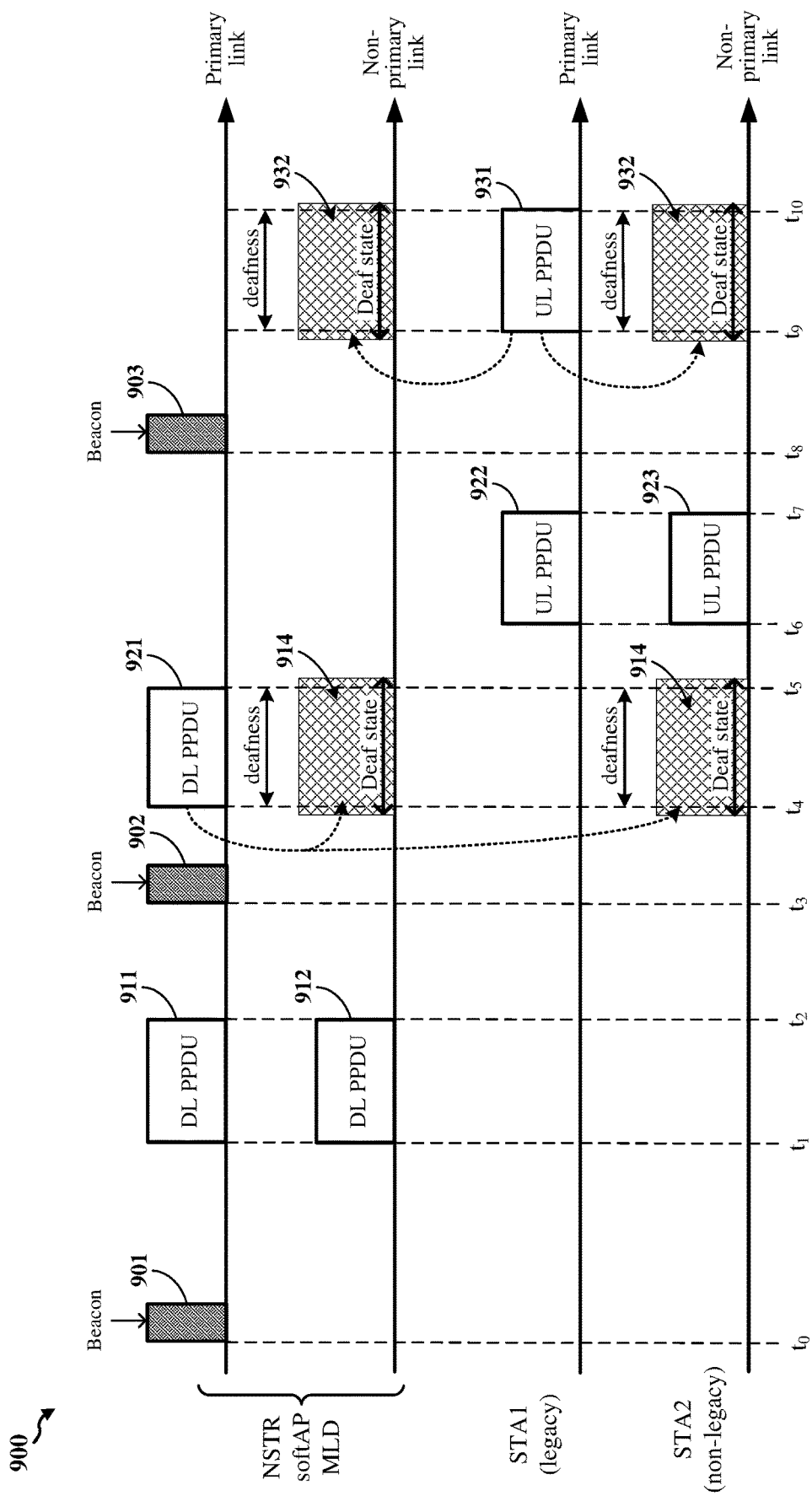
FIG. 9A shows a timing diagram depicting an example wireless communication that supports an NSTR softAP MLD according to some implementations.

FIG. 9A shows a timing diagram depicting an example multi-link communication 900 according to some implementations. In the example of FIG. 9A, the multi-link communication 900 may be performed between the NSTR softAP MLD described with reference to FIG. 7A, 7B, 8A, or 8B and two associated wireless stations STA1 and STA2. The STAs may be any suitable wireless communication devices including, for example, the STAs 104 and 604 described above with reference to FIGS. 1 and 6B, respectively. The NSTR softAP MLD may include a first AP associated with the primary link, and may include a second AP associated with the non-primary link. In some instances, the first and second APs may be softAPs implemented by the STA operating as the NSTR softAP MLD. In some implementations, STA1 is a legacy device configured to operate in accordance with the IEEE 802.11ax or earlier amendments to the 802.11 family of wireless communication standards, and STA2 is a non-legacy device configured to operate in accordance with the IEEE 802.11be or later amendments to the 802.11 family of wireless communication standards.

Prior to time $t_0$, the NSTR softAP MLD contends for channel access to the primary link using a suitable channel access mechanism (such as an EDCA mechanism), and obtains a transmission opportunity (TXOP) on the primary link. After obtaining the TXOP on the primary link, the NSTR softAP MLD may also gain channel access to the non-primary link. In some instances, gaining channel access to the non-primary link may be based on obtaining channel access or a TXOP on the primary link. In some implementations, the NSTR softAP MLD may limit transmissions on the non-primary link to individually-addressed frames.

At time $t_0$, the NSTR softAP MLD transmits, on only the primary link, a first beacon frame 901 that includes the complete profile of the primary link and indicates the complete profile of the non-primary link. The primary link may be configured as a complete BSS, and the non-primary link may be configured as a pseudo-BSS that inherits one or more capabilities and operation parameters from the primary link. For example, in some aspects, the non-primary link may inherit the SSID, the TSF value, and the beacon interval from the primary link.

The beacon frame 901 contains a frame body that includes a plurality of fields and elements followed by an ML Element. The plurality of fields and elements may carry the complete profile of the primary link. The ML Element may carry a Per-STA Profile subelement that indicates the complete profile of the non-primary link. The ML Element may include a Common Info field carrying a BPCC field that indicates updates to one or more BSS parameters associated with the primary link. In some instances, one or more bits of a Multi-Link Control field or the Common Info field carried in the ML Element may indicate whether or not the first beacon frame 901 is transmitted from the first AP of the NSTR softAP MLD. For example, the one or more bits of the Multi-Link Control field or the Common Info field may be set to a first value to indicate that the first beacon frame 901 is transmitted from the first AP of the NSTR softAP MLD, or may be set to a second value to indicate that the first beacon frame 901 is transmitted from an AP associated with a simultaneous transmit-receive (STR) device (such as an AP MLD).

The first beacon frame 901 may also include an RNR Element carrying a Neighbor AP Information field associated with the non-primary link. The Neighbor AP Information field may carry a TBTT Information field consisting of the BSSID and one or more MLD parameters of the non-primary link. In some instances, the MLD parameters field of the TBTT Information field may include a BPCC field carrying a value that indicates updates to one or more BSS parameters associated with the non-primary link. In some other instances, one or more values indicating updates to the one or more BSS parameters associated with the non-primary link may be carried in another suitable field, element, or header of the first beacon frame 901.

STA1 and STA2 receive the first beacon frame 901 on the primary link, and may parse the first beacon frame 901 to obtain the complete profiles of the primary and non-primary links. In some implementations, each of STA1 and STA2 can parse or decode the complete profile of the primary link carried in the fields and elements contained in the body of the first beacon frame 901. As a non-legacy device, STA2 may also be able to parse or decode the complete profile of the non-primary link indicated in the ML Element of the first beacon frame 901. As a legacy device, STA1 may not be able to parse or decode one or more portions of the ML Element carried in the first beacon frame 901, and thus may not be able to obtain the capabilities, operation parameters, and other discovery information associated with the non-primary link from the first beacon frame 901. STA1 may also be unable to parse or decode one or more portions of the RNR Element carried in the first beacon frame 901. Thus, while STA2 may be able to discover and associate with the NSTR softAP MLD on both the primary and non-primary links using information obtained from the first beacon frame 901, STA1 can discover and associate with the NSTR softAP MLD on only the primary link using information obtained from the first beacon frame 901. In this way, communications between the NSTR softAP MLD and STA1 (and other legacy devices associated with the NSTR softAP MLD) may be limited to the primary link.

At time $t_1$, the NSTR softAP MLD transmits a first DL PPDU 911 on the primary link to STA1 and transmits a second DL PPDU 912 on the non-primary link to STA2, concurrently. In some instances, the NSTR softAP MLD may use a first group of antenna resources to transmit the DL PPDU 911 on the primary link to a first group of STAs (such as STA1), and may use a second group of antenna resources to transmit the DL PPDU 912 on the non-primary link to a second group of STAs (such as STA2).

Between times $t_1$ and $t_2$, STA1 receives the first DL PPDU 911 on the primary link, and STA2 receives the second DL PPDU 912 on the non-primary link. The concurrent transmission of DL PPDUs 911 and 912 on the primary and non-primary links may prevent wireless communication devices associated with the NSTR softAP MLD (such as STA1 and STA2) from transmitting UL data to the NSTR softAP MLD on the primary and non-primary links between times $t_1$ and $t_2$.

In some instances, the NSTR softAP MLD contends for channel access to the primary link between times $t_2$ and $t_3$ using a suitable channel access mechanism to obtain another TXOP on the primary link. After obtaining the TXOP on the primary link, the NSTR softAP MLD may gain channel access to and obtain a TXOP on the non-primary link. In some other instances, the NSTR softAP MLD may retain the TXOPs obtained on the primary and non-primary links between times $t_0$ and $t_1$, and may not have to contend for channel access between times $t_2$ and $t_3$.

At time $t_3$, the NSTR softAP MLD transmits a second beacon frame 902 on only the primary link. In some implementations, the second beacon frame 902 may be similar to the first beacon frame 901, for example, by carrying the complete profile of the primary link and indicating the complete profile of the non-primary link. In some other implementations, the second beacon frame 902 may include less information than the first beacon frame 901. For example, in some instances, the second beacon frame 902 may carry or indicate a partial profile of one or both of the primary and non-primary links. In some other instances, the second beacon frame 902 may carry the complete or partial profile of the primary link, and may not include the capabilities or operation parameters of the non-primary link. In some implementations, the second beacon frame 902 may be similar to the first frame described with reference to FIG. 8B, for example, by carrying or indicating only the BSSID and MLD common parameters of the non-primary link.

At time $t_4$, the NSTR softAP MLD transmits a DL PPDU 921 to STA1 on the primary link. STA1 may receive the DL PPDU 921 on the primary link between times $t_4$ and $t_5$. Aspects of the present disclosure recognize that cross-link interference resulting from the transmission of DL PPDU 921 on the primary link can cause a period of "deafness" on the non-primary link during which the NSTR softAP MLD may be unable to receive or properly decode UL transmissions on the non-primary link. In some implementations, the NSTR softAP MLD may cause the non-primary link to enter into a deaf state 914 during transmission of DL PPDU 921 on the primary link. When in the deaf state 914, the non-primary link may not be available for communications between the NSTR softAP MLD and its associated STAs. Specifically, in some aspects, STA2 (and other wireless communication devices associated with the NSTR softAP MLD) may not be permitted to transmit UL data on the non-primary link during the deaf state 914. In this way, UL transmissions that the NSTR softAP MLD may not be able to receive or properly decode due to cross-link interference resulting from the transmission of DL PPDU 921 on the primary link may be prevented or delayed until after the DL transmission ends.

The deaf state 914 may be of any suitable duration of time. In some instances, the duration of the deaf state 914 may be temporally aligned with the transmit duration of DL PPDU 921 on the primary link. In some other instances, the duration of the deaf state 914 may include a guard time, followed by the transmit duration of DL PPDU 921, followed by another guard time. Other durations of time may be suitable for the deaf state 914. In some implementations, the guard time may be selected to prevent (or to reduce by more than an amount) the effects of cross-link interference on DL communications transmitted on the non-primary link. For example, in some instances, the duration of the guard time may be configured to ensure that the first and last symbols of the DL PPDU 921 do not interfere with UL transmissions on the non-primary link.

After an end of the transmission of DL PPDU 921, the NSTR softAP MLD recovers the non-primary link from the deaf state 914. The NSTR softAP MLD may recover the non-primary link from the deaf state 914 using any suitable deafness recovery rules or mechanisms. In some implementations, the NSTR softAP MLD may transmit, on the primary link, an indication of the availability of the non-primary link based on recovering the non-primary link. In implementations for which the NSTR softAP MLD removed the non-primary link from the multi-link context when the non-primary link was placed into the deaf state 914 (and thus rendered unavailable), recovering the non-primary link from the deaf state 914 may include adding the non-primary link to the multi-link context. In some aspects, the NSTR softAP MLD may transmit a Notification frame on the primary link to indicate that the non-primary link has been added to the multi-link context. In implementations for which the NSTR softAP MLD re-mapped TIDs from the non-primary link to the primary link when the non-primary link was placed into the deaf state 914 (and thus rendered unavailable), recovering the non-primary link from the deaf state 914 may include re-mapping the TIDs from the primary link to the non-primary link. In some aspects, the NSTR softAP MLD may transmit a Notification frame on the primary link to indicate that some TIDs affiliated with the primary link have been re-mapped to the non-primary link.

At time $t_6$, STA1 transmits an UL PPDU 922 to the NSTR softAP MLD on the primary link, and STA2 transmits an UL PPDU 923 to the NSTR softAP MLD on the non-primary link. The NSTR softAP MLD receives the UL PPDUs 922 and 923 between times $t_6$ and $t_7$. The concurrent transmission of UL PPDUs 922 and 923 on the primary and non-primary links may prevent the NSTR softAP MLD from transmitting DL data on the primary and non-primary links between times $t_6$ and $t_7$, which may obviate the need to place the non-primary link into a deaf state between times $t_6$ and $t_7$.

In some instances, the NSTR softAP MLD contends for channel access to the primary link between times $t_7$ and $t_8$ using a suitable channel access mechanism to obtain another TXOP on the primary link. After obtaining the TXOP on the primary link, the NSTR softAP MLD may gain channel access to and obtain a TXOP on the non-primary link.

At time $t_8$, the NSTR softAP MLD transmits a third beacon frame 903 on only the primary link. In some implementations, the third beacon frame 903 may be similar to the first beacon frame 901, for example, by carrying the complete profile of the primary link and indicating the complete profile of the non-primary link. In some other implementations, the third beacon frame 903 may be similar to the second beacon frame 902, for example, by carrying less information than the first beacon frame 901.

At time $t_9$, STA1 transmits an UL PPDU 931 to the NSTR softAP MLD on the primary link. Between times $t_9$ and $t_{10}$, the NSTR softAP MLD receives the UL PPDU 931 on the primary link. Aspects of the present disclosure recognize that cross-link interference resulting from the transmission of UL PPDU 931 on the primary link can interference with DL transmissions on the non-primary link. In some implementations, the NSTR softAP MLD places the non-primary link in a deaf state 932 during transmission of UL PPDU 931 on the primary link. When in the deaf state 931, the non-primary link may not be available for communications between the NSTR softAP MLD and its associated STAs. In some implementations, the NSTR softAP MLD may not transmit DL data on the non-primary link during the deaf state 932. In this way, DL transmissions on the non-primary link that are susceptible to cross-link interference resulting from the transmission of UL PPDU 931 on the primary link may be prevented or delayed until after expiration of the deaf state 932. In some instances, STA2 (and other wireless communication devices associated with the NSTR softAP MLD) may not be permitted to transmit UL data on the non-primary link during the deaf state 932.

The deaf state 932 may be of any suitable duration of time. In some instances, the duration of the deaf state 932 may be temporally aligned with the transmit duration of UL PPDU 931 on the primary link. In some other instances, the duration of the deaf state 932 may include a guard time, followed by the transmit duration of UL PPDU 931, followed by another guard time. Other durations of time may be suitable for the deaf state 932. In some implementations, the guard time may be selected to prevent (or to reduce by more than an amount) the effects of cross-link interference on DL communications transmitted on the non-primary link. For example, in some instances, the duration of the guard time may be configured to ensure that DL transmissions on the non-primary link do not interfere with the first or last symbols of the UL PPDU 931. After an end of the transmission of the UL PPDU 931, or after expiration of the deaf state 932, the NSTR softAP MLD recovers the non-primary link from the deaf state 932.

Figure 9B:
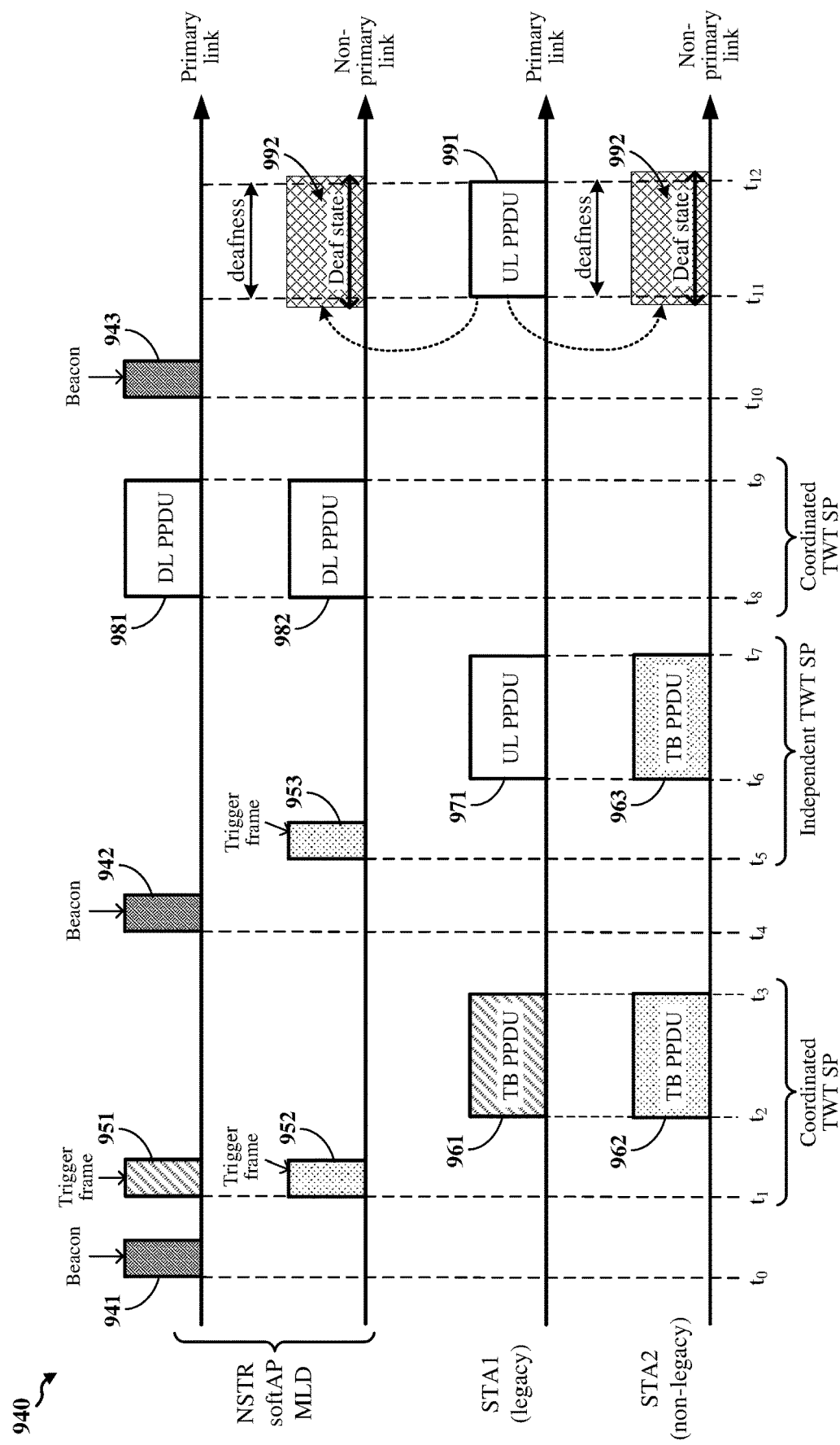
FIG. 9B shows a timing diagram depicting another example wireless communication that supports an NSTR softAP MLD according to some implementations.

FIG. 9B shows a timing diagram depicting an example multi-link communication 940 according to some other implementations. In some implementations, the multi-link communication 940 may be performed between the NSTR softAP MLD and the wireless stations STA1 and STA2 described with reference to FIG. 9A. In some other implementations, the multi-link communication 940 may be performed between the NSTR softAP MLD described with reference to FIG. 7A, 7B, 8A, or 8B and associated wireless stations STA1 and STA2. The STAs may be any suitable wireless communication devices including, for example, the STAs 104 and 604 described above with reference to FIGS. 1 and 6B, respectively. The NSTR softAP MLD may include a first AP associated with the primary link, and may include a second AP associated with the non-primary link. In some instances, the first and second APs may be softAPs implemented by the STA operating as the NSTR softAP MLD. As discussed, STA1 is a legacy device configured to operate in accordance with the IEEE 802.11ax or earlier amendments to the 802.11 family of wireless communication standards, and STA2 is a non-legacy device configured to operate in accordance with the IEEE 802.11be or later amendments to the 802.11 family of wireless communication standards.

Prior to time $t_0$, the NSTR softAP MLD contends for channel access to the primary link using a suitable channel access mechanism (such as an EDCA mechanism), and obtains a TXOP on the primary link. After obtaining the TXOP on the primary link, the NSTR softAP MLD may also gain channel access to the non-primary link. In some instances, gaining channel access to the non-primary link may be based on obtaining channel access or a TXOP on the primary link. In some implementations, the NSTR softAP MLD may limit transmissions on the non-primary link to individually-addressed frames.

At time $t_0$, the NSTR softAP MLD transmits a first beacon frame 941 on only the primary link. The first beacon frame 941 may include the complete profile of the primary link and may indicate the complete profile of the non-primary link. As discussed, the primary link may be configured as a complete BSS, and the non-primary link may be configured as a pseudo-BSS that inherits one or more capabilities and operation parameters from the primary link. For example, in some aspects, the non-primary link may have the same SSID, TSF value, and beacon interval as the primary link, and may inherit the SSID, TSF value, and beacon interval from the primary link.

In some implementations, the first beacon frame 941 may be similar to the first beacon frame 901 of FIG. 9A. That is, the first beacon frame 941 may contain a frame body including a plurality of fields and elements followed by an ML Element. The plurality of fields and elements may carry the complete profile of the primary link. The ML Element may carry a Per-STA Profile subelement indicating the complete profile of the non-primary link. The ML Element may include a Common Info field carrying a BPCC field that indicates updates to one or more BSS parameters of the primary link. One or more bits of the Multi-Link Control field or the Common Info field carried in the ML Element may indicate whether or not the first beacon frame 941 is transmitted from the first AP of the NSTR softAP MLD. The first beacon frame 941 may also include an RNR Element carrying a Neighbor AP Information field associated with the non-primary link. The Neighbor AP Information field may carry a TBTT Information field consisting of a BSSID and one or more MLD parameters of the non-primary link. In some instances, the MLD parameters field of the TBTT Information field carried in the Neighbor AP Information field associated with the non-primary link may include a BPCC field carrying a value that indicates updates to one or more BSS parameters of the non-primary link. In some other instances, a value indicating updates to the one or more BSS parameters of the non-primary link may be carried in another suitable field, element, or header of the first beacon frame 941.

STA1 and STA2 receive the first beacon frame 941 on the primary link, and may parse the beacon frame 941 to obtain the complete profiles of the primary and non-primary links. In some implementations, each of STA1 and STA2 can parse or decode the complete profile of the primary link carried in the fields and elements contained in the body of the first beacon frame 941. As a non-legacy device, STA2 may also be able to parse or decode the complete profile of the non-primary link indicated in the ML Element of the first beacon frame 941. As a legacy device, STA1 may not be able to parse or decode one or more portions of the ML Element carried in the first beacon frame 941, and thus may not be able to obtain the capabilities, operation parameters, and other discovery information of the non-primary link from the first beacon frame 941. STA1 may also be unable to parse or decode one or more portions of the RNR Element carried in the first beacon frame 941. Thus, while STA2 may be able to discover and associate with the NSTR softAP MLD on both the primary and non-primary links using information obtained from the first beacon frame 941, STA1 can discover and associate with the NSTR softAP MLD on only the primary link using information obtained from the first beacon frame 941. In this way, communications between the NSTR softAP MLD and STA1 (and other legacy devices) may be limited to the primary link.

At time $t_1$, the NSTR softAP MLD transmits a first trigger frame 951 on the primary link concurrently with transmitting a second trigger frame 952 on the non-primary link. The first trigger frame 951 may solicit UL transmissions from a first group of STAs (including STA1) on the primary link, and the second trigger frame 952 may solicit UL transmissions from a second group of STAs (including STA2) on the non-primary link.

Between times $t_2$ and $t_3$, STA1 transmits a trigger-based (TB) PPDU 961 to the NSTR softAP MLD on the primary link based on receiving the first trigger frame 951, and STA2 transmits a TB PPDU 962 to the NSTR softAP MLD on the non-primary link based on receiving the second trigger frame 952. The concurrent transmission of TB PPDUs 961 and 962 on the primary and non-primary links from STA1 and STA2, respectively, may prevent the NSTR softAP MLD from transmitting DL data on the primary and non-primary links between times $t_2$ and $t_3$, which may obviate the need to place the non-primary link into a deaf state between times $t_2$ and $t_3$.

In some implementations, the NSTR softAP MLD may establish coordinated TWT sessions on the primary and non-primary links. Although not shown in FIG. 9B for simplicity, the TWT session on the primary link may include one or more service periods (SPs) during which the NSTR softAP MLD can schedule transmissions to and from STA1 or the first group of STAs on the primary link, and the TWT session on the non-primary link may include one or more SPs during which the NSTR softAP MLD can schedule transmissions to and from STA2 or the second group of STAs on the non-primary link. In some instances, the NSTR softAP MLD may synchronize the TWT SPs of the respective TWT sessions established on the primary and non-primary links with each other. For example, coordinating the respective TWT sessions or TWT SPs on the primary and non-primary links with each other may allow the NSTR softAP MLD to schedule the UL transmission of TB PPDU 961 from STA1 on the primary link concurrently with the UL transmission of TB PPDU 962 from STA2 on the non-primary link. In this way, transmission of the TB PPDU 961 from STA1 on the primary link may be temporally aligned with the transmission of the TB PPDU 962 from STA2 on the non-primary link.

In some instances, the NSTR softAP MLD contends for channel access to the primary link between times $t_3$ and $t_4$ using a suitable channel access mechanism (such as an EDCA mechanism), and obtains a TXOP on the primary link. After obtaining the TXOP on the primary link, the NSTR softAP MLD may gain channel access to and obtain a TXOP on the non-primary link. In some other instances, the NSTR softAP MLD may retain the TXOPs obtained on the primary and non-primary links between times $t_0$ and $t_1$, and may not have to contend for channel access between times $t_3$ and $t_4$.

At time $t_4$, the NSTR softAP MLD transmits a second beacon frame 942 on only the primary link. In some implementations, the second beacon frame 942 may be similar to the first beacon frame 941, for example, by carrying the complete profile of the primary link and indicating the complete profile of the non-primary link. In some other implementations, the second beacon frame 942 may include less information than the first beacon frame 941. For example, in some instances, the second beacon frame 942 may carry or indicate a partial profile of one or both of the primary and non-primary links. In some other instances, the second beacon frame 942 may carry the complete or partial profile of the primary link, and may not include the capabilities or operation parameters associated with the non-primary link. In some implementations, the second beacon frame 942 may be similar to the first frame described with reference to FIG. 8B, for example, by carrying or indicating only the BSSID and MLD common parameters of the non-primary link.

At time $t_5$, the NSTR softAP MLD transmits a third trigger frame 953 on the non-primary link. The third trigger frame 953 solicits UL transmissions from STA2 (or from the second group of STAs) on the non-primary link. Between times $t_6$ and $t_7$, STA2 transmits a TB PPDU 963 to the NSTR softAP MLD on the non-primary link based on receiving the third trigger frame 953. In the example of FIG. 9B, STA1 transmits an unsolicited UL PPDU 971 to the NSTR softAP MLD on the primary link between times $t_6$ and $t_7$. The transmission of UL PPDU 971 and TB PPDU 963 on the primary and non-primary links from STA1 and STA2, respectively, may prevent the NSTR softAP MLD from transmitting DL data on the primary and non-primary links between times $t_6$ and $t_7$, which may obviate the need to place the non-primary link into a deaf state between times $t_6$ and $t_7$.

In some implementations, the NSTR softAP MLD may establish an independent TWT session on the non-primary link to schedule the transmission of the TB PPDU 963 to the NSTR softAP MLD. Although not shown in FIG. 9B for simplicity, the independent TWT session on the non-primary link may include one or more SPs during which the NSTR softAP MLD can schedule UL transmissions from STA2 or DL transmissions to STA2 (and other associated devices) on the non-primary link.

At time $t_8$, the NSTR softAP MLD transmits a first DL PPDU 981 on the primary link to STA1 and transmits a second DL PPDU 982 on the non-primary link to STA2, concurrently. Between times $t_8$ and $t_9$, STA1 receives the first DL PPDU 981 on the primary link, and STA2 receives the second DL PPDU 982 on the non-primary link. The NSTR softAP MLD does not receive any UL communications between times $t_8$ and $t_9$, and thus the concurrent transmission of DL PPDUs 981 and 982 on the primary and non-primary links, respectively, may not see any cross-link interference resulting from UL transmissions between times $t_8$ and $t_9$.

In some implementations, the NSTR softAP MLD may establish coordinated TWT SPs on the primary and non-primary links to schedule the transmission of DL PPDUs 981 and 982 to STA1 and STA2 on the primary link and non-primary link, respectively. In this way, the NSTR softAP MLD may ensure that STA1 and STA2 are awake to receive the transmissions of DL PPDUs 981 and 982, respectively. In some instances, the TWT SP on the non-primary link can be synchronized with the TWT SP on the primary link so that the DL transmissions on the primary and non-primary links are temporally aligned with each other. In some instances, the NSTR softAP MLD may use a first group of antenna resources to transmit the DL PPDU 981 on the primary link to the first group of STAs (including STA1), and may use a second group of antenna resources to transmit the DL PPDU 982 on the non-primary link to the second group of STAs (including STA2).

At time $t_{10}$, the NSTR softAP MLD transmits a third beacon frame 943 on only the primary link. In some implementations, the third beacon frame 943 may be similar to the first beacon frame 941, for example, by carrying the complete profile of the primary link and indicating the complete profile of the non-primary link. In some other implementations, the third beacon frame 943 may be similar to the second beacon frame 942, for example, by carrying less information than the first beacon frame 941.

At time $t_{11}$, STA1 transmits an UL PPDU 991 to the NSTR softAP MLD on the primary link. The NSTR softAP MLD may receive the UL PPDU 991 on the primary link between times $t_{11}$ and $t_{12}$. Aspects of the present disclosure recognize that cross-link interference resulting from the transmission of UL PPDU 991 on the primary link can cause a period of deafness on the non-primary link. In some implementations, the NSTR softAP MLD may place the non-primary link into a deaf state 992 during transmission of UL PPDU 991 on the primary link. When in the deaf state 992, the non-primary link may not be available for communications between the NSTR softAP MLD and its associated STAs. In some implementations, the NSTR softAP MLD may not transmit DL data on the non-primary link during the deaf state 992. In this way, DL transmissions on the non-primary link that are susceptible to cross-link interference resulting from the transmission of UL PPDU 991 on the primary link may be prevented or delayed until after expiration of the deaf state 992. In some instances, STA2 (and other wireless communication devices associated with the NSTR softAP MLD) may not be permitted to transmit UL data on the non-primary link during the deaf state 992.

The deaf state 992 may be of any suitable duration of time. In some instances, the duration of the deaf state 992 may be temporally aligned with the transmit duration of UL PPDU 991 on the primary link. In some other instances, the duration of the deaf state 992 may include a guard time, followed by the transmit duration of UL PPDU 991, followed by another guard time. Other durations of time may be suitable for the deaf state 992. In some implementations, the guard time may be selected to prevent (or to reduce by more than an amount) the effects of cross-link interference on DL communications transmitted on the non-primary link. For example, in some instances, the duration of the guard time may be configured to ensure that DL transmissions on the non-primary link do not interfere with the first or last symbols of the UL PPDU 991. After an end of the transmission of the UL PPDU 991, or after expiration of the deaf state 992, the NSTR softAP MLD recovers the non-primary link from the deaf state 992.

Figure 10A:
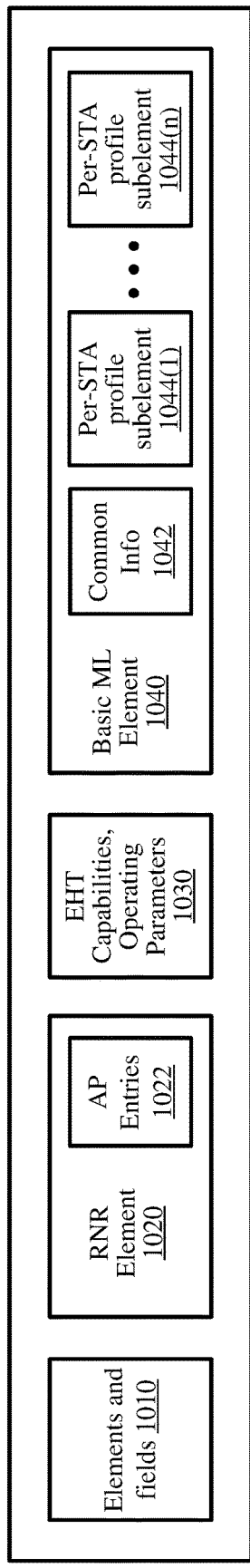
FIG. 10A shows an example management frame usable for multi-link communications according to some implementations.

FIG. 10A shows an example management frame 1000A usable for wireless communications that supports NSTR softAP MLDs according to some implementations. The management frame 1000A may be a beacon frame, a probe response frame, an association response frame, a re-association response frame, or some other suitable management frame. In some aspects, the management frame 1000A may be an example implementation of the first or second frames of FIG. 7A, the first or second frames of FIG. 7B, the frame of FIG. 8A, the third frame of FIG. 8B, the beacon frames of FIG. 9A, or the beacon frames of FIG. 9B. For ease of explanation, some information elements of the frame 1000A may also be referred to as a "field," a "subfield," an "element," or a "subelement," which may be considered interchangeable terms for purposes of discussion herein.

The frame 1000A is shown to include a plurality of elements and fields 1010, a Reduced Neighbor Report (RNR) Element 1020, capabilities and operating parameters 1030, and a basic Multi-Link (ML) Element 1040. The elements and fields 1010 may carry the complete profile of the primary link. The RNR element 1020 may include one or more AP entries 1022. Each of the AP entries 1022 may be associated with a respective AP of an AP MLD, and may carry or indicate one or more parameters of the respective AP. In some implementations, the one or more parameters may include the BSSID and MLD parameters of the respective AP. In some instances, a respective AP entry 1022 may not include one or more of a TBTT offset, a short-SSID, BSS parameters, or a PSD limit of a corresponding non-primary link. The capabilities and operating parameters 1030 may include any number of capabilities and operating parameters associated with the primary link. The ML Element 1040 may include common information 1042 and a number of Per-STA Profile subelements 1044(1)-1044(n). The common information 1042 may include MLD parameters and other information common to the primary link and one or more non-primary links. Each of the Per-STA Profile subelements 1044(1)-1044(n) may be associated with a corresponding non-primary link of the AP MLD, and may carry or indicate the complete profile of the corresponding non-primary link.

Figure 10B:
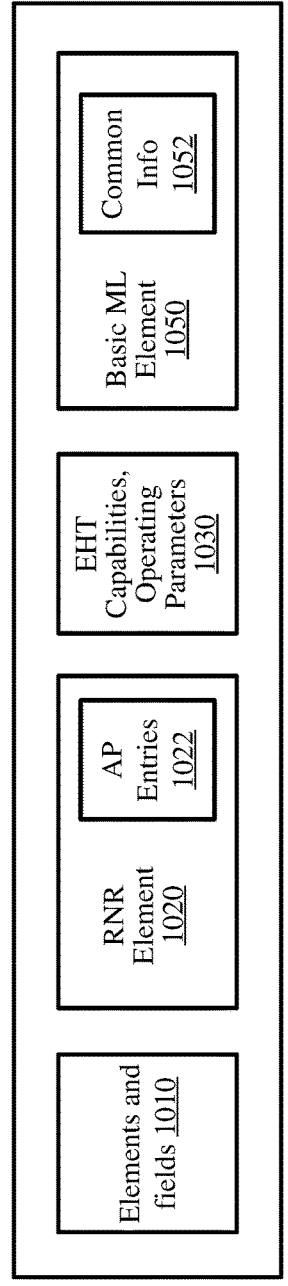
FIG. 10B shows another example management frame usable for multi-link communications according to some implementations.

FIG. 10B shows another example management frame usable for multi-link communications with an NSTR softAP MLD according to some implementations. The management frame 1000B may be a beacon frame, a probe response frame, an association response frame, a re-association response frame, or some other suitable management frame. In some aspects, the management frame 1000B may be an example implementation of the first frame of FIG. 8B. For ease of explanation, some information elements of the frame 1000A may also be referred to as a "field," a "subfield," an "element," or a "subelement," which may be considered interchangeable terms for purposes of discussion herein.

The frame 1000B is shown to include a plurality of elements and fields 1010, an RNR Element 1020, capabilities and operating parameters 1030, and a basic ML Element 1050. The elements and fields 1010 may carry the complete profile of the primary link. The RNR element 1020 may include one or more AP entries 1022. Each of the AP entries 1022 may be associated with a respective AP of an AP MLD, and may carry or indicate one or more parameters of the respective AP. In some implementations, the one or more parameters may include the BSSID and MLD parameters of the respective AP. In some instances, a respective AP entry 1022 may not include one or more of a TBTT offset, a short-SSID, BSS parameters, or a PSD limit of a corresponding non-primary link. The capabilities and operating parameters 1030 may include any number of capabilities and operating parameters associated with the primary link. The ML Element 1050 may include common information 1042. The common information 1042 may include MLD parameters and other information common to the primary link and one or more non-primary links associated with an AP MLD.

Figure 11A:
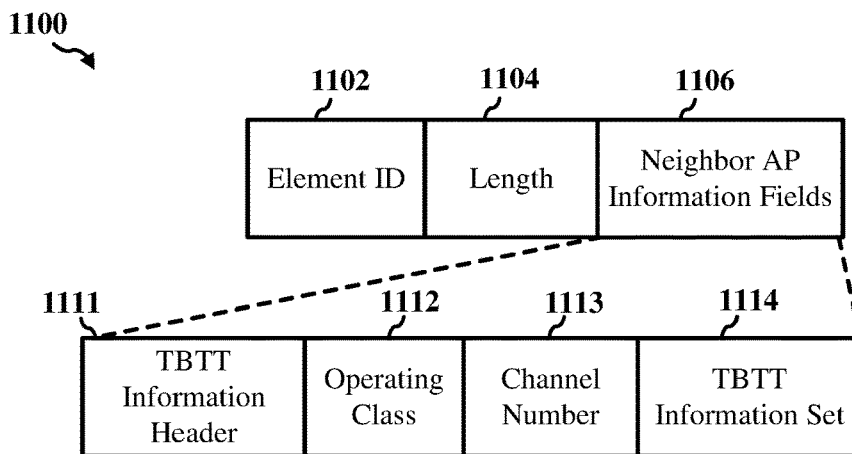
FIG. 11A shows an example Reduced Neighbor Report (RNR) Element usable for multi-link communications according to some implementations.

FIG. 11A shows an example RNR Element 1100 usable for multi-link communications according to some implementations. In some implementations, the RNR element 1100 may be an example implementation of the RNR Element 1020 of the example management frames 1000A and 1000B described with reference to FIGS. 10A and 10B, respectively. In some instances, the RNR Element 1100 may be included in a frame such as (but not limited to) a beacon frame, a probe response frame, an association response frame, or a re-association response frame transmitted from an AP MLD. For ease of explanation, some information elements of the RNR element 1100 may be referred to as a "field," a "subfield," an "element," or a "subelement," which may be considered interchangeable terms for purposes of discussion herein.

The RNR Element 1100 may be used to indicate channel information, parameters, and other information related to one or more APs that are affiliated with the AP MLD. As shown, the RNR Element 1100 includes an Element ID field 1102, a Length field 1104, and one or more Neighbor AP Information fields 1106. The Element ID field 1102 carries a value identifying the RNR Element 1100. The Length field 1104 carries a value indicating the length of the RNR Element 1100. Each Neighbor AP Information field 1106 carries information indicating timing references, the operating class, the channel number, and other parameters of a corresponding AP of the AP MLD.

As shown, the Neighbor AP Information field 1106 includes a TBTT Information header 1111, an Operating Class field 1112, a Channel Number field 1113, and a TBTT Information Set field 1114. The TBTT Information header 1111 carries general information pertaining to the corresponding AP. The Operating Class field 1112 indicates a channel starting frequency that, together with the Channel Number field, indicates the primary channel of the BSS of the AP associated with the Neighbor AP Information field. The Channel Number field 1113 indicates the last known primary channel of the AP associated with the Neighbor AP Information field. The TBTT Information Set field 1114 contains one or more TBTT Information fields that carry TBTT information, operation parameters, and MLD parameters for the AP associated with the Neighbor AP Information field.

In some implementations, the RNR Element 1100 may be extended to include a Link ID field that stores one or more unique link IDs that may be used to map entries in the Neighbor AP Information fields 1106 with information stored in the Per-STA Profile subelements of a ML Element. In some other implementations, the RNR Element 1100 may be extended to include a Do Not Transmit (DNT) field that can carry a DNT indication for a corresponding communication link. In addition, or in the alternative, one or more elements or fields of the RNR Element 1100 may be combined, added, removed, or modified.

Figure 11B:
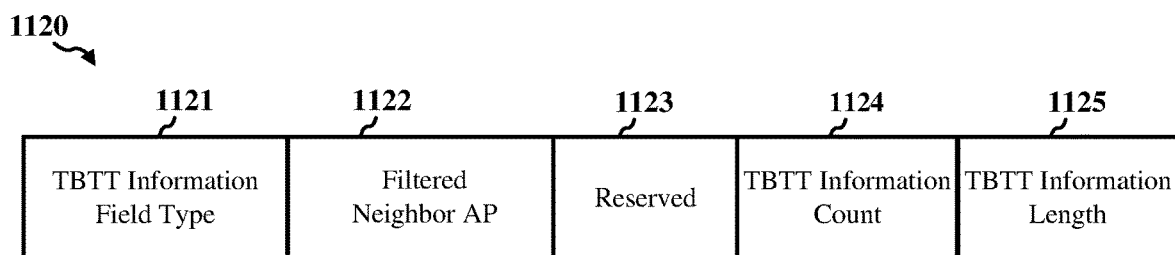
FIG. 11B shows an example TBTT Information Header of the RNR Element of FIG. 11A according to some implementations.

FIG. 11B shows an example TBTT Information Header 1120 according to some implementations. In some instances, the TBTT Information Header 1120 may be an example implementation of the TBTT Information Header 1111 of FIG. 11A. As shown, the TBTT Information Header 1120 includes a TBTT Information Field Type subfield 1121, a Filtered Neighbor AP subfield 1122, a reserved subfield 1123, a TBTT Information Count subfield 1124, and a TBTT Information Length subfield 1125. The TBTT Information Field Type subfield 1121 carries a value indicating the type or format of the TBTT Information field. In some implementations, the value of the TBTT Information Field Type subfield 1121 may be set to 1 or a reserved value to indicate that the TBTT Information field is of a new type or format associated with an NSTR device. In this way, a wireless communication device that receives an RNR element having a TBTT Information Field Type subfield set to 1 or the reserved value can determine that the frame carrying the RNR element was transmitted by an NSTR device.

The Filtered Neighbor AP subfield 1122 is reserved except when the Reduced Neighbor Report element is carried in a Probe Response frame transmitted by a TVHT AP. The reserved subfield 1123 includes one or more reserved or unused bits. The TBTT Information Count subfield 1124 indicates the number of TBTT Information fields included in the TBTT Information Set field of the Neighbor AP Information field, minus one. The TBTT Information Length subfield 1125 indicates the length of each TBTT Information field included in the TBTT Information Set field of the Neighbor AP Information field.

Figure 11C:
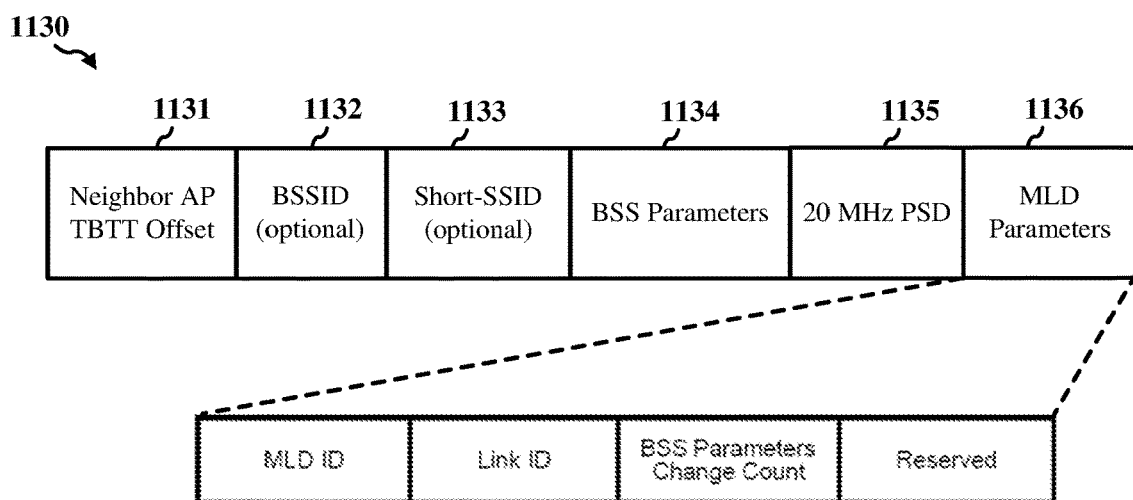
FIG. 11C shows an example TBTT Information field of the RNR Element of FIG. 11A according to some implementations.

FIG. 11C shows an example TBTT Information field 1130 according to some implementations. In some instances, the TBTT Information field 1130 may be one implementation of the TBTT Information field(s) carried in the TBTT Information Set field 1114 of FIG. 11A. As shown, the TBTT Information field 1130 includes a Neighbor AP TB TT Offset subfield 1131, an optional BSSID subfield 1132, an optional Short-SSID subfield 1133, a BSS Parameters subfield 1134, a 20 MHz PSD subfield 1135, and an MLD Parameters subfield 1136. The Neighbor AP TBTT Offset subfield 1131 indicates the offset (in TUs) of the next TBTT of the reported AP from the immediately prior TBTT of the reporting AP. The optional BSSID subfield 1132 carries the BSSID of the reported AP. The optional Short-SSID subfield 1133 carries the shortened SSID of the reported AP. The BSS Parameters subfield 1134 indicates one or more BSS parameters of the reported AP such as (but not limited to) an OCT Recommended subfield, a same SSID subfield, a multiple BSSID subfield, a Transmitted BSSID subfield, a ESS Member subfield, an Unsolicited Probe Responses Active subfield, and a Co-Located AP subfield. The 20 MHz PSD subfield 1135 indicates a maximum transmit power for the corresponding AP on a primary 20 MHz channel. In some instances, the Neighbor AP TBTT Offset subfield 1131, the Short-SSID subfield 1133, the BSS Parameters subfield 1134, and 20 MHz PSD subfield 1135 may be omitted from the TBTT Information field 1130.

The MLD Parameters subfield 1136 includes an MLD ID subfield, a Link ID subfield, a BSS Parameters Change Count (BPCC) subfield, and a Reserved subfield. The MLD ID subfield indicates the identifier of the AP MLD, and may be used to identify the list of reported APs associated with the AP MLD. The Link ID subfield indicates the link identifier of the corresponding AP, and is unique to the corresponding AP. The BSS Parameters Change Count subfield is an unsigned integer, initialized to 0, that increments when a critical update to the Beacon frame of the reported AP occurs. The Reserved subfield includes one or more reserved or unused bits.

Figure 12A:
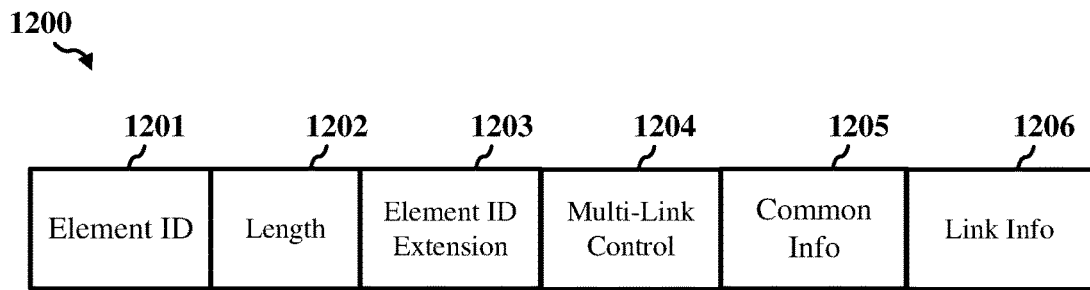
FIG. 12A shows an example Multi-Link (ML) Element usable for multi-link communications according to some implementations.

FIG. 12A shows an example Multi-Link (ML) Element 1200 usable for multi-link communications according to some implementations. In some implementations, the ML Element 1200 may be an example implementation of the basic ML Element 1040 described with reference to FIG. 10A. In some instances, the ML Element 1200 may be included in a frame such as (but not limited to) a beacon frame, a probe response frame, an association response frame, or a re-association response frame transmitted from an NSTR softAP MLD. For ease of explanation, some information elements of the ML Element 1200 may be referred to as a "field," a "subfield," an "element," or a "subelement," which may be considered interchangeable terms for purposes of discussion herein.

The ML Element 1200 includes an Element ID field 1201, a Length field 1202, an Element ID Extension field 1203, a Multi-Link Control field 1204, a Common Info field 1205, and a Link Info field 1206. The Element ID field 1201 and the Element ID Extension field 1203 carry values indicating that the element 1200 is an ML Element and indicating the type of ML Element. The Length field 1202 carries a value indicating the length of the ML Element 1200. The Multi-Link Control field 1204 carries information indicating the presence of various fields and subfields in the Common Info field 1205. The Common Info field 1205 carries information common to one or more non-primary links associated with an AP MLD. The Link Info field 1206 carries information specific to each of the non-primary links associated with the AP MLD. In some instances, the Link Info field 1206 includes one or more Per-STA Profile subelements that can carry or indicate the complete profiles of one or more corresponding non-primary links of an AP MLD such as an NSTR softAP MLD.

Figure 12B:
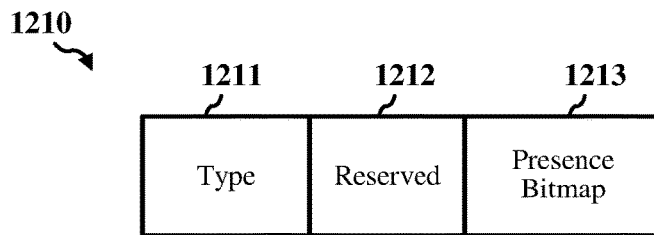
FIG. 12B shows an example Multi-Link Control field of the ML Element of FIG. 12A according to some implementations.

FIG. 12B shows an example Multi-Link Control field 1210 according to some implementations. In some instances, the Multi-Link Control field 1210 may be one implementation of the Multi-Link Control field 1204 of the ML Element 1200 of FIG. 12A. As shown, the Multi-Link Control field 1210 includes a Type field 1211, a reserved field 1212, and a Presence Bitmap field 1213. The Type field 1211 is used to differentiate between variants of the ML Element 1200 (such as a Basic ML Element and a Probe Request ML Element). The reserved field 1212 includes one or more reserved or unused bits. The Presence Bitmap field 1213 is used to indicate the presence of various subfields in the Common Info field 1205 of the ML Element 1200. For example, the Presence Bitmap field 1213 may indicate the presence of an MLD MAC address field, a Link ID Info field, a BSS Parameters Change Count (BPCC) field 1223, a Medium Synchronization Delay Information field, an enhanced Multi-Link (EML) Capabilities field, and an MLD Capabilities field in the Common Info field 1205 of the ML Element 1200.

Figure 12C:
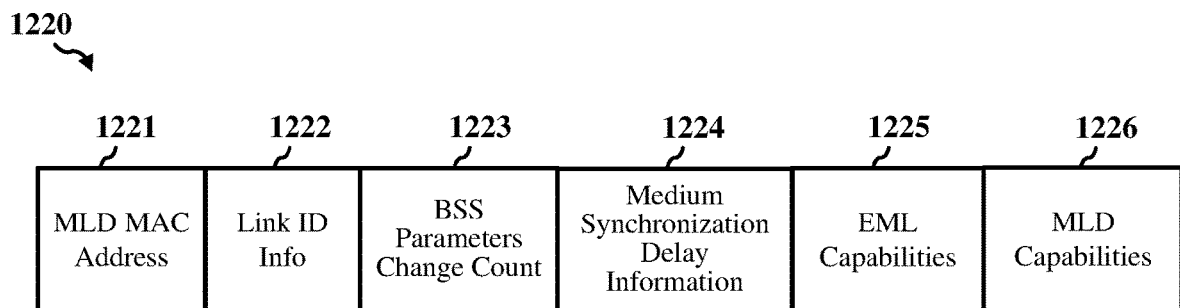
FIG. 12C shows an example Common Info field of the ML Element of FIG. 12A according to some implementations.

FIG. 12C shows an example Common Info field 1220 according to some implementations. In some instances, the Common Info field 1220 may be one implementation of the Common Info field 1205 of the ML Element 1200 of FIG. 12A. As shown, the Common Info field 1220 includes an MLD MAC Address field 1221, a Link ID Info field 1222, a BPCC field 1223, a Medium Synchronization Delay Information field 1224, an enhanced Multi-Link (EML) Capabilities field 1225, and an MLD Capabilities field 1226. The MLD MAC Address field 1221 carries the MAC address of the MLD (such as the NSTR softAP MLD). The Link ID Info field 1222 carries the link identifier of the AP that transmits the ML element 1200. The BSS Parameters Change Count (BPCC) field 1223 carries an unsigned integer, initialized to 0, that increments when a critical update occurs to the operational parameters for the AP that transmits the Basic variant ML Element.

The Medium Synchronization Delay Information field 1224 carries a value indicating the duration of the Medium-SyncDelay timer. The EML Capabilities field 1225 contains a number of subfields that are used to advertise the capabilities for EML Single-Radio (SR) operation and EML Multiple-Radio (MR) operation. The MLD Capabilities field 1226 indicates various capabilities of the MLD. In some instances, the MLD Capabilities field 1226 may indicate the maximum number of links that support the simultaneous transmission or reception of frames, whether the MLD supports the reception of frames that carry an SRS control subfield, whether the MLD supports TID-to-Link mapping negotiation, and the minimum frequency gap between any two links that is recommended by the non-AP MLD for STR operation.

Figure 12D:
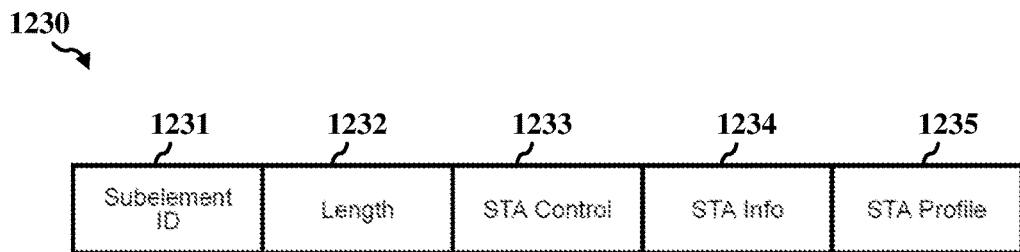
FIG. 12D shows an example Per-STA Profile subelement of the ML Element of FIG. 12A according to some implementations.

FIG. 12D shows an example Per-STA Profile subelement 1230 according to some implementations. In some instances, the Per-STA Profile subelement 1230 may be one implementation of the Per-STA Profile subelements carried in the Link Info field 1206 of the ML Element 1200 of FIG. 12A. As shown, the Per-STA Profile subelement 1230 may include a Subelement ID field 1231, a Length field 1232, a STA Control field 1233, a STA Info field 1234, and a STA Profile field 1235. The Subelement ID field 1231 carries a value indicating the type of the Per-STA Profile subelement 1230. The Length field 1232 carries a value indicating the length of the Per-STA Profile subelement 1230. The STA Control field 1233 carries information indicating the presence (or absence) of various fields and subfields in the STA Profile field 1235. The STA Info field 1234 carries information pertaining to the AP corresponding to the Per-STA Profile subelement 1230. The STA Profile field 1235 carries information indicating the complete profile of the AP corresponding to the Per-STA Profile subelement 1230.

Figure 12E:
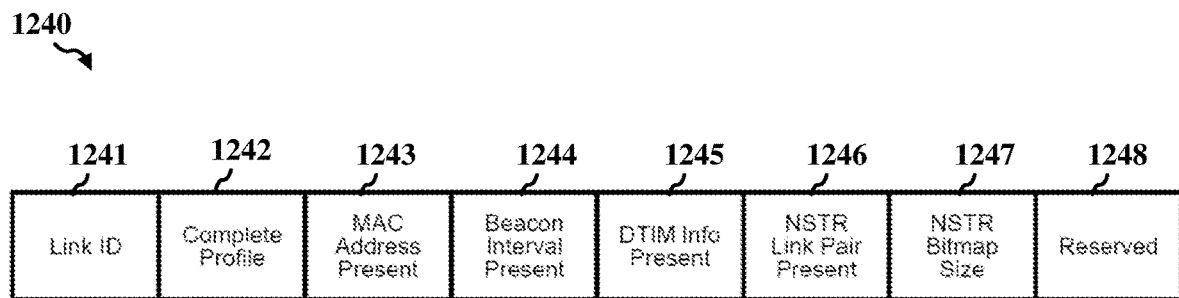
FIG. 12E shows an example STA Control field of the Per-STA Profile subelement of FIG. 12D according to some implementations.

FIG. 12E shows an example STA Control field 1240 according to some implementations. In some instances, the STA Control field 1240 may be one implementation of the STA Control field 1233 of the Per-STA Profile subelement 1230 of FIG. 12D. As shown, the STA Control field 1240 includes a Link ID field 1241, a Complete Profile field 1242, a MAC Address Present field 1243, a Beacon Interval Present field 1244, a DTIM Info Present field 1245, an NSTR Link Pair Present field 1246, an NSTR Bitmap Size field 1247, and a Reserved field 1248. The Link ID field 1241 carries a value that uniquely identifies the communication link associated with the AP corresponding to the Per-STA Profile subelement 1230. The Complete Profile field 1242 carries a value indicating whether the Per-STA Profile subelement 1230 carries the complete profile of the corresponding AP. The MAC Address Present field 1243 carries a value indicating whether the Per-STA Profile subelement 1230 carries the MAC Address of the corresponding AP. The Beacon Interval Present field 1244 carries a value indicating whether the STA Info field 1234 of the Per-STA Profile subelement 1230 carries the beacon interval of the corresponding AP. The DTIM Info Present field 1245 carries a value indicating whether the STA Info field 1234 of the Per-STA Profile subelement 1230 carries DTIM information of the corresponding AP. The NSTR Link Pair Present field 1246 carries a value indicating whether the Per-STA Profile subelement 1230 carries information pertaining to a pair of communication links (such as a primary link and a non-primary link) associated with an NSTR softAP MLD. The NSTR Bitmap Size field 1247 carries a value indicating the size of an NSTR Indication Bitmap field included in the Per-STA Profile subelement 1230.

Figure 12F:
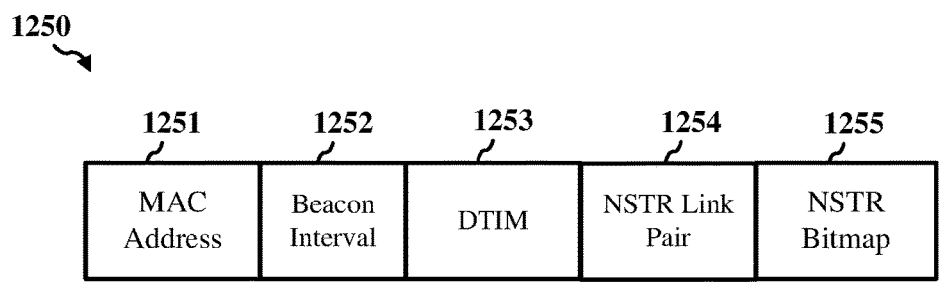
FIG. 12F shows an example STA Info field of the Per-STA Profile subelement of FIG. 12D according to some implementations.

FIG. 12F shows an example STA Info field 1250 according to some implementations. In some instances, the STA Info field 1250 may be one implementation of the STA Info field 1234 of the Per-STA Profile subelement 1230 of FIG. 12D. As shown, the STA Info field 1250 includes a MAC Address field 1251, a Beacon Interval field 1252, a DTIM field 1253, an NSTR Link Pair field 1254, and an NSTR Bitmap field 1255. The MAC Address field 1251 carries the MAC address of the AP corresponding to the Per-STA Profile subelement 1230. The Beacon Interval field 1252 carries information indicating the beacon interval of the AP corresponding to the Per-STA Profile subelement 1230. The DTIM field 1253 carries information indicating the DTIM count and the DTIM period of the AP corresponding to the Per-STA Profile subelement 1230. The NSTR Link Pair field 1254 carries information identifying the pair of communication links associated with the AP corresponding to the Per-STA Profile subelement 1230. The NSTR Bitmap field 1255 carries an NSTR bitmap of the AP corresponding to the Per-STA Profile subelement 1230.

Figure 13:
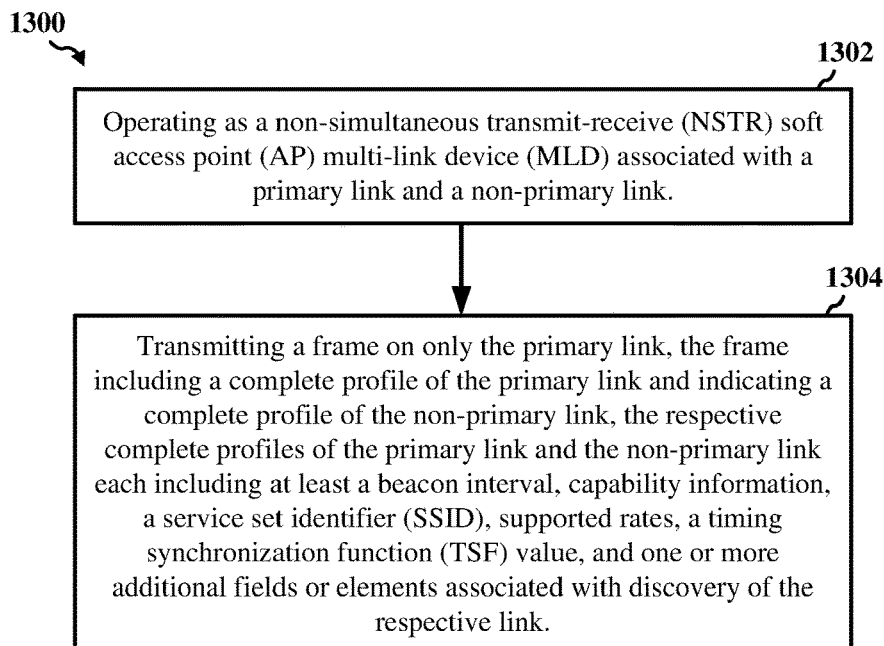
FIGS. 13-36 show flowcharts illustrating example processes for wireless communication that supports an NSTR softAP MLD according to some implementations.

FIG. 13 shows a flowchart illustrating an example process 1300 for wireless communications that supports multi-link communications with an NSTR softAP MLD according to some implementations. The process 1300 may be performed by a wireless communication device such as the wireless communication device 500 described above with reference to FIG. 5. In some implementations, the process 1300 may be performed by a wireless communication device operating as or within a STA, such as one of the STAs 104 and 604 described above with reference to FIGS. 1 and 6B, respectively. In some instances, the process 1300 may be performed by an AP MLD such as the NSTR softAP MLD described with reference to FIG. 7A.

In some implementations, the process 1300 begins in block 1302 with operating as an NSTR softAP MLD associated with a primary link and a non-primary link. In block 1304, the process 1300 continues with transmitting a frame on only the primary link, the frame including a complete profile of the primary link and indicating a complete profile of the non-primary link, the respective complete profiles of the primary link and the non-primary link each including at least a beacon interval, capability information, a service set identifier (SSID), supported rates, a timing synchronization function (TSF) value, and one or more additional fields or elements associated with discovery of the respective link. The frame is transmitted only on the primary link, and may be one of a beacon frame, a probe response frame, an association response frame, or a reassociation response frame. In some instances, the beacon interval, the SSID, and the TSF value of the complete profile of the non-primary link are inherited from the complete profile of the primary link. As such, the beacon interval, the SSID, and the TSF value of the non-primary link may be absent from the frame.

In some implementations, the frame contains a frame body including a plurality of fields and elements carrying the complete profile of the primary link and including a Multi-Link (ML) Element carrying a Per-STA Profile subelement indicating the complete profile of the non-primary link. The ML Element includes a Common Info field carrying a BPCC field indicating updates to one or more BSS parameters associated with the primary link. One or more bits of a Multi-Link Control field or a Common Info field of the ML element may indicate whether or not the frame is transmitted from the first AP of the NSTR softAP MLD.

The frame body may also include an RNR Element carrying a Neighbor AP Information field associated with the non-primary link. The Neighbor AP Information field may carry a TBTT Information field consisting of a BSSID and one or more MLD parameters of the non-primary link. In some instances, the TBTT offset, short-SSID, BSS parameters, and PSD parameters of the non-primary link may be inherited from the primary link. The TBTT offset subfield, short-SSID subfield, BSS parameters subfield, and PSD subfield may thus be omitted from the TBTT Information field in the Neighbor AP Information field associated with the non-primary link, thereby reducing the size and overhead of the RNR Element. In some aspects, this reduced-size TBTT Information field may be a new type of TBTT Information field that is not defined by any of the existing amendments to the 802.11 family of wireless communication standards. As such, the Neighbor AP Information field may include a TBTT Information Field type set to a value indicating that the Neighbor AP Information field carries information pertaining only to the non-primary link. In some instances, the TBTT Information field type may be set to 1 or a reserved value to indicate this new or undefined type of TBTT Information field. Setting the TBTT Information field type to 1 or the reserved value may also indicate that the associated Neighbor AP Information field, and thus the frame carrying the corresponding RNR Element, is transmitted from an AP associated with the NSTR softAP MLD.

In some implementations, the length of the TBTT Information field indicates whether or not the frame is transmitted from the first AP of the NSTR softAP MLD. In some instances, the length of the TBTT Information field is 9 octets. The one or more MLD parameters of the TBTT Information field may include a BPCC field indicating updates to one or more BSS parameters associated with the non-primary link.

Figure 14:
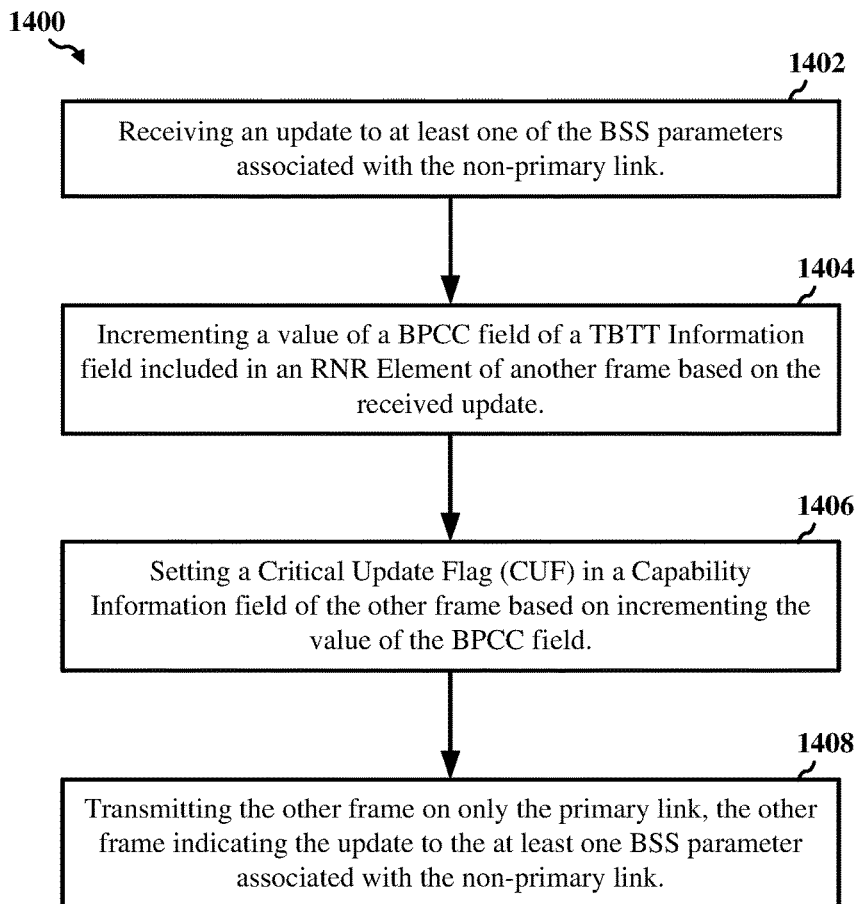

FIG. 14 shows a flowchart illustrating an example process 1400 for wireless communications that supports multi-link communications with an NSTR softAP MLD according to some implementations. The process 1400 may be performed by a wireless communication device such as the wireless communication device 500 described above with reference to FIG. 5. In some implementations, the process 1400 may be performed by a wireless communication device operating as or within a STA, such as one of the STAs 104 and 604 described above with reference to FIGS. 1 and 6B, respectively. In some instances, the process 1400 may be performed by an AP MLD such as the NSTR softAP MLD described with reference to FIG. 7A.

In some implementations, the process 1400 may be performed after transmitting the frame in block 1304 of FIG. 13. For example, at block 1402, the process 1400 begins with receiving an update to at least one of the BSS parameters associated with the non-primary link. At block 1404, the process 1400 continues with incrementing a value of the BPCC field of the TBTT Information field included in the RNR Element of another frame based on the received update. At block 1406, the process 1400 continues with setting a Critical Update Flag (CUF) in the Capability Information field of the other frame based on incrementing the value carried in the BPCC field. At block 1408, the process 1400 continues with transmitting the other frame on only the primary link, the other frame indicating the update to the at least one BSS parameter associated with the non-primary link. In some instances, the other frame may be a beacon frame, a probe response frame, an association response frame, a reassociation response frame, or an action frame such as a Notification frame.

In some implementations, the BSS parameters may include at least one of a Channel Switch Announcement (CSA) element, an extended Channel Switch Announcement (eCSA) element, an Enhanced Distributed Channel Access (EDCA) parameter, a Quiet period element, a Direct Sequence Spread Spectrum (DSSS) parameter set, a high-throughput (HT) operation element, a very high-throughput (VHT) operation element, a high-efficiency (HE) operation element, an extremely high-throughput (EHT) operation element, a Wide Bandwidth Channel Switch element, an Operating Mode Notification element, a Broadcast Target Wait Time (TWT) element, a BSS Color Change Announcement element, a Multi-User (MU) EDCA parameter set, a Spatial Reuse parameter set, or an uplink (UL) orthogonal frequency division multiple access (OFDMA) random access (UORA) parameter set.

Figure 15:
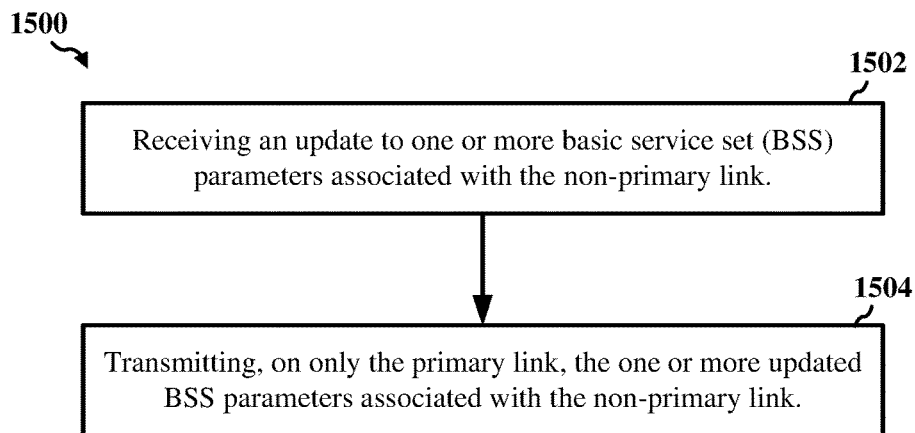

FIG. 15 shows a flowchart illustrating an example process 1500 for wireless communications that supports multi-link communications with an NSTR softAP MLD according to some implementations. The process 1500 may be performed by a wireless communication device such as the wireless communication device 500 described above with reference to FIG. 5. In some implementations, the process 1500 may be performed by a wireless communication device operating as or within a STA, such as one of the STAs 104 and 604 described above with reference to FIGS. 1 and 6B, respectively. In some instances, the process 1500 may be performed by an AP MLD such as the NSTR softAP MLD described with reference to FIG. 7A.

In various implementations, the process 1500 may be performed after transmitting the frame in block 1304 of FIG. 13. For example, at block 1502, the process 1500 begins with receiving an update to one or more BSS parameters associated with the non-primary link. At block 1504, the process 1500 continues with transmitting, on only the primary link, the one or more updated BSS parameters associated with the non-primary link. In some implementations, the one or more updated BSS parameters may be carried in a beacon frame, a probe response frame, an association response frame, or a reassociation response frame. In some other implementations, the one or more updated BSS parameters may be part of a partial profile of the non-primary link. In some instances, the NSTR softAP MLD may transmit, on the primary link, an unsolicited broadcast probe response frame carrying the partial profile of the non-primary link (and thus indicating the one or more updated BSS parameters of the non-primary link).

Figure 16:
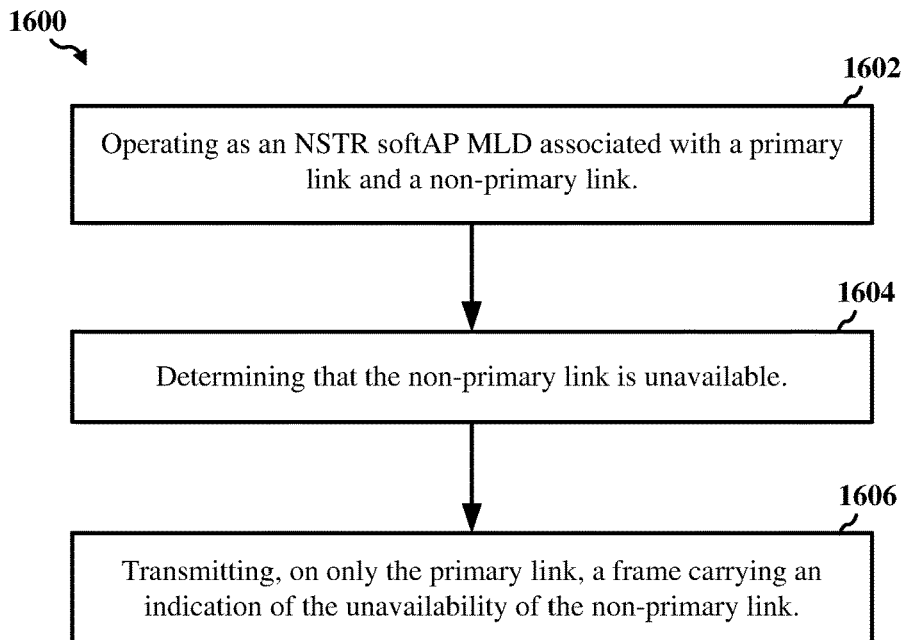

FIG. 16 shows a flowchart illustrating an example process 1600 for wireless communications that supports multi-link communications with an NSTR softAP MLD according to some implementations. The process 1600 may be performed by a wireless communication device such as the wireless communication device 500 described above with reference to FIG. 5. In some implementations, the process 1600 may be performed by a wireless communication device operating as or within a STA, such as one of the STAs 104 and 604 described above with reference to FIGS. 1 and 6B, respectively. In some instances, the process 1600 may be performed by an AP MLD such as the NSTR softAP MLD described with reference to FIG. 7B.

In some implementations, the process 1600 begins in block 1602 with operating as an NSTR softAP MLD associated with a primary link and a non-primary link. In block 1604, the process 1600 continues with determining that the non-primary link is unavailable. In block 1606, the process 1600 continues with transmitting, on only the primary link, a frame carrying an indication of the unavailability of the non-primary link. In some instances, the frame may be one of a beacon frame, a probe response frame, an association response frame, or a reassociation response frame. In some other instances, the frame may be an action frame such as a Notification frame.

The non-primary link may be unavailable for a variety of reasons. For example, the non-primary link may be unavailable for multi-link communications associated with the NSTR softAP MLD when the non-primary link is used for a cellular link in a Long Term Evolution (LTE) radio access network (RAN) or a fifth-generation (5G) new radio (NR) access network. For another example, the non-primary link may be unavailable for multi-link communications associated with the NSTR softAP MLD when the non-primary link is placed in a power save mode (including a sleep mode or doze mode), for example, to reduce power consumption or to extend battery life of the NSTR softAP MLD. For another example, the non-primary link may be unavailable for multi-link communications associated with the NSTR softAP MLD when the non-primary link is used for peer-to-peer (P2P) or infra-STA communications.

Figure 17:
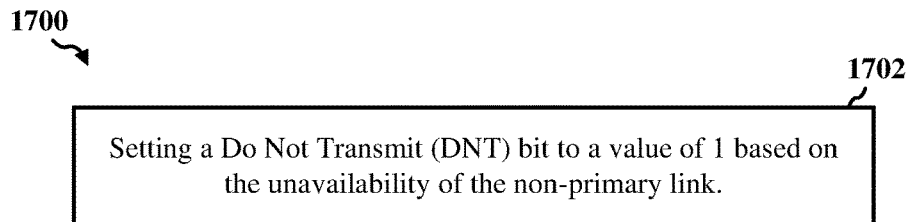

FIG. 17 shows a flowchart illustrating an example process 1700 for wireless communications that supports multi-link communications with an NSTR softAP MLD according to some implementations. The process 1700 may be performed by a wireless communication device such as the wireless communication device 500 described above with reference to FIG. 5. In some implementations, the process 1700 may be performed by a wireless communication device operating as or within a STA, such as one of the STAs 104 and 604 described above with reference to FIGS. 1 and 6B, respectively. In some instances, the process 1700 may be performed by an AP MLD such as the NSTR softAP MLD described with reference to FIG. 7B.

In some implementations, the process 1700 may be performed in conjunction with transmitting the indication in block 1606 of FIG. 16. For example, at block 1702, the process 1700 begins with setting a Do Not Transmit (DNT) bit to a value of 1 based on the unavailability of the non-primary link. In some instances, the DNT bit may be carried in a Per-STA Profile subelement or an RNR Element in the frame transmitted on the primary link.

In some other implementations, the NSTR softAP MLD may also set a Critical Update Flag (CUF) carried in the frame to a value of 1 based on the unavailability of the non-primary link. In some instances, the frame includes a Capability Information field that carries the CUF set to the value of 1.

Figure 18:
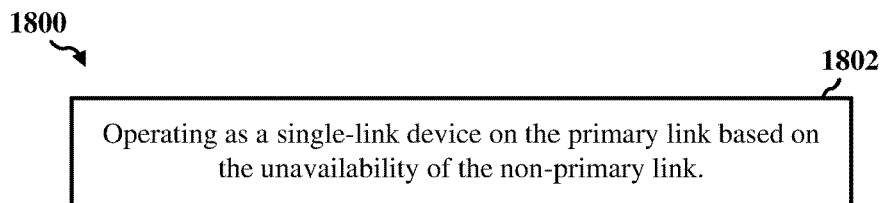

FIG. 18 shows a flowchart illustrating an example process 1800 for wireless communications that supports multi-link communications with an NSTR softAP MLD according to some implementations. The process 1800 may be performed by a wireless communication device such as the wireless communication device 500 described above with reference to FIG. 5. In some implementations, the process 1800 may be performed by a wireless communication device operating as or within a STA, such as one of the STAs 104 and 604 described above with reference to FIGS. 1 and 6B, respectively. In some instances, the process 1800 may be performed by an AP MLD such as the NSTR softAP MLD described with reference to FIG. 7B.

In some implementations, the process 1800 may be performed after transmitting the frame carrying the indication in block 1606 of FIG. 16. For example, at block 1802, the process 1800 begins with operating as a single-link device on the primary link based on the unavailability of the non-primary link. In some aspects, when the non-primary link is unavailable, the NSTR softAP MLD may place the softAP (or other transmit chains, receive chains, signal processing circuitry, and so on) associated with the non-primary link into a sleep state, a doze state, or a power-off state while remaining fully operational on the primary link. In this single-link state, the NSTR softAP MLD can operate the BSS as a single-link BSS on the primary link while also reducing power consumption associated with operating on the non-primary link.

Figure 19:
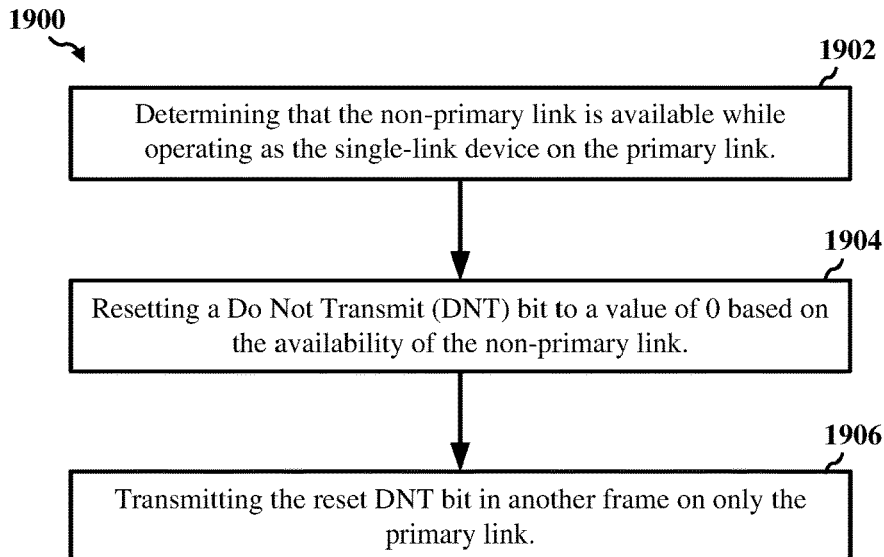

FIG. 19 shows a flowchart illustrating an example process 1900 for wireless communications that supports multi-link communications with an NSTR softAP MLD according to some implementations. The process 1900 may be performed by a wireless communication device such as the wireless communication device 500 described above with reference to FIG. 5. In some implementations, the process 1900 may be performed by a wireless communication device operating as or within a STA, such as one of the STAs 104 and 604 described above with reference to FIGS. 1 and 6B, respectively. In some instances, the process 1900 may be performed by an AP MLD such as the NSTR softAP MLD described with reference to FIG. 7B.

In some implementations, the process 1900 may be performed while the NSTR softAP MLD operates as a single-link device in block 1802 of FIG. 18. For example, at block 1902, the process 1900 begins with determining that the non-primary link is available while operating as the single-link device on the primary link. At block 1904, the process 1900 continues with resetting a Do Not Transmit (DNT) bit to a value of 0 based on the availability of the non-primary link. At block 1906, the process 1900 continues with transmitting the reset DNT bit in another frame on only the primary link, the other frame including a Per-STA Profile subelement or a Reduced Neighbor Report (RNR) element carrying the reset DNT bit having the value of 0. In some instances, the other frame may be one of a beacon frame, a probe response frame, an association response frame, or a reassociation response frame. In some other instances, the other frame may be an action frame such as a Notification frame.

Figure 20:
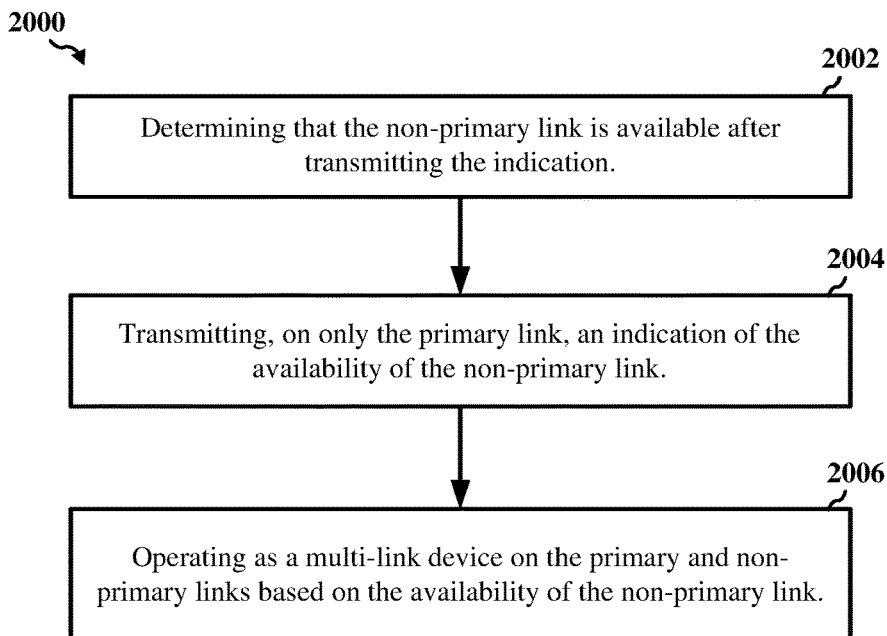

FIG. 20 shows a flowchart illustrating an example process 2000 for wireless communications that supports multi-link communications with an NSTR softAP MLD according to some implementations. The process 2000 may be performed by a wireless communication device such as the wireless communication device 500 described above with reference to FIG. 5. In some implementations, the process 2000 may be performed by a wireless communication device operating as or within a STA, such as one of the STAs 104 and 604 described above with reference to FIGS. 1 and 6B, respectively. In some instances, the process 2000 may be performed by an AP MLD such as the NSTR softAP MLD described with reference to FIG. 7B.

In some implementations, the process 2000 may be performed after the process 1600 of FIG. 16. For example, at block 2002, the process 2000 begins with determining that the non-primary link is available after transmitting the indication. At block 2004, the process 2000 continues with transmitting, on only the primary link, an indication of the availability of the non-primary link. At block 2006, the process 2000 continues with operating as a multi-link device on the primary and non-primary links based on the availability of the non-primary link. In some instances, the indication may be transmitted on the primary link in a suitable management frame such as (but not limited to) a beacon frame, a probe response frame, an association response frame, or a reassociation response frame. In some other instances, the indication may be transmitted on the primary link in a suitable action frame such as a Notification frame. In some aspects, the NSTR softAP MLD may power-up the softAP associated with the non-primary link when (or within a configured time) the non-primary link becomes available. In this multi-link state, the NSTR softAP MLD can operate the BSS on both the primary and non-primary links.

Figure 21:
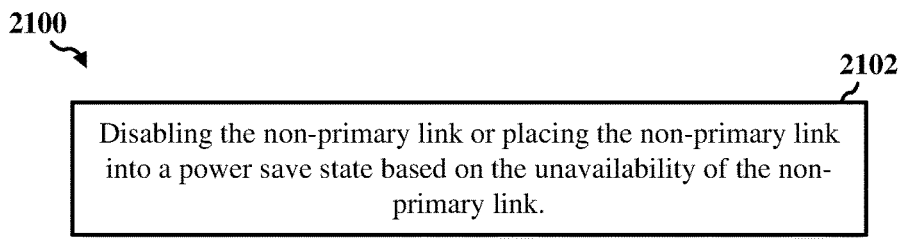

FIG. 21 shows a flowchart illustrating an example process 2100 for wireless communications that supports multi-link communications with an NSTR softAP MLD according to some implementations. The process 2100 may be performed by a wireless communication device such as the wireless communication device 500 described above with reference to FIG. 5. In some implementations, the process 2100 may be performed by a wireless communication device operating as or within a STA, such as one of the STAs 104 and 604 described above with reference to FIGS. 1 and 6B, respectively. In some instances, the process 2100 may be performed by an AP MLD such as the NSTR softAP MLD described with reference to FIG. 7B.

In some implementations, the process 2100 may be performed after determining the unavailability of the non-primary link in block 1604 of FIG. 16. For example, at block 2102, the process 2100 begins with disabling the non-primary link or placing the non-primary link into a power save state based on the unavailability of the non-primary link. In some instances, the NSTR softAP MLD may also place the softAP (or other transmit chains, receive chains, signal processing circuitry, and so on) associated with the non-primary link into a sleep state, a doze state, or a power-off state while remaining fully operational on the primary link. In this way, the NSTR softAP MLD may reduce power consumption associated with operating on the non-primary link, and may also reduce cross-link interference resulting from UL transmissions on the non-primary link.

Figure 22:
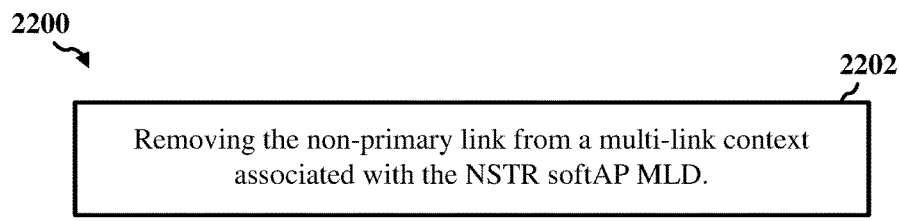

FIG. 22 shows a flowchart illustrating an example process 2200 for wireless communications that supports multi-link communications with an NSTR softAP MLD according to some implementations. The process 2200 may be performed by a wireless communication device such as the wireless communication device 500 described above with reference to FIG. 5. In some implementations, the process 2200 may be performed by a wireless communication device operating as or within a STA, such as one of the STAs 104 and 604 described above with reference to FIGS. 1 and 6B, respectively. In some instances, the process 2200 may be performed by an AP MLD such as the NSTR softAP MLD described with reference to FIG. 7B.

In some implementations, the process 2200 may be one implementation of disabling the non-primary link in block 2102 of FIG. 21. For example, at block 2202, the process 2200 begins with removing the non-primary link from a multi-link context associated with the NSTR softAP MLD. In some instances, when the non-primary link is removed from the multi-link context, wireless communication devices associated with the NSTR softAP MLD may not be able to access or utilize the non-primary link. In some aspects, the NSTR softAP MLD may transmit a Notification frame on the primary link to indicate that the non-primary link is no longer included in the multi-link context.

Figure 23:
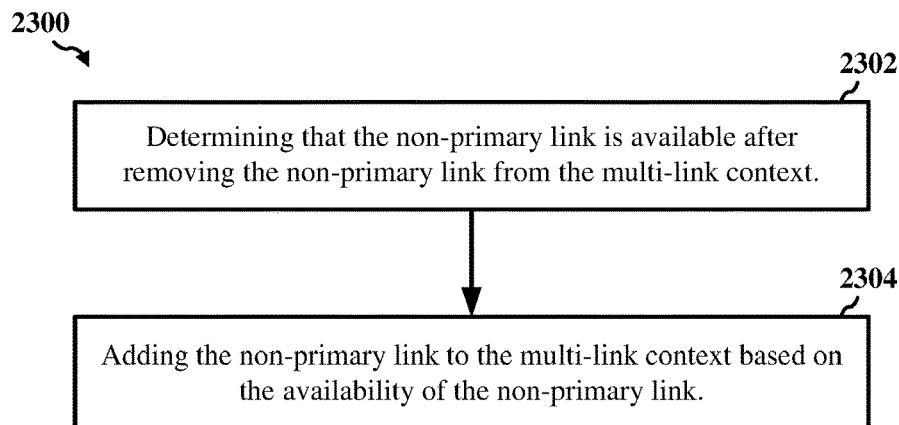

FIG. 23 shows a flowchart illustrating an example process 2300 for wireless communications that supports multi-link communications with an NSTR softAP MLD according to some implementations. The process 2300 may be performed by a wireless communication device such as the wireless communication device 500 described above with reference to FIG. 5. In some implementations, the process 2300 may be performed by a wireless communication device operating as or within a STA, such as one of the STAs 104 and 604 described above with reference to FIGS. 1 and 6B, respectively. In some instances, the process 2300 may be performed by an AP MLD such as the NSTR softAP MLD described with reference to FIG. 7B.

In some implementations, the process 2300 may be performed after removing the non-primary link from the multi-link context in block 2202 of FIG. 22. For example, at block 2302, the process 2300 begins with determining that the non-primary link is available after removing the non-primary link from the multi-link context. At block 2304, the process 2300 continues with adding the non-primary link to the multi-link context based on the determined availability of the non-primary link. In some instances, wireless communication devices associated with the NSTR softAP MLD may be able access and utilize the non-primary link, without disassociating or reassociating with the NSTR softAP MLD, once the non-primary link is added to the multi-link context. In some aspects, the NSTR softAP MLD may transmit a Notification frame on the primary link to indicate that the non-primary link has been added to the multi-link context.

Figure 24:
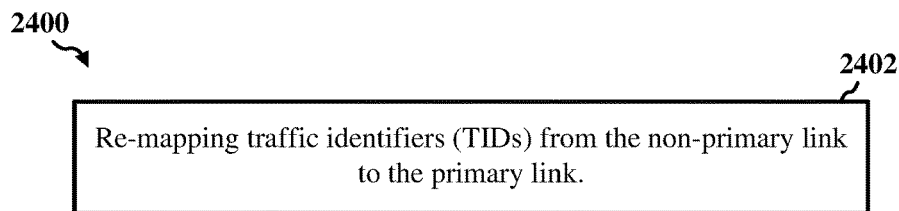

FIG. 24 shows a flowchart illustrating an example process 2400 for wireless communications that supports multi-link communications with an NSTR softAP MLD according to some implementations. The process 2400 may be performed by a wireless communication device such as the wireless communication device 500 described above with reference to FIG. 5. In some implementations, the process 2400 may be performed by a wireless communication device operating as or within a STA, such as one of the STAs 104 and 604 described above with reference to FIGS. 1 and 6B, respectively. In some instances, the process 2400 may be performed by an AP MLD such as the NSTR softAP MLD described with reference to FIG. 7B.

In some implementations, the process 2400 may be another implementation of disabling the non-primary link in block 2102 of FIG. 21. For example, at block 2402, the process 2400 begins with re-mapping traffic identifiers (TIDs) from the non-primary link to the primary link. As an example, the primary link may be initially associated or affiliated with a first TID value that indicates a first type or flow of traffic, and the non-primary link may be initially associated or affiliated with a second TID value that indicates a second type or flow of traffic. When the non-primary link is unavailable, the NSTR softAP MLD can re-map the second TID value from the non-primary link to the primary link. In this way, traffic types or flows indicated by the second TID value may be communicated on the primary link (rather than the non-primary link). In some aspects, the NSTR softAP MLD may transmit a Notification frame on the primary link to indicate that the TIDs affiliated with the non-primary link have been re-mapped to the primary link.

Figure 25:
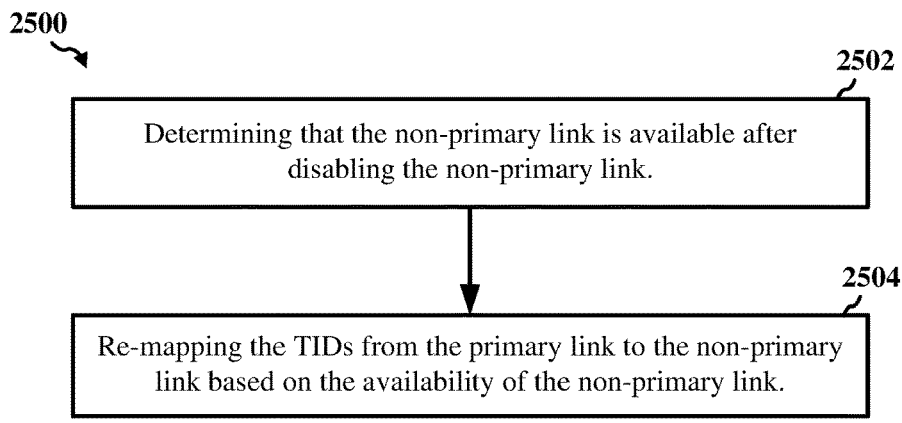

FIG. 25 shows a flowchart illustrating an example process 2500 for wireless communications that supports multi-link communications with an NSTR softAP MLD according to some implementations. The process 2500 may be performed by a wireless communication device such as the wireless communication device 500 described above with reference to FIG. 5. In some implementations, the process 2500 may be performed by a wireless communication device operating as or within a STA, such as one of the STAs 104 and 604 described above with reference to FIGS. 1 and 6B, respectively. In some instances, the process 2500 may be performed by an AP MLD such as the NSTR softAP MLD described with reference to FIG. 7B.

In some implementations, the process 2500 may be performed after re-mapping the TIDs from the non-primary link to the primary link in block 2402 of FIG. 24. For example, at block 2502, the process 2500 begins with determining that the non-primary link is available after disabling the non-primary link. At block 2504, the process 2500 continues with re-mapping the TIDs from the primary link to the non-primary link based on the availability of the non-primary link. Continuing with the example described with reference to FIG. 24, when the non-primary link becomes available, the NSTR softAP MLD may re-map the second TID value from the primary link to the non-primary link. In this way, the communication of traffic types or flows indicated by the second TID value may be returned to the non-primary link. In some aspects, the NSTR softAP MLD may transmit a Notification frame on the primary link to indicate that some TIDs affiliated with the primary link have been re-mapped to the non-primary link.

Figure 26:
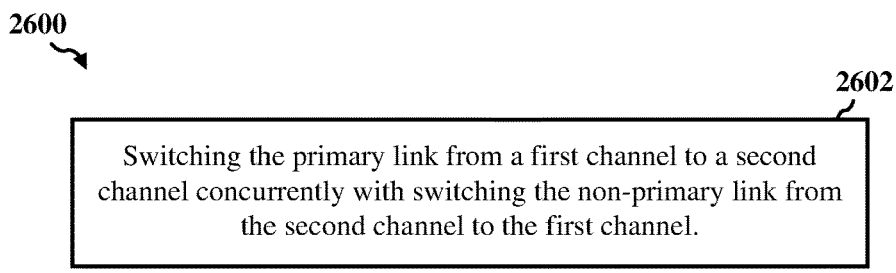

FIG. 26 shows a flowchart illustrating an example process 2600 for wireless communications that supports multi-link communications with an NSTR softAP MLD according to some implementations. The process 2600 may be performed by a wireless communication device such as the wireless communication device 500 described above with reference to FIG. 5. In some implementations, the process 2600 may be performed by a wireless communication device operating as or within a STA, such as one of the STAs 104 and 604 described above with reference to FIGS. 1 and 6B, respectively. In some instances, the process 2600 may be performed by an AP MLD such as the NSTR softAP MLD described with reference to FIG. 7B.

In some implementations, the process 2600 may be performed after transmitting the frame in block 1606 of FIG. 16. For example, at block 2602, the process 2600 begins with switching the primary link from a first channel to a second channel concurrently with switching the non-primary link from the second channel to the first channel. In some instances, the first channel is in one of a 5 GHz frequency band or a 6 GHz frequency band, and the second channel is in the other of the 5 GHz frequency band or the 6 GHz frequency band.

Figure 27:
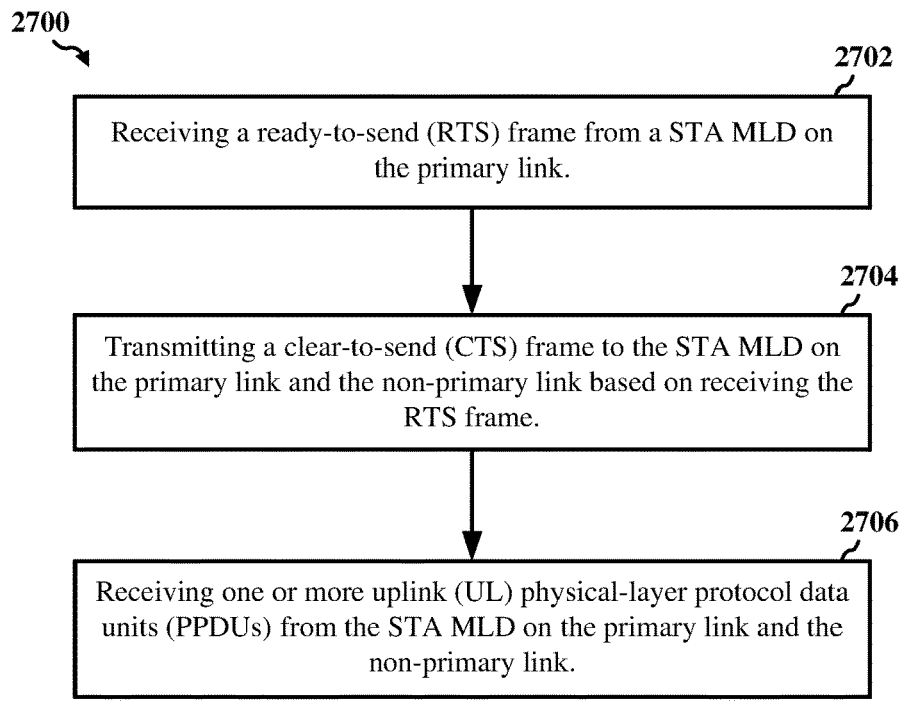

FIG. 27 shows a flowchart illustrating an example process 2700 for wireless communications that supports multi-link communications with an NSTR softAP MLD according to some implementations. The process 2700 may be performed by a wireless communication device such as the wireless communication device 500 described above with reference to FIG. 5. In some implementations, the process 2700 may be performed by a wireless communication device operating as or within a STA, such as one of the STAs 104 and 604 described above with reference to FIGS. 1 and 6B, respectively. In some instances, the process 2700 may be performed by an AP MLD such as the NSTR softAP MLD described with reference to FIG. 8A.

In some implementations, the process 2700 begins at block 2702 with receiving a ready-to-send (RTS) frame from a STA MLD on the primary link. At block 2704, the process 2700 continues with transmitting a clear-to-send (CTS) frame to the STA MLD on the primary and non-primary links based on receiving the RTS frame. At block 2706, the process 2700 continues with receiving one or more uplink (UL) physical-layer protocol data units (PPDUs) from the STA MLD on the primary link and the non-primary link. In some instances, the NSTR softAP MLD may indicate the availability of the non-primary link by transmitting the CTS frame on both the primary and non-primary links. When the STA MLD receives the CTS frame on both the primary and non-primary links, the STA MLD may transmit UL data on both the primary and non-primary links. Conversely, when the STA MLD receives the CTS frame on only the primary link, the STA MLD may transmit UL data to the NSTR softAP MLD on only the primary link.

Figure 28:
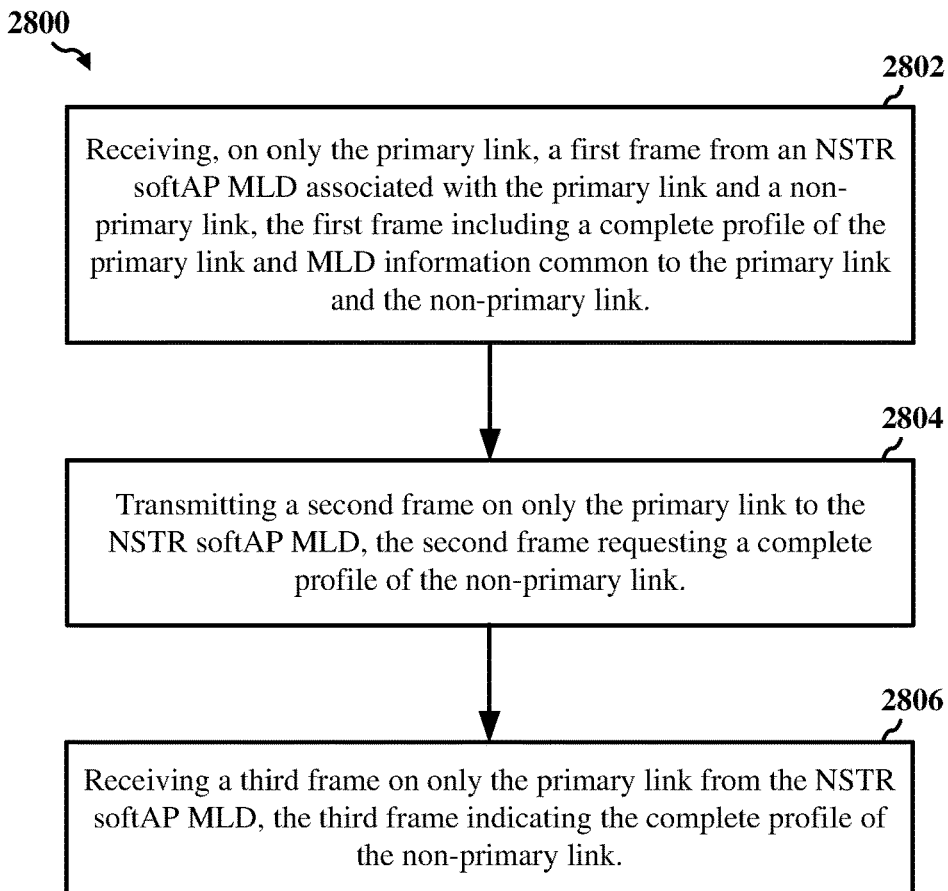

FIG. 28 shows a flowchart illustrating an example process 2800 for wireless communications that supports multi-link communications with an NSTR softAP MLD according to some implementations. The process 2800 may be performed by a wireless communication device such as the wireless communication device 500 described above with reference to FIG. 5. In some implementations, the process 2800 may be performed by a wireless communication device operating as or within a STA, such as one of the STAs 104 and 604 described above with reference to FIGS. 1 and 6B, respectively. In some instances, the process 2800 may be performed by a STA MLD such as the STA MLD described with reference to FIG. 8B.

In some implementations, the process 2800 begins in block 2802 with receiving, on only the primary link, a first frame from an NSTR softAP MLD associated with the primary link and a non-primary link. The first frame may include a complete profile of the primary link and MLD information common to the primary link and the non-primary link. The complete profile may include at least a beacon interval, capability information, an SSID, supported rates, a TSF value, and one or more additional fields or elements associated with discovery of the primary link. In block 2804, the process 2800 continues with transmitting a second frame on only the primary link to the NSTR softAP MLD, the second frame requesting a complete profile of the non-primary link. In block 2806, the process 2800 continues with receiving a third frame on only the primary link from the NSTR softAP MLD, the third frame indicating the complete profile of the non-primary link. In some instances, the first frame may be one of a beacon frame, a probe response frame, an association response frame, or a reassociation response frame. The second frame may be one of a probe request frame, an association request frame, or a reassociation request frame. The third frame may be one of a probe response frame, an association response frame, or a reassociation response frame.

In some implementations, the first frame contains a frame body including a plurality of fields and elements carrying the complete profile of the primary link and including an ML Element consisting of the MLD common information. The third frame may contain a frame body including an ML Element carrying a Per-STA Profile subelement indicating the complete profile of the non-primary link. The body of the third frame may also include an RNR Element carrying a Neighbor AP Information field associated with the non-primary link. The Neighbor AP Information field may carry a TBTT Information field consisting of a BSSID and one or more MLD parameters of the non-primary link. In some instances, the TBTT offset, short-SSID, BSS parameters, and PSD parameters of the non-primary link may be inherited from the primary link. The TBTT offset subfield, short-SSID subfield, BSS parameters subfield, and PSD subfield may thus be omitted from the TBTT Information field in the Neighbor AP Information field associated with the non-primary link, thereby reducing the size and overhead of the RNR Element. In some aspects, the length of the TBTT Information field is 9 octets.

Figure 29:
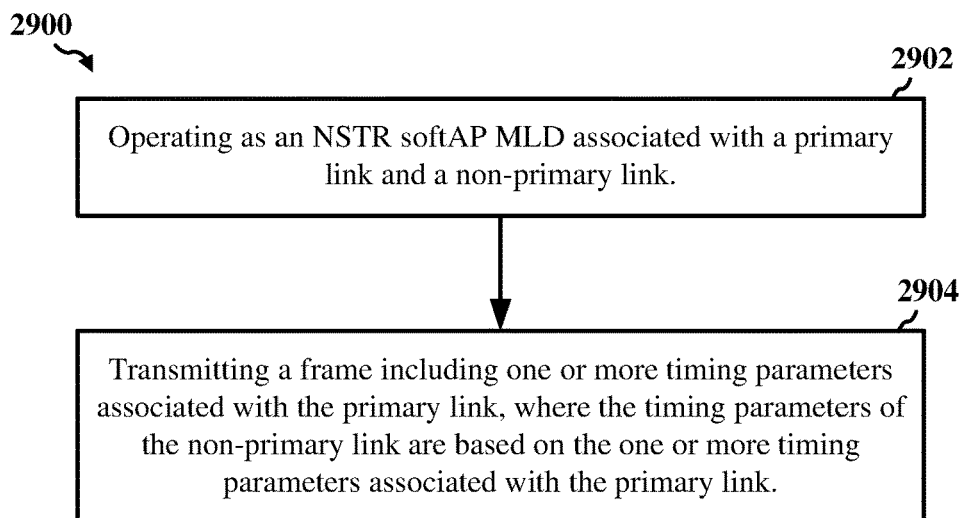

FIG. 29 shows a flowchart illustrating an example process 2900 for wireless communications that supports multi-link communications with an NSTR softAP MLD according to some implementations. The process 2900 may be performed by a wireless communication device such as the wireless communication device 500 described above with reference to FIG. 5. In some implementations, the process 2900 may be performed by a wireless communication device operating as or within a STA, such as one of the STAs 104 and 604 described above with reference to FIGS. 1 and 6B, respectively. In some instances, the process 2900 may be performed by an AP MLD such as the NSTR softAP MLD described with reference to FIG. 7A.

In some implementations, the process 2900 begins in block 2902 with operating as an NSTR softAP MLD associated with a primary link and a non-primary link. In block 2904, the process 2900 continues with transmitting, on only the primary link, a frame including one or more timing parameters associated with the primary link, where the timing parameters of the non-primary link are based on the one or more timing parameters associated with the primary link. In some aspects, the timing parameters of the non-primary link are inherited from the primary link. The frame may be one of a beacon frame, a probe response frame, an association response frame, or a reassociation response frame. In some instances, the primary link is associated with a target beacon transmission time (TBTT), and the non-primary link may be a pseudo-BSS aligned with the TBTT of the primary link. The one or more timing parameters may include at least one of a channel switch announcement, a quiet period, or a beacon interval.

Figure 30:
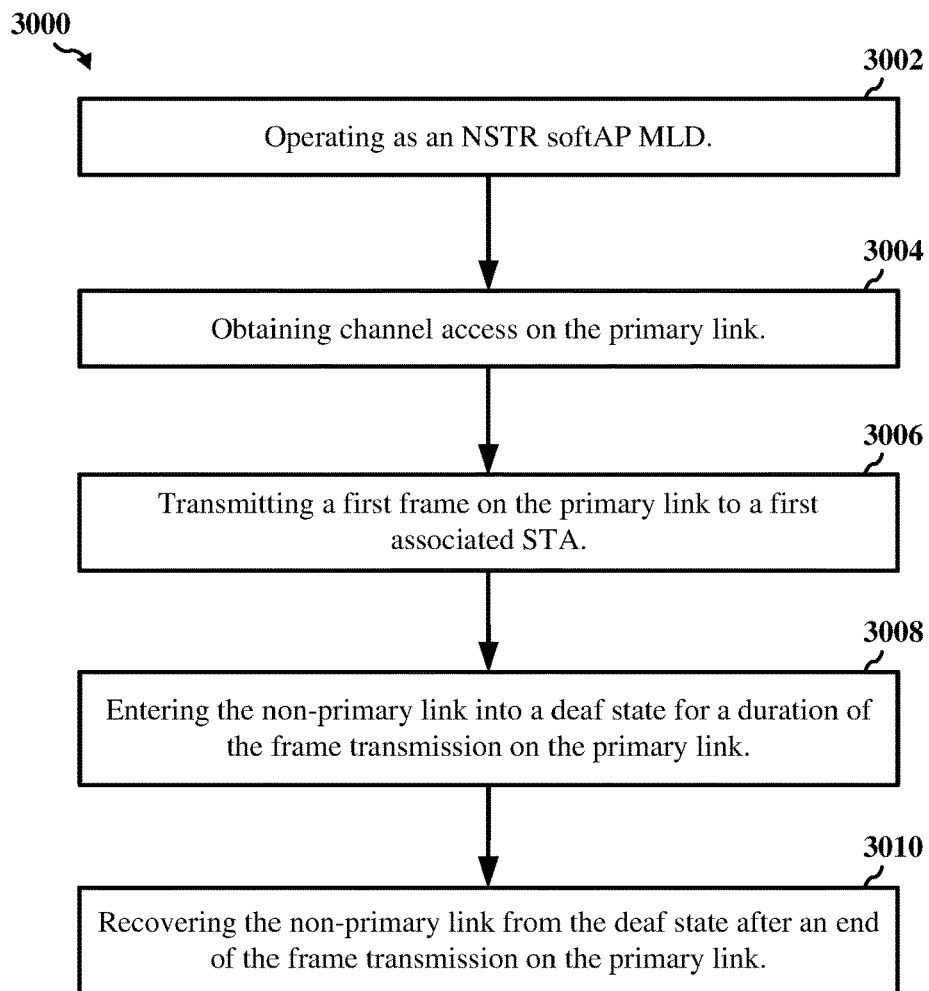

FIG. 30 shows a flowchart illustrating an example process 3000 for wireless communications with an NSTR softAP MLD according to some implementations. The process 3000 may be performed by a wireless communication device such as the wireless communication device 500 described above with reference to FIG. 5. In some implementations, the process 3000 may be performed by a wireless communication device operating as or within a STA, such as one of the STAs 104 and 604 described above with reference to FIGS. 1 and 6B, respectively. In some instances, the process 3000 may be performed by an AP MLD such as the NSTR softAP MLD described with reference to FIG. 9A.

In some implementations, the process 3000 begins in block 3002 with operating as an NSTR softAP MLD associated with a primary link and a non-primary link. In block 3004, the process 3000 continues with obtaining channel access on the primary link. In block 3006, the process 3000 continues with transmitting a first frame on the primary link to a first associated STA. In block 3008, the process 3000 continues with entering the non-primary link into a deaf state for a duration of the frame transmission on the primary link. In block 3010, the process 3000 continues with recovering the non-primary link from the deaf state after an end of the frame transmission on the primary link. In some implementations, the frame may be any suitable frame including (but not limited to) a management frame, a control frame, or a data frame.

Figure 31:
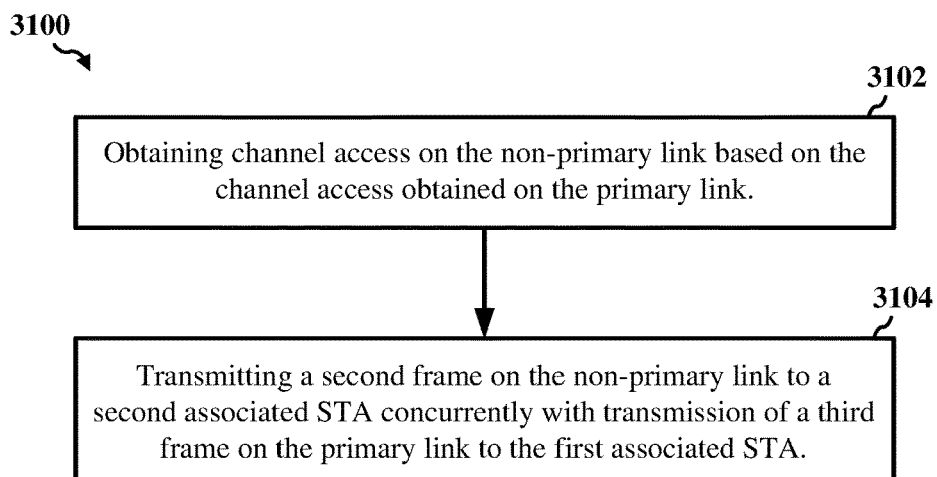

FIG. 31 shows a flowchart illustrating an example process 3100 for wireless communications that supports multi-link communications with an NSTR softAP MLD according to some implementations. The process 3100 may be performed by a wireless communication device such as the wireless communication device 500 described above with reference to FIG. 5. In some implementations, the process 3100 may be performed by a wireless communication device operating as or within a STA, such as one of the STAs 104 and 604 described above with reference to FIGS. 1 and 6B, respectively. In some instances, the process 3100 may be performed by an AP MLD such as the NSTR softAP MLD described with reference to FIG. 9A.

In some implementations, the process 3100 may be performed after recovering the non-primary link in block 3010 of FIG. 30. For example, at block 3102, the process 3100 begins with obtaining channel access on the non-primary link based on the channel access to the primary link. At block 3104, the process 3100 continues with transmitting a second frame on the non-primary link to a second associated STA concurrently with the transmission of a third frame on the primary link to the first associated STA. In some implementations, the NSTR softAP MLD may synchronize transmission of the second frame on the non-primary link with the transmission of the third frame on the primary link. In some instances, the first associated STA is a legacy device configured to operate in accordance with the IEEE 802.11ax or earlier amendments to the 802.11 family of wireless communication standards, and the second associated STA is a non-legacy device configured to operate in accordance with the IEEE 802.11be or later amendments to the 802.11 family of wireless communication standards.

Figure 32:
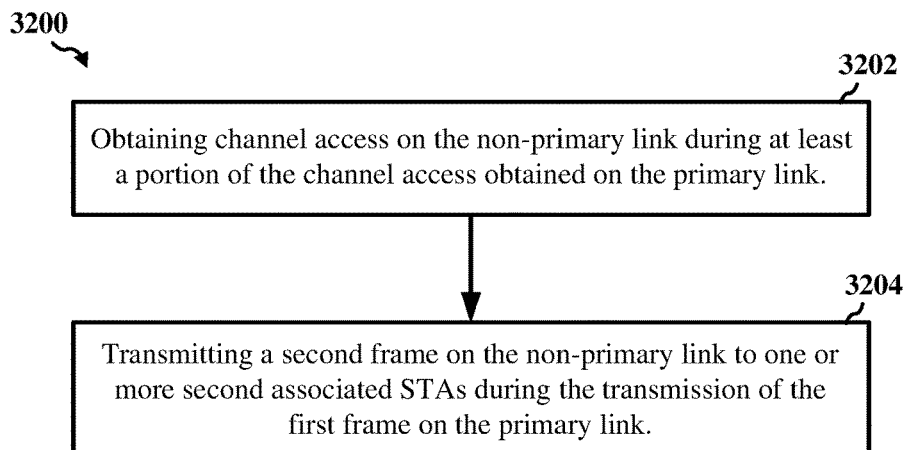

FIG. 32 shows a flowchart illustrating an example process 3200 for wireless communications that supports multi-link communications with an NSTR softAP MLD according to some implementations. The process 3200 may be performed by a wireless communication device such as the wireless communication device 500 described above with reference to FIG. 5. In some implementations, the process 3200 may be performed by a wireless communication device operating as or within a STA, such as one of the STAs 104 and 604 described above with reference to FIGS. 1 and 6B, respectively. In some instances, the process 3200 may be performed by an AP MLD such as the NSTR softAP MLD described with reference to FIG. 9A.

In some implementations, the process 3200 may be performed after recovering the non-primary link in block 3010 of FIG. 30. For example, at block 3202, the process 3200 begins with obtaining channel access on the non-primary link during at least a portion of the channel access obtained on the primary link. At block 3204, the process 3200 continues with transmitting a second frame on the non-primary link to one or more second associated STAs during the transmission of the first frame on the primary link.

Figure 33:
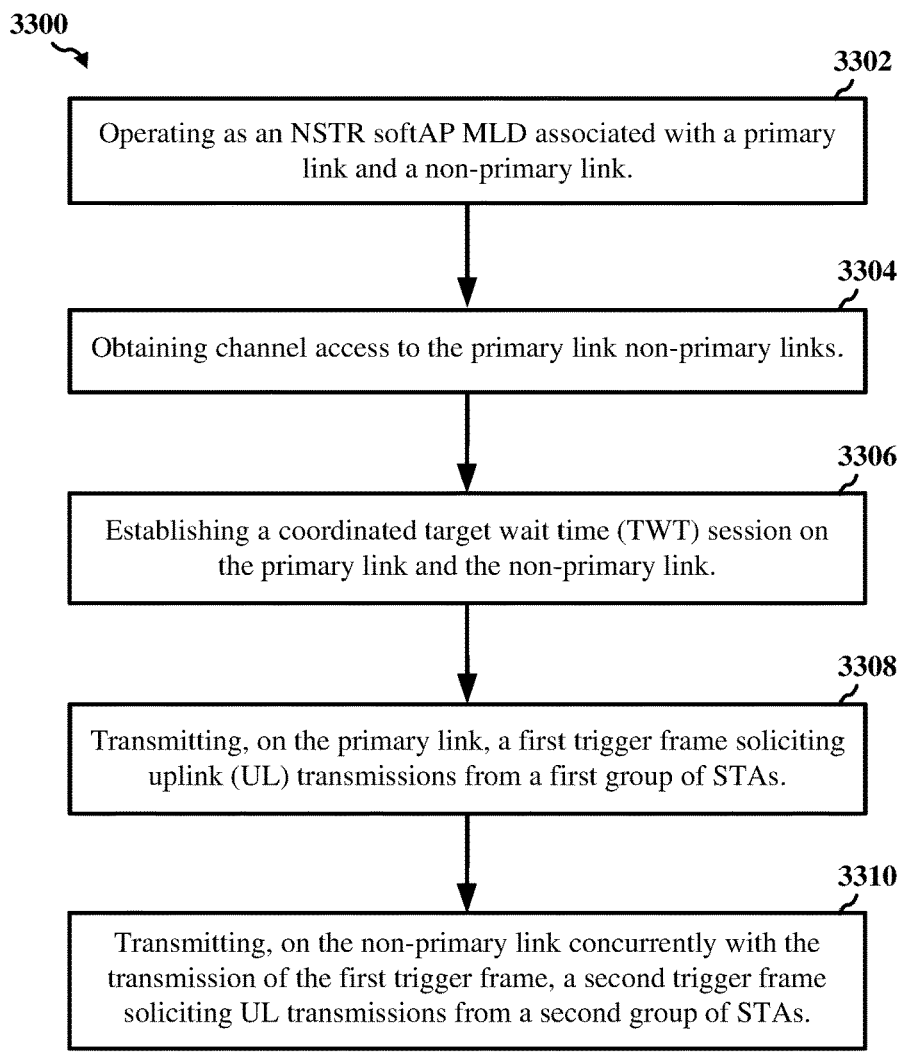

FIG. 33 shows a flowchart illustrating an example process 3300 for wireless communications with an NSTR softAP MLD according to some implementations. The process 3300 may be performed by a wireless communication device such as the wireless communication device 500 described above with reference to FIG. 5. In some implementations, the process 3300 may be performed by a wireless communication device operating as or within a STA, such as one of the STAs 104 and 604 described above with reference to FIGS. 1 and 6B, respectively. In some instances, the process 3300 may be performed by an AP MLD such as the NSTR softAP MLD described with reference to FIG. 9B.

In some implementations, the process 3300 begins in block 3302 with operating as an NSTR softAP MLD associated with a primary link and a non-primary link. In block 3304, the process 3300 continues with obtaining channel access to the primary link and the non-primary link. In block 3306, the process 3300 continues with establishing a coordinated target wait time (TWT) session on the primary link and the non-primary link. In block 3308, the process 3300 continues with transmitting a first trigger frame on the primary link, the first trigger frame soliciting uplink (UL) transmissions from a first group of STAs on the primary link. In block 3310, the process 3300 continues with transmitting a second trigger frame on the non-primary link concurrently with the transmission of the first trigger frame on the primary link, the second trigger frame soliciting UL transmissions from a second group of STAs on the non-primary link. In some instances, the coordinated TWT sessions may include one or more respective service periods (SPs) during which corresponding STAs or corresponding groups of STAs can be scheduled or triggered for UL transmissions on the respective primary and non-primary links.

Figure 34:
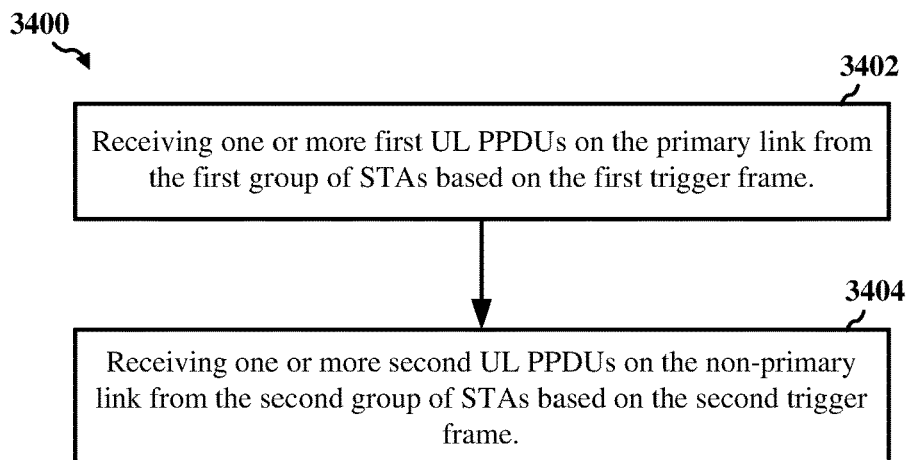

FIG. 34 shows a flowchart illustrating an example process 3400 for wireless communications with an NSTR softAP MLD according to some implementations. The process 3400 may be performed by a wireless communication device such as the wireless communication device 500 described above with reference to FIG. 5. In some implementations, the process 3400 may be performed by a wireless communication device operating as or within a STA, such as one of the STAs 104 and 604 described above with reference to FIGS. 1 and 6B, respectively. In some instances, the process 3400 may be performed by an AP MLD such as the NSTR softAP MLD described with reference to FIG. 9B.

In some implementations, the process 3400 may be performed after transmitting the trigger frames in blocks 3308 and 3310 of FIG. 33. For example, the process 3400 may begin in block 3402 with receiving one or more first UL PPDUs on the primary link from the first group of STAs based on the first trigger frame. In block 3404, the process 3400 continues receiving one or more second UL PPDUs on the non-primary link from the second group of STAs based on the second trigger frame. In some instances, transmissions of the first and second UL PPDUs from the first and second respective groups of STAs may be synchronized with one other.

Figure 35:
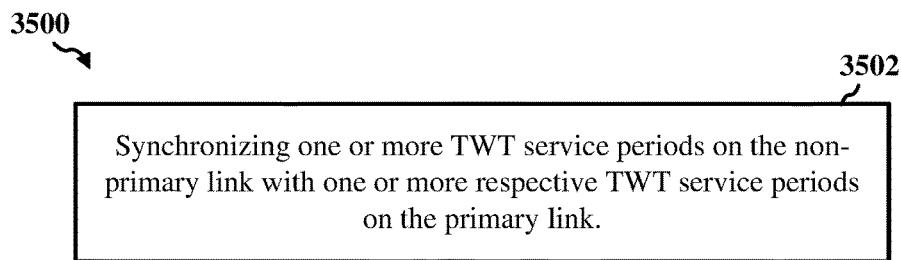

FIG. 35 shows a flowchart illustrating an example process 3500 for wireless communications with an NSTR softAP MLD according to some implementations. The process 3500 may be performed by a wireless communication device such as the wireless communication device 500 described above with reference to FIG. 5. In some implementations, the process 3500 may be performed by a wireless communication device operating as or within a STA, such as one of the STAs 104 and 604 described above with reference to FIGS. 1 and 6B, respectively. In some instances, the process 3500 may be performed by an AP MLD such as the NSTR softAP MLD described with reference to FIG. 9B.

In some implementations, the process 3500 may be performed in conjunction with the process 3300 of FIG. 33. For example, the process 3500 may begin in block 3502 with synchronizing one or more TWT service periods on the non-primary link with one or more respective TWT service periods on the primary link. In this way, transmission of the one or more first UL PPDUs by the first group of STAs on the primary link can temporally aligned with the transmission of the one or more second UL PPDUs by the second group of STAs on the non-primary link.

Figure 36:
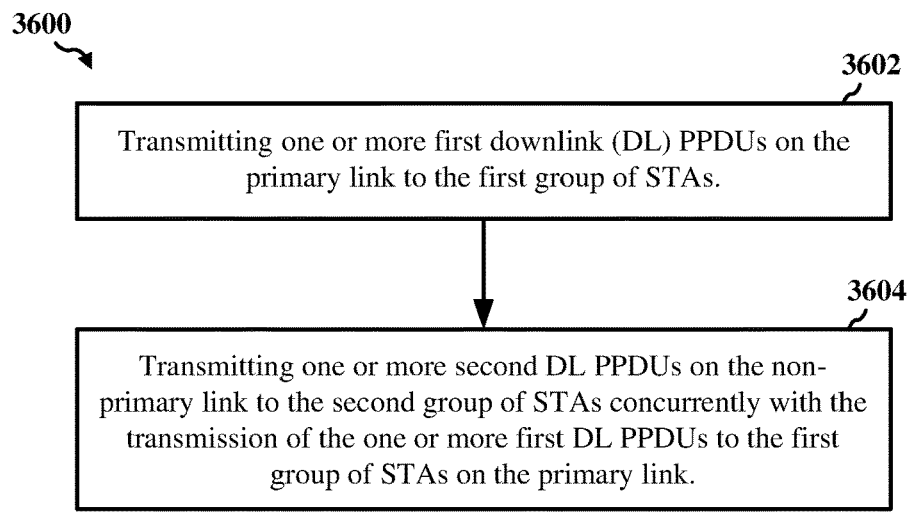

FIG. 36 shows a flowchart illustrating an example process 3600 for wireless communications that supports multi-link communications with an NSTR softAP MLD according to some implementations. The process 3600 may be performed by a wireless communication device such as the wireless communication device 500 described above with reference to FIG. 5. In some implementations, the process 3600 may be performed by a wireless communication device operating as or within a STA, such as one of the STAs 104 and 604 described above with reference to FIGS. 1 and 6B, respectively. In some instances, the process 3600 may be performed by an AP MLD such as the NSTR softAP MLD described with reference to FIG. 9B.

In some implementations, the process 3600 may be performed after receiving the one or more first and second UL PPDUs in blocks 3402 and 3404 of FIG. 34. For example, the process 3600 may begin in block 3602 with transmitting one or more first downlink (DL) PPDUs on the primary link to the first group of STAs. In block 3604, the process 3600 continues with transmitting one or more second DL PPDUs on the non-primary link to the second group of STAs concurrently with the transmission of the one or more first DL PPDUs to the first group of STAs on the primary link.

Figure 37:
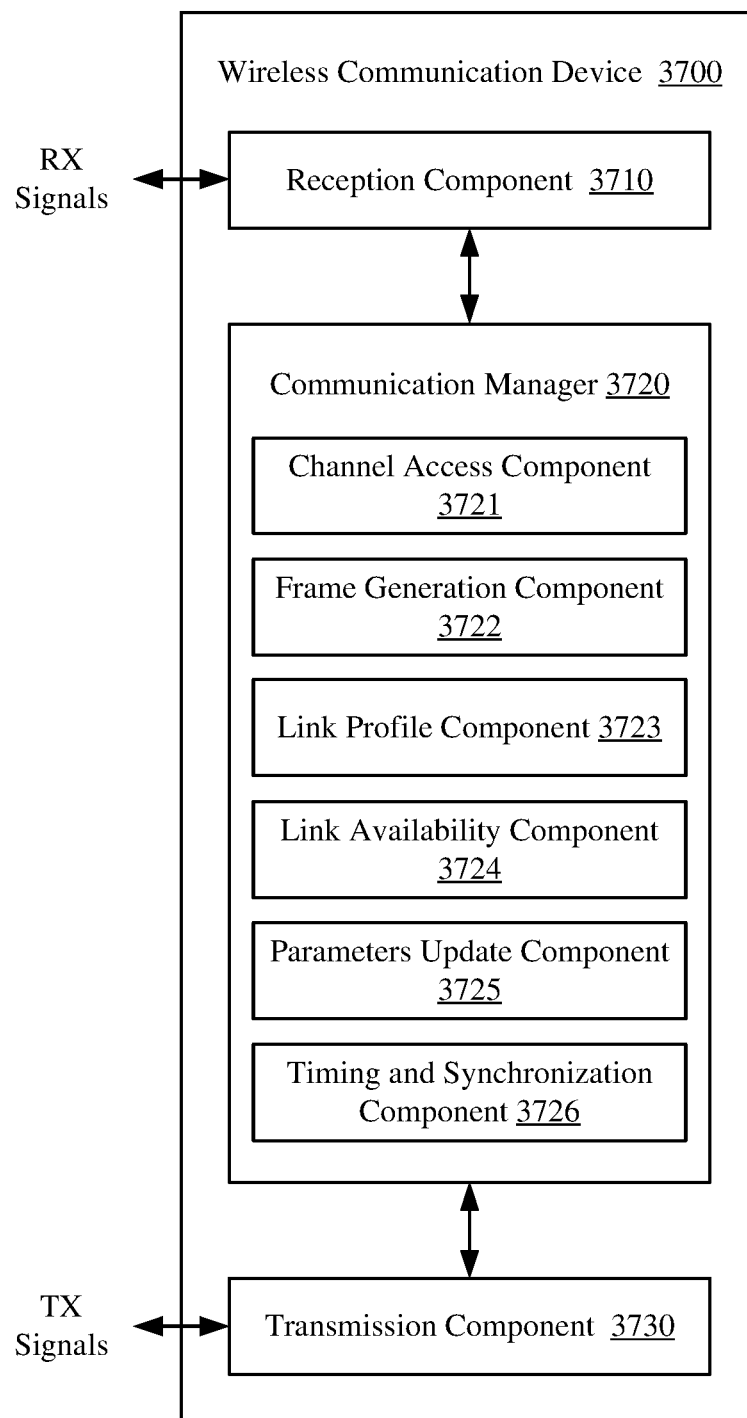
FIG. 37 shows a block diagram of an example wireless communication device according to some implementations.

FIG. 37 shows a block diagram of an example wireless communication device 3700 according to some implementations. In some implementations, the wireless communication device 3700 is configured to perform the communications 700 of FIG. 7A, the communications 710 of FIG. 7B, or the communications 810 of FIG. 8A. The wireless communication device 3700 can be an example implementation of the wireless communication device 500 described above with reference to FIG. 5. For example, the wireless communication device 3700 can be a chip, SoC, chipset, package or device that includes at least one processor and at least one modem (for example, a Wi-Fi (IEEE 802.11) modem or a cellular modem). In some implementations, the wireless communication device 3700 can be a device for use in a STA, such as one of the STAs 104 and 604 described with reference to FIGS. 1 and 6B, respectively. In some other implementations, the wireless communication device 3700 can be a STA that includes such a chip, SoC, chipset, package or device as well as at least one antenna (such as the antennas 625 of FIG. 6B). In various implementations, the wireless communication device 3700 may be an example of one or more of the NSTR softAP MLDs described herein.

The wireless communication device 3700 includes a reception component 3710, a communication manager 3720, and a transmission component 3730. The communication manager 3720 further includes a channel access component 3721, a frame generation component 3722, a link profile component 3723, a link availability component 3724, a parameters update component 3725, and a timing and synchronization component 3726. Portions of one or more of the components may be implemented at least in part in hardware or firmware. In some implementations, at least some of the components 3721, 3722, 3723, 3724, 3725, and 3726 are implemented at least in part as software stored in a memory (such as the memory 508 of FIG. 5). For example, portions of one or more of the components 3721, 3722, 3723, 3724, 3725, and 3726 can be implemented as non-transitory instructions (or "code") executable by a processor (such as the processor 506 of FIG. 5) to perform the functions or operations of the respective component.

The reception component 3710 is configured to receive RX signals over one or more wireless channels or links from other wireless communication devices. The communication manager 3720 is configured to control or manage communications with the other wireless communication devices. In some implementations, the channel access component 3721 contends for and obtains channel access to a primary link and/or a non-primary link associated with the wireless communication device 3700. The frame generation component 3722 generates frames for transmitting discovery information, profile information, operation parameters, updates to the operation parameters, link availability, link timing references, and other suitable information pertaining to an MLD operating on the primary link and the non-primary link. The link profile component 3723 generates a complete profile or a partial profile for one or more of the primary link and the non-primary link. The link availability component 3724 indicates whether or not the primary link and/or the non-primary link are available. The parameters update component 3725 determines changes to one or more parameters of the primary link and the non-primary link, and transmits indications of the parameter updates. The timing and synchronization component 3726 generates timing references for the non-primary link relative to the primary link.

The transmission component 3730 is configured to transmit TX signals, over the wireless channel, to one or more other wireless communication devices. In some implementations, the transmission component 3730 may transmit frames that include or indicate discovery information, profile information, operation parameters, updates to the operation parameters, link availability, link timing references, and other suitable information pertaining to the primary link and the non-primary link associated with the wireless communication device 3700.

Figure 38:
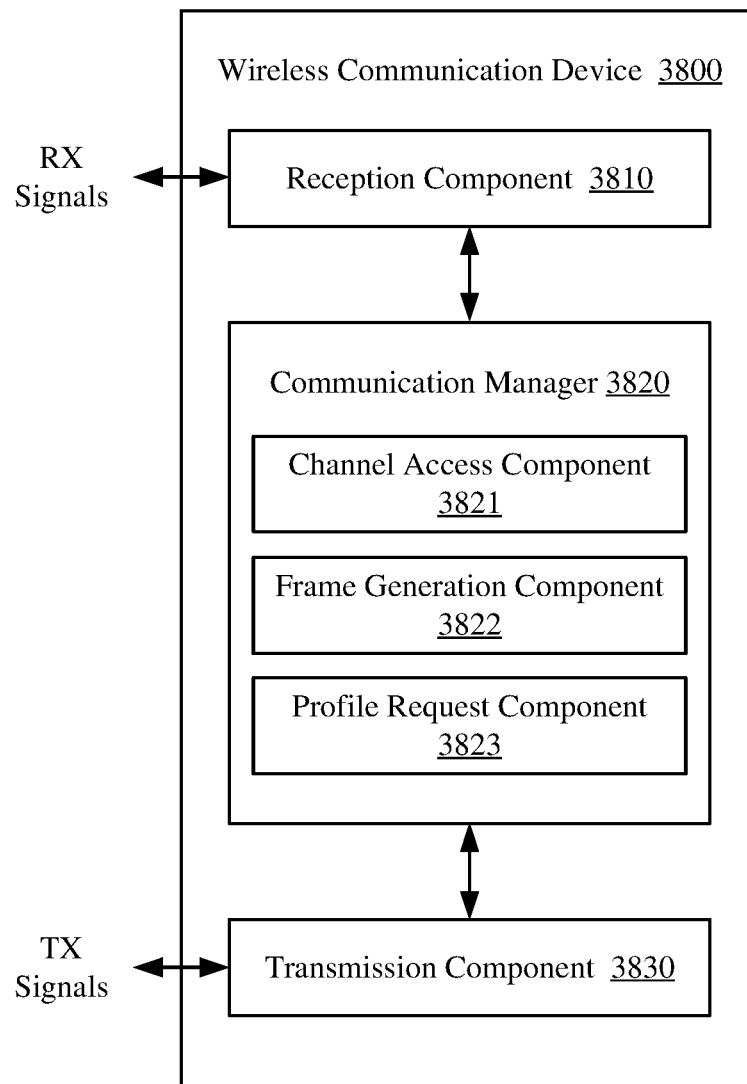
FIG. 38 shows a block diagram of another example wireless communication device according to some implementations.

FIG. 38 shows a block diagram of another example wireless communication device 3800 according to some implementations. In some implementations, the wireless communication device 3800 is configured to perform the communications 810 of FIG. 8B. The wireless communication device 3800 can be an example implementation of the wireless communication device 500 described above with reference to FIG. 5. For example, the wireless communication device 3800 can be a chip, SoC, chipset, package or device that includes at least one processor and at least one modem (for example, a Wi-Fi (IEEE 802.11) modem or a cellular modem). In some implementations, the wireless communication device 3800 can be a device for use in a STA, such as one of the STAs 104 and 604 described with reference to FIGS. 1 and 6B, respectively. In some other implementations, the wireless communication device 3800 can be a STA that includes such a chip, SoC, chipset, package or device as well as at least one antenna (such as the antennas 625 of FIG. 6B). In various implementations, the wireless communication device 3800 may be an example of one or more of the STA MLDs described herein.

The wireless communication device 3800 includes a reception component 3810, a communication manager 3820, and a transmission component 3830. The communication manager 3820 further includes a channel access component 3821, a frame generation component 3822, and a profile request component 3823. Portions of one or more of the components may be implemented at least in part in hardware or firmware. In some implementations, at least some of the components 3821, 3822, and 3823 are implemented at least in part as software stored in a memory (such as the memory 508). For example, portions of one or more of the components 3821, 3822, and 3823 can be implemented as non-transitory instructions (or "code") executable by a processor (such as the processor 506) to perform the functions or operations of the respective component.

The reception component 3810 is configured to receive RX signals over one or more wireless channels or links from other wireless communication devices. The communication manager 3820 is configured to control or manage communications with the other wireless communication devices. In some implementations, the channel access component 3821 contends for and obtains channel access to a primary link and/or a non-primary link associated with an AP MLD such as a NSTR softAP MLD. The frame generation component 3822 generates frames for carrying capabilities and operation parameters of the wireless communication device 3800. The profile request component 3823 generates a request for the AP MLD to provide the complete profile or the partial profile of one or more of the primary link and the non-primary link.

The transmission component 3830 is configured to transmit TX signals, over the wireless channel, to one or more other wireless communication devices. In some implementations, the transmission component 3830 may transmit frames that include or indicate capabilities, operation parameters, profile requests, and other suitable information pertaining to the primary link and the non-primary link associated with the AP MLD.

Implementation examples are described in the following numbered clauses:

1. A method for wireless communication by a wireless station (STA), including:
   operating as a non-simultaneous transmit-receive (NSTR) soft access point (AP) multi-link device (MLD) including a first AP associated with a primary link and including a second AP associated with a non-primary link; and
   transmitting a frame on only the primary link, the frame including a complete profile of the primary link and indicating a complete profile of the non-primary link, the respective complete profiles of the primary link and the non-primary link each including at least a beacon interval, capability information, a service set identifier (SSID), supported rates, a timing synchronization function (TSF) value, and one or more additional fields or elements associated with discovery of the respective link.
2. The method of clause 1, where the frame is one of a beacon frame, a probe response frame, an association response frame, or a reassociation response frame.
3. The method of any one or more of clauses 1-2, where the beacon interval, the SSID, and the TSF value of the non-primary link are inherited from the primary link.
4. The method of any one or more of clauses 1-3, where the frame contains a frame body including:
   a plurality of fields and elements carrying the complete profile of the primary link; and
   a Multi-Link (ML) Element carrying a Per-STA Profile Subelement indicating the complete profile of the non-primary link.
5. The method of clause 4, where the ML Element further includes a Common Info field carrying a basic service set (BSS) Parameters Change Count (BPCC) value indicating updates to one or more BSS parameters associated with the primary link.
6. The method of any one or more of clauses 4-5, where one or more bits of a Multi-Link Control field or a Common Info field of the ML element indicate whether or not the frame is transmitted from the first AP of the NSTR softAP MLD.
7. The method of any one or more of clauses 4-6, where the frame body further includes a Reduced Neighbor Report (RNR) Element including a Neighbor AP Information field associated with the non-primary link, the Neighbor AP Information field including a target beacon transmission time (TBTT) Information field consisting of a basic service set identification (BSSID) and one or more MLD parameters of the non-primary link.
8. The method of clause 7, where a TBTT offset subfield, a short-SSID subfield, a BSS parameters subfield, and a power spectral density (PSD) subfield are absent from the TBTT Information field corresponding to the non-primary link.
9. The method of any one or more of clauses 7-8, where the Neighbor AP Information field includes a TBTT Information Field type set to a value indicating that the Neighbor AP Information field carries information pertaining only to the non-primary link.
10. The method of clause 9, where the TBTT Information field type is set to 1 or a reserved value.
11. The method of any one or more of clauses 7-10, where a length of the TBTT Information field indicates whether or not the frame is transmitted from the first AP of the NSTR softAP MLD.
12. The method of any one or more of clauses 7-11, where a length of the TBTT Information field is 9 octets.
13. The method of any one or more of clauses 7-12, where the one or more MLD parameters carried in the TBTT Information field includes a basic service set (BSS)

parameter change count (BPCC) value indicating updates to one or more BSS parameters associated with the non-primary link.

14. The method of clause 13, further including:
receiving an update to at least one of the BSS parameters associated with the non-primary link;
incrementing a value of a basic service set (BSS) parameter change count (BPCC) field of a target beacon transmission time (TBTT) Information field included in a Reduced Neighbor Report (RNR) Element of another frame based on the received update;
setting a Critical Update Flag (CUF) in a Capability Information field of the other frame based on incrementing the value of the BPCC field; and
transmitting the other frame on only the primary link, the other frame indicating the update to the at least one BSS parameter associated with the non-primary link.

15. The method of clause 13, where the BSS parameters include at least one of a Channel Switch Announcement (CSA) element, an extended Channel Switch Announcement (eCSA) element, an Enhanced Distributed Channel Access (EDCA) parameter, a Quiet period element, a Direct Sequence Spread Spectrum (DSSS) parameter set, a high-throughput (HT) operation element, a very high-throughput (VHT) operation element, a high-efficiency (HE) operation element, an extremely high-throughput (EHT) operation element, a Wide Bandwidth Channel Switch element, an Operating Mode Notification element, a Broadcast Target Wait Time (TWT) element, a BSS Color Change Announcement element, a Multi-User (MU) EDCA parameter set, a Spatial Reuse parameter set, or an uplink (UL) orthogonal frequency division multiple access (OFDMA) random access (UORA) parameter set.

16. The method of any one or more of clauses 1-15, further including:
receiving an update to one or more basic service set (BSS) parameters associated with the non-primary link; and
transmitting, on only the primary link, the one or more updated BSS parameters associated with the non-primary link.

17. The method of clause 16, where the one or more updated BSS parameters are part of a partial profile of the non-primary link.

18. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
operate as a non-simultaneous transmit-receive (NSTR) soft access point (AP) multi-link device (MLD) including a first AP associated with a primary link and including a second AP associated with a non-primary link; and
transmit a frame on only the primary link, the frame including a complete profile of the primary link and indicating a complete profile of the non-primary link, the respective complete profiles of the primary link and the non-primary link each including at least a beacon interval, capability information, a service set identifier (SSID), supported rates, a timing synchronization function (TSF) value, and one or more additional fields or elements associated with discovery of the respective link.

19. The wireless communication device of clause 18, where the frame is one of a beacon frame, a probe response frame, an association response frame, or a reassociation response frame.

20. The wireless communication device of any one or more of clauses 18-19, where the beacon interval, the SSID, and the TSF value of the non-primary link are inherited from the primary link.

21. The wireless communication device of any one or more of clauses 18-20, where the frame contains a frame body including:
a plurality of fields and elements carrying the complete profile of the primary link; and
a Multi-Link (ML) Element carrying a Per-STA Profile Subelement indicating the complete profile of the non-primary link.

22. The wireless communication device of clause 21, where the ML Element further includes a Common Info field carrying a basic service set (BSS) Parameters Change Count (BPCC) value indicating updates to one or more BSS parameters associated with the primary link.

23. The wireless communication device of any one or more of clauses 21-22, where one or more bits of a Multi-Link Control field or a Common Info field of the ML element indicate whether or not the frame is transmitted from the first AP of the NSTR softAP MLD.

24. The wireless communication device of any one or more of clauses 21-23, where the frame body further includes a Reduced Neighbor Report (RNR) Element including a Neighbor AP Information field associated with the non-primary link, the Neighbor AP Information field including a target beacon transmission time (TBTT) Information field consisting of a basic service set identification (BSSID) and one or more MLD parameters of the non-primary link.

25. The wireless communication device of clause 24, where a TBTT offset subfield, a short-SSID subfield, a BSS parameters subfield, and a power spectral density (PSD) subfield are absent from the TBTT Information field corresponding to the non-primary link.

26. The wireless communication device of any one or more of clauses 24-25, where the Neighbor AP Information field includes a TBTT Information Field type set to a reserved value indicating that the Neighbor AP Information field carries information pertaining only to the non-primary link.

27. The wireless communication device of any one or more of clauses 24-26, where a length of the TBTT Information field indicates whether or not the frame is transmitted from the first AP of the NSTR softAP MLD.

28. The wireless communication device of clause 24, where the one or more MLD parameters carried in the TBTT Information field includes a basic service set (BSS) parameter change count (BPCC) value indicating updates to one or more BSS parameters associated with the non-primary link.

29. The wireless communication device of clause 28, where execution of the processor-readable code is further configured to:
receive an update to at least one of the BSS parameters associated with the non-primary link;

increment a value of a basic service set (BSS) parameter change count (BPCC) field of a target beacon transmission time (TBTT) Information field included in a Reduced Neighbor Report (RNR) Element of another frame based on the received update;

set a Critical Update Flag (CUF) in a Capability Information field of the other frame based on incrementing the value of the BPCC field; and transmit the other frame on only the primary link, the other frame indicating the update to the at least one BSS parameter associated with the non-primary link.

30. The wireless communication device of any one or more of clauses 18-29, where execution of the processor-readable code is further configured to:

receive an update to one or more basic service set (BSS) parameters associated with the non-primary link; and transmit, on only the primary link, the one or more updated BSS parameters associated with the non-primary link.

31. A method for wireless communication by a wireless station (STA), including:

operating as a non-simultaneous transmit-receive (NSTR) soft access point (AP) multi-link device (MLD) including a first AP associated with a primary link and including a second AP associated with a non-primary link;

determining that the non-primary link is unavailable; and transmitting, on only the primary link, a frame carrying an indication of the unavailability of the non-primary link.

32. The method of clause 31, where the frame includes one of a beacon frame, a probe response frame, an association response frame, a reassociation response frame, or an action frame.

33. The method of any one or more of clauses 31-32, where the frame includes a Per-STA Profile subelement or a Reduced Neighbor Report (RNR) element carrying a Do Not Transmit (DNT) bit set to a value of 1, and wherein the DNT bit set to the value of 1 indicates the unavailability of the non-primary link.

34. The method of any one or more of clauses 31-33, where the frame includes a Capability Information field carrying a Critical Update Flag (CUF), the CUF set to a value of 1 based on the unavailability of the non-primary link.

35. The method of any one or more of clauses 31-34, further including:

operating as a single-link device on the primary link based on the unavailability of the non-primary link.

36. The method of clause 35, further including:

determining that the non-primary link is available while operating as the single-link device on the primary link;

resetting a Do Not Transmit (DNT) bit to a value of 0 based on the availability of the non-primary link; and transmitting the reset DNT bit in another frame on only the primary link, the other frame including a Per-STA Profile subelement or a Reduced Neighbor Report (RNR) element carrying the reset DNT bit having the value of 0.

37. The method of any one or more of clauses 31-36, further including:

determining that the non-primary link is available after transmitting the indication;

transmitting, on only the primary link, an indication of the availability of the non-primary link; and operating as a multi-link device on the primary link and the non-primary link based on the availability of the non-primary link.

38. The method of any one or more of clauses 31-36, further including disabling the non-primary link or placing the non-primary link into a power save state based on the unavailability of the non-primary link.

39. The method of clause 38, where disabling the non-primary link includes removing the non-primary link from a multi-link context associated with the NSTR softAP MLD.

40. The method of clause 39, further including:

determining that the non-primary link is available after removing the non-primary link from the multi-link context; and adding the non-primary link to the multi-link context based on the availability of the non-primary link.

41. The method of clause 38, where disabling the non-primary link includes re-mapping traffic identifiers (TIDs) from the non-primary link to the primary link.

42. The method of clause 41, further including:

determining that the non-primary link is available after disabling the non-primary link; and re-mapping the TIDs from the primary link to the non-primary link based on the availability of the non-primary link.

43. The method of any one or more of clauses 31-42, further including:

receiving a ready-to-send (RTS) frame from a STA MLD on the primary link;

transmitting a clear-to-send (CTS) frame to the STA MLD on the primary link and the non-primary link based on receiving the RTS frame; and receiving one or more uplink (UL) physical-layer protocol data units (PPDUs) from the STA MLD on the primary link and the non-primary link.

44. The method of any one or more of clauses 31-42, further including:

switching the primary link from a first channel to a second channel concurrently with switching the non-primary link from the second channel to the first channel.

45. The method of clause 44, where the first channel is in one of a 5 GHz frequency band or a 6 GHz frequency band, and the second channel is in the other of the 5 GHz frequency band or the 6 GHz frequency band.

46. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to:

operate as a non-simultaneous transmit-receive (NSTR) soft access point (AP) multi-link device (MLD) including a first AP associated with a primary link and including a second AP associated with a non-primary link;

determine that the non-primary link is unavailable; and transmit, on only the primary link, a frame carrying an indication of the unavailability of the non-primary link.

47. The wireless communication device of clause 46, where the frame includes one of a beacon frame, a probe response frame, an association response frame, a reassociation response frame, or an action frame.

48. The wireless communication device of any one or more of clauses 46-47, where the frame includes a Per-STA Profile subelement or a Reduced Neighbor Report (RNR) element carrying a Do Not Transmit (DNT) bit set to a value of 1, and wherein the DNT bit set to the value of 1 indicates the unavailability of the non-primary link.

49. The wireless communication device of any one or more of clauses 46-47, where the frame includes a Capability Information field carrying a Critical Update Flag (CUF), the CUF set to a value of 1 based on the unavailability of the non-primary link.

50. The wireless communication device of any one or more of clauses 46-49, where execution of the processor-readable code is further configured to:
operate as a single-link device on the primary link based on the unavailability of the non-primary link.

51. The wireless communication device of clause 50, where execution of the processor-readable code is further configured to:
determine that the non-primary link is available while operating as the single-link device on the primary link;
reset a Do Not Transmit (DNT) bit to a value of 0 based on the availability of the non-primary link; and
transmit the reset DNT bit in another frame on only the primary link, the other frame including a Per-STA Profile subelement or a Reduced Neighbor Report (RNR) element carrying the reset DNT bit having the value of 0.

52. The wireless communication device of any one or more of clauses 46-51, where execution of the processor-readable code is further configured to:
determine that the non-primary link is available after transmitting the indication;
transmit, on only the primary link, an indication of the availability of the non-primary link; and
operate as a multi-link device on the primary link and the non-primary link based on the availability of the non-primary link.

53. The wireless communication device of any one or more of clauses 46-52, where execution of the processor-readable code is further configured to disable the non-primary link or to place the non-primary link into a power save state based on the unavailability of the non-primary link.

54. The wireless communication device of clause 53, where disabling the non-primary link includes removing the non-primary link from a multi-link context associated with the NSTR softAP MLD.

55. The wireless communication device of clause 54, where execution of the processor-readable code is further configured to:
determine that the non-primary link is available after removing the non-primary link from the multi-link context; and
add the non-primary link to the multi-link context based on the availability of the non-primary link.

56. The wireless communication device of clause 53, where disabling the non-primary link includes re-mapping traffic identifiers (TIDs) from the non-primary link to the primary link.

57. The wireless communication device of clause 56, where execution of the processor-readable code is further configured to:
determine that the non-primary link is available after disabling the non-primary link; and
re-map the TIDs from the primary link to the non-primary link based on the availability of the non-primary link.

58. The wireless communication device of any one or more of clauses 46-57, where execution of the processor-readable code is further configured to:
receive a ready-to-send (RTS) frame from a STA MLD on the primary link;
transmit a clear-to-send (CTS) frame to the STA MLD on the primary link and the non-primary link based on receiving the RTS frame; and
receive one or more uplink (UL) physical-layer protocol data units (PPDUs) from the STA MLD on the primary link and the non-primary link.

59. The wireless communication device of any one or more of clauses 46-58, where execution of the processor-readable code is further configured to:
switch the primary link from a first channel to a second channel concurrently with switching the non-primary link from the second channel to the first channel.

60. The wireless communication device of clause 59, where the first channel is in one of a 5 GHz frequency band or a 6 GHz frequency band, and the second channel is in the other of the 5 GHz frequency band or the 6 GHz frequency band.

61. A method for wireless communication by a wireless station (STA), including:
receiving, on only a primary link, a first frame from a non-simultaneous transmit-receive (NSTR) soft access point (AP) multi-link device (MLD) associated with the primary link and a non-primary link, the first frame including a complete profile of the primary link and MLD information common to the primary link and the non-primary link, the complete profile including at least a beacon interval, capability information, a service set identifier (SSID), supported rates, a timing synchronization function (TSF) value, and one or more additional fields or elements associated with discovery of the primary link;
transmitting a second frame on only the primary link to the NSTR softAP MLD, the second frame requesting a complete profile of the non-primary link; and
receiving a third frame on only the primary link from the NSTR softAP MLD, the third frame indicating the complete profile of the non-primary link.

62. The method of clause 61, where the first frame is a beacon frame, the second frame is a probe request frame, and the third frame is a probe response frame.

63. The method of any one or more of clauses 61-62, where the first frame contains a frame body carrying the complete profile of the primary link and including a Multi-Link (ML) Element consisting of the MLD common information.

64. The method of clause 63, where the MLD common information includes an MLD medium access control (MAC) address field, a Link ID Info field, a basic service set (BSS) Parameters Change Count (BPCC) field, a synchronization delay field, an Enhanced Multi-Link (EML) Capabilities field, and an MLD Capabilities field.

65. The method of clause 64, where the BPCC field indicates updates to one or more BSS parameters associated with the primary link.

66. The method of any one or more of clauses 64-65, where link information of the non-primary link is absent from the ML Element of the first frame.

67. The method of any one or more of clauses 61-66, where the third frame contains a frame body including a Multi-Link (ML) Element carrying a Per-STA Profile subelement indicating the complete profile of the non-primary link.

68. The method of clause 67, where the frame body of the third frame further includes a Reduced Neighbor Report (RNR) Element carrying a Neighbor AP Information field associated with the non-primary link, the Neighbor AP Information field carrying a target beacon transmission time (TBTT) Information field consisting of a basic service set identification (BSSID) and one or more MLD parameters of the non-primary link.

69. The method of clause 68, where a TBTT offset subfield, a short-SSID subfield, a BSS parameters subfield, and a power spectral density (PSD) subfield are absent from the TBTT Information field corresponding to the non-primary link.

70. The method of any one or more of clauses 61-69, where a beacon interval, an SSID, and a TSF value of the non-primary link are inherited from the primary link.

71. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive, on only a primary link, a first frame from a non-simultaneous transmit-receive (NSTR) soft access point (AP) multi-link device (MLD) associated with the primary link and a non-primary link, the first frame including a complete profile of the primary link and MLD information common to the primary link and the non-primary link, the complete profile including at least a beacon interval, capability information, a service set identifier (SSID), supported rates, a timing synchronization function (TSF) value, and one or more additional fields or elements associated with discovery of the primary link;
transmit a second frame on only the primary link to the NSTR softAP MLD, the second frame requesting a complete profile of the non-primary link; and
receive a third frame on only the primary link from the NSTR softAP MLD, the third frame indicating the complete profile of the non-primary link.

72. The wireless communication device of clause 71, where the first frame is a beacon frame, the second frame is a probe request frame, and the third frame is a probe response frame.

73. The wireless communication device of any one or more of clauses 71-72, where the first frame contains a frame body carrying the complete profile of the primary link and including a Multi-Link (ML) Element consisting of the MLD common information.

74. The wireless communication device of clause 73, where the MLD common information includes an MLD medium access control (MAC) address field, a Link ID Info field, a basic service set (BSS) Parameters Change Count (BPCC) field, a synchronization delay field, an Enhanced Multi-Link (EML) Capabilities field, and an MLD Capabilities field.

75. The wireless communication device of clause 74, where the BPCC field indicates updates to one or more BSS parameters associated with the primary link.

76. The wireless communication device of clause 73, where link information of the non-primary link is absent from the ML Element of the first frame.

77. The wireless communication device of any one or more of clauses 71-76, where the third frame includes a frame body including a Multi-Link (ML) Element carrying a Per-STA Profile subelement indicating the complete profile of the non-primary link.

78. The wireless communication device of clause 77, where the frame body of the third frame further includes a Reduced Neighbor Report (RNR) Element carrying a Neighbor AP Information field associated with the non-primary link, the Neighbor AP Information field carrying a target beacon transmission time (TBTT) Information field consisting of a basic service set identification (BSSID) and one or more MLD parameters of the non-primary link.

79. The wireless communication device of clause 78, where a TBTT offset subfield, a short-SSID subfield, a BSS parameters subfield, and a power spectral density (PSD) subfield are absent from the TBTT Information field corresponding to the non-primary link.

80. The wireless communication device of any one or more of clauses 71-79, where a beacon interval, an SSID, and a TSF value of the non-primary link are inherited from the primary link.

81. A method for wireless communication by a wireless station (STA), including:
operating as a non-simultaneous transmit-receive (NSTR) soft access point (AP) multi-link device (MLD) associated with a primary link and a non-primary link; and
transmitting, on only the primary link, a frame including one or more timing parameters associated with the primary link, the non-primary link including one or more timing parameters inherited from the primary link.

82. The method of clause 81, where the frame is one of a beacon frame, a probe response frame, an association response frame, or a reassociation response frame.

83. The method of any one or more of clauses 81-82, where the one or more timing parameters include at least one of a channel switch announcement, a quiet period, or a beacon interval.

84. The method of any one or more of clauses 81-83, where the primary link is associated with a target beacon transmission time (TBTT), and the non-primary link includes a pseudo-BSS aligned with the TBTT of the primary link.

85. The method of any one or more of clauses 81-84, where a target wait time (TWT) session established on the non-primary link is synchronized with a TWT session established on the primary link.

86. The method of any one or more of clauses 81-85, further including:
aligning uplink (UL) transmissions to the NSTR softAP MLD on the non-primary link with UL transmissions to the NSTR softAP MLD on the primary link.

87. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:

operate as a non-simultaneous transmit-receive (NSTR) soft access point (AP) multi-link device (MLD) associated with a primary link and a non-primary link; and transmit, on only the primary link, a frame including one or more timing parameters associated with the primary link, the non-primary link including one or more timing parameters inherited from the primary link.

88. The wireless communication device of clause 87, where the frame is one of a beacon frame, a probe response frame, an association response frame, or a reassociation response frame.

89. The wireless communication device of any one or more of clauses 87-88, where the one or more timing parameters include at least one of a channel switch announcement, a quiet period, or a beacon interval.

90. The wireless communication device of any one or more of clauses 87-89, where the primary link is associated with a target beacon transmission time (TBTT), and the non-primary link includes a pseudo-BSS aligned with the TBTT of the primary link.

91. The wireless communication device of any one or more of clauses 87-89, where a target wait time (TWT) session established on the non-primary link is synchronized with a TWT session established on the primary link.

92. The wireless communication device of any one or more of clauses 87-91, where execution of the processor-readable code is further configured to:

align uplink (UL) transmissions to the NSTR softAP MLD on the non-primary link with UL transmissions to the NSTR softAP MLD on the primary link.

93. A method for wireless communication by a wireless station (STA), including:

operating as a non-simultaneous transmit-receive (NSTR) soft access point (AP) multi-link device (MLD) associated with a primary link and a non-primary link;

obtaining channel access on the primary link;

transmitting a first frame on the primary link to a first associated STA;

entering the non-primary link into a deaf state for a duration of the frame transmission on the primary link; and recovering the non-primary link from the deaf state after an end of the frame transmission on the primary link.

94. The method of clause 93, where the first frame includes a management frame, a control frame, or a data frame.

95. The method of any one or more of clauses 93-95, further including:

obtaining channel access on the non-primary link based on the channel access obtained on the primary link; and transmitting a second frame on the non-primary link to a second associated STA concurrently with transmission of a third frame on the primary link to the first associated STA.

96. The method of clause 95, where the first associated STA is a legacy device configured to operate in accordance with the IEEE 802.11ax or earlier amendments to the 802.11 family of wireless communication standards, and the second associated STA is a non-legacy device configured to operate in accordance with the IEEE 802.11be or later amendments to the 802.11 family of wireless communication standards.

97. The method of clause 95, further including:

synchronizing transmission of the second frame on the non-primary link with the transmission of the third frame on the primary link.

98. The method of clause 93, further including:

obtaining channel access on the non-primary link during at least a portion of the channel access obtained on the primary link; and transmitting a second frame on the non-primary link to one or more second associated STAs during the transmission of the first frame on the primary link.

99. The method of clause 98, where the first frame is a beacon frame, and the second frame is an aggregated transmission to the one or more second associated STAs.

100. The method of clause 99, where the one or more second associated STAs are multi-radio devices operating on the primary link and the non-primary link.

101. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to:

operate as a non-simultaneous transmit-receive (NSTR) soft access point (AP) multi-link device (MLD) associated with a primary link and a non-primary link;

obtain channel access on the primary link;

transmit a first frame on the primary link to a first associated STA;

enter the non-primary link into a deaf state for a duration of the frame transmission on the primary link; and recover the non-primary link from the deaf state after an end of the frame transmission on the primary link.

102. The wireless communication device of clause 101, where the first frame includes a management frame, a control frame, or a data frame.

103. The wireless communication device of any one or more of clauses 101-102, where execution of the processor-readable code is further configured to:

obtain channel access on the non-primary link based on the channel access obtained on the primary link; and transmit a second frame on the non-primary link to a second associated STA concurrently with the transmission of a third frame on the primary link to the first associated STA.

104. The wireless communication device of clause 103, where the first associated STA is a legacy device configured to operate in accordance with the IEEE 802.11ax or earlier amendments to the 802.11 family of wireless communication standards, and the second associated STA is a non-legacy device configured to operate in accordance with the IEEE 802.11be or later amendments to the 802.11 family of wireless communication standards.

105. The wireless communication device of clause 103, where execution of the processor-readable code is further configured to:

synchronize transmission of the second frame on the non-primary link with the transmission of the third frame on the primary link.

106. The wireless communication device of clause 101, where execution of the processor-readable code is further configured to:
obtain channel access on the non-primary link during at least a portion of the channel access obtained on the primary link; and
transmit a second frame on the non-primary link to one or more second associated STAs during the transmission of the first frame on the primary link.

107. The wireless communication device of clause 106, where the first frame is a beacon frame, and the second frame is an aggregated transmission to the one or more second associated STAs.

108. The wireless communication device of clause 107, where the one or more second associated STAs are multi-radio devices operating on the primary link and the non-primary link.

109. A method for wireless communication by a wireless station (STA), including:
operating as a non-simultaneous transmit-receive (NSTR) soft access point (AP) multi-link device (MLD) associated with a primary link and a non-primary link;
obtaining channel access to the primary link and the non-primary link;
establishing a coordinated target wait time (TWT) session on the primary link and the non-primary link;
transmitting a first trigger frame on the primary link, the first trigger frame soliciting uplink (UL) transmissions from a first group of STAs on the primary link; and
transmitting a second trigger frame on the non-primary link concurrently with the transmission of the first trigger frame on the primary link, the second trigger frame soliciting UL transmissions from a second group of STAs on the non-primary link.

110. The method of clause 109, further including:
receiving one or more first UL physical-layer protocol data units (PPDUs) on the primary link from the first group of STAs based on the first trigger frame; and
receiving one or more second UL PPDUs on the non-primary link from the second group of STAs based on the second trigger frame.

111. The method of clause 110, further including:
synchronizing one or more TWT service periods on the non-primary link with one or more respective TWT service periods on the primary link.

112. The method of clause 110, where transmission of the one or more second UL PPDUs by the second group of STAs on the primary link is temporally aligned with the transmission of the one or more first UL PPDUs by the first group of STAs on the primary link.

113. The method of clause 110, further including:
transmitting one or more first downlink (DL) PPDUs on the primary link to the first group of STAs; and
transmitting one or more second DL PPDUs on the non-primary link to the second group of STAs concurrently with the transmission of the one or more first DL PPDUs to the first group of STAs on the primary link.

114. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
operate as a non-simultaneous transmit-receive (NSTR) soft access point (AP) multi-link device (MLD) associated with a primary link and a non-primary link;
obtain channel access to the primary link and the non-primary link;
establish a coordinated target wait time (TWT) session on the primary link and the non-primary link;
transmit a first trigger frame on the primary link, the first trigger frame soliciting uplink (UL) transmissions from a first group of STAs on the primary link; and
transmit a second trigger frame on the non-primary link concurrently with the transmission of the first trigger frame on the primary link, the second trigger frame soliciting UL transmissions from a second group of STAs on the non-primary link.

115. The wireless communication device of clause 114, where execution of the processor-readable code is further configured to:
receive one or more first UL physical-layer protocol data units (PPDUs) on the primary link from the first group of STAs based on the first trigger frame; and
receive one or more second UL PPDUs on the non-primary link from the second group of STAs based on the second trigger frame.

116. The wireless communication device of clause 115, where execution of the processor-readable code is further configured to:
synchronize one or more TWT service periods on the non-primary link with one or more respective TWT service periods on the primary link.

117. The wireless communication device of clause 115, where transmission of the one or more second UL PPDUs by the second group of STAs on the primary link is temporally aligned with the transmission of the one or more first UL PPDUs by the first group of STAs on the primary link.

118. The wireless communication device of clause 115, where execution of the processor-readable code is further configured to:
transmit one or more first downlink (DL) PPDUs on the primary link to the first group of STAs; and
transmit one or more second DL PPDUs on the non-primary link to the second group of STAs concurrently with the transmission of the one or more first DL PPDUs to the first group of STAs on the primary link.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless station (STA), comprising:
   operating as a non-simultaneous transmit-receive (NSTR) soft access point (AP) multi-link device (MLD) including a first AP associated with a primary link and including a second AP associated with a non-primary link;
   and
   transmitting, on only the primary link, one or more frames carrying an indication of an unavailability of the non-primary link, the indication comprising a Do Not Transmit (DNT) bit carried in a Reduced Neighbor Report (RNR) Element of the one or more frames transmitted on the primary link.

2. The method of claim 1, wherein the one or more frames comprise one or more beacon frames, one or more probe response frames, or more action frames.

3. The method of claim 1, wherein the one or more frames include a Capability Information field carrying a Critical Update Flag (CUF), the CUF set to a value of 1 based on the unavailability of the non-primary link.

4. The method of claim 1, further comprising:
   operating as a single-link device on the primary link based on the unavailability of the non-primary link.

5. The method of claim 4, further comprising:
   determining that the non-primary link is available while operating as the single-link device on the primary link;
   resetting the DNT bit to a value of 0 based on the availability of the non-primary link; and
   transmitting the reset DNT bit in another one or more frames on only the primary link, the other one or more frames including a Reduced Neighbor Report (RNR) element carrying the reset DNT bit having the value of 0.

6. The method of claim 1, further comprising:
   determining that the non-primary link is available after transmitting the indication;
   transmitting, on only the primary link, an indication of the availability of the non-primary link; and
   operating as a multi-link device on the primary link and the non-primary link based on the availability of the non-primary link.

7. The method of claim 1, further comprising disabling the non-primary link based on the unavailability of the non-primary link.

8. The method of claim 7, wherein disabling the non-primary link includes removing the non-primary link from a multi-link context associated with the NSTR softAP MLD.

9. The method of claim 8, further comprising:
   determining that the non-primary link is available after removing the non-primary link from the multi-link context; and
   adding the non-primary link to the multi-link context based on the availability of the non-primary link.

10. The method of claim 7, wherein disabling the non-primary link includes re-mapping traffic identifiers (TIDs) from the non-primary link to the primary link.

11. The method of claim 10, further comprising:
    determining that the non-primary link is available after disabling the non-primary link; and
    re-mapping the TIDs from the primary link to the non-primary link based on the availability of the non-primary link.

12. The method of claim 1, further comprising:
    receiving a ready-to-send (RTS) frame from a STA MLD on the primary link;
    transmitting a clear-to-send (CTS) frame to the STA MLD on the primary link and the non-primary link based on receiving the RTS frame; and
    receiving one or more uplink (UL) physical-layer protocol data units (PPDUs) from the STA MLD on the primary link and the non-primary link.

13. The method of claim 1, further comprising:
    switching the primary link from a first channel to a second channel concurrently with switching the non-primary link from the second channel to the first channel.

14. The method of claim 13, wherein the first channel is in one of a 5 GHz frequency band or a 6 GHz frequency band, and the second channel is in the other of the 5 GHz frequency band or the 6 GHz frequency band.

15. The method of claim 1, wherein the indication of the unavailability of the non-primary link is based at least in part on the primary link comprising a 5 GHz frequency spectrum and the non-primary link comprising a 6 GHz frequency spectrum.

16. A wireless communication device comprising:
    at least one modem;
    at least one processor communicatively coupled with the at least one modem; and at least one memory communicatively coupled with the at least one processor and storing processor-readable code that, when executed by the at least one processor in conjunction with the at least one modem, is configured to:
- operate as a non-simultaneous transmit-receive (NSTR) soft access point (AP) multi-link device (MLD) including a first AP associated with a primary link and including a second AP associated with a non-primary link; and
- transmit, on only the primary link, one or more frames carrying an indication of an unavailability of the non-primary link, the indication comprising a Do Not Transmit (DNT) bit carried in a Reduced Neighbor Report (RNR) Element of the one or more frames transmitted on the primary link.

17. The wireless communication device of claim 16, wherein the one or more frames comprise one or more beacon frames, one or more probe response frames, or more action frames.

18. The wireless communication device of claim 16, wherein the one or more frames include a Capability Information field carrying a Critical Update Flag (CUF), the CUF set to a value of 1 based on the unavailability of the non-primary link.

19. The wireless communication device of claim 16, wherein execution of the processor-readable code is further configured to:
- operate as a single-link device on the primary link based on the unavailability of the non-primary link.

20. The wireless communication device of claim 19, wherein execution of the processor-readable code is further configured to:
- determine that the non-primary link is available while operating as the single-link device on the primary link;
- reset the DNT bit to a value of 0 based on the availability of the non-primary link; and
- transmit the reset DNT bit in another one or more frames on only the primary link, the other one or more frames including a Reduced Neighbor Report (RNR) element carrying the reset DNT bit having the value of 0.

21. The wireless communication device of claim 16, wherein execution of the processor-readable code is further configured to:
- determine that the non-primary link is available after transmitting the indication;
- transmit, on only the primary link, an indication of the availability of the non-primary link; and
- operate as a multi-link device on the primary link and the non-primary link based on the availability of the non-primary link.

22. The wireless communication device of claim 16, wherein execution of the processor-readable code is further configured to disable the non-primary link based on the unavailability of the non-primary link.

23. The wireless communication device of claim 22, wherein disabling the non-primary link includes removing the non-primary link from a multi-link context associated with the NSTR softAP MLD.

24. The wireless communication device of claim 23, wherein execution of the processor-readable code is further configured to:
- determine that the non-primary link is available after removing the non-primary link from the multi-link context; and
- add the non-primary link to the multi-link context based on the availability of the non-primary link.

25. The wireless communication device of claim 22, wherein disabling the non-primary link includes re-mapping traffic identifiers (TIDs) from the non-primary link to the primary link.

26. The wireless communication device of claim 25, wherein execution of the processor-readable code is further configured to:
- determine that the non-primary link is available after disabling the non-primary link; and
- re-map the TIDs from the primary link to the non-primary link based on the availability of the non-primary link.

27. The wireless communication device of claim 16, wherein execution of the processor-readable code is further configured to:
- receive a ready-to-send (RTS) frame from a STA MLD on the primary link;
- transmit a clear-to-send (CTS) frame to the STA MLD on the primary link and the non-primary link based on receiving the RTS frame; and
- receive one or more uplink (UL) physical-layer protocol data units (PPDUs) from the STA MLD on the primary link and the non-primary link.

28. The wireless communication device of claim 16, wherein execution of the processor-readable code is further configured to:
- switch the primary link from a first channel to a second channel concurrently with switching the non-primary link from the second channel to the first channel.

29. The wireless communication device of claim 28, wherein the first channel is in one of a 5 GHz frequency band or a 6 GHz frequency band, and the second channel is in the other of the 5 GHz frequency band or the 6 GHz frequency band.

* * * * *